(12) United States Patent
Dufresne et al.

(10) Patent No.: US 11,157,260 B2
(45) Date of Patent: *Oct. 26, 2021

(54) EFFICIENT INFORMATION STORAGE AND RETRIEVAL USING SUBGRAPHS

(71) Applicant: ReactiveCore LLC, New York, NY (US)

(72) Inventors: Michel Dufresne, Montréal (CA); Benjamin Schaff, La Prairie (CA)

(73) Assignee: ReactiveCore LLC, Montreal (CA)

(*) Notice: Subject to any disclaimer, the term of this patent is extended or adjusted under 35 U.S.C. 154(b) by 295 days.

This patent is subject to a terminal disclaimer.

(21) Appl. No.: 16/452,264

(22) Filed: Jun. 25, 2019

(65) Prior Publication Data
US 2019/0310840 A1 Oct. 10, 2019

Related U.S. Application Data

(63) Continuation-in-part of application No. 15/847,274, filed on Dec. 19, 2017, now Pat. No. 10,346,154.
(Continued)

(51) Int. Cl.
G06F 8/65 (2018.01)
G06N 5/00 (2006.01)
(Continued)

(52) U.S. Cl.
CPC ............ G06F 8/65 (2013.01); G06F 8/20 (2013.01); G06F 8/36 (2013.01); G06N 5/00 (2013.01); G06N 5/025 (2013.01); G06Q 10/101 (2013.01)

(58) Field of Classification Search
CPC .... G06F 8/65; G06F 8/20; G06F 8/36; G06N 5/025; G06N 5/00; G06Q 10/101
See application file for complete search history.

(56) References Cited

U.S. PATENT DOCUMENTS 5,694,523 A 12/1997 Wical
6,101,515 A 8/2000 Wical et al.
(Continued)

FOREIGN PATENT DOCUMENTS

WO 2018187146 A1 10/2018

OTHER PUBLICATIONS

Notice of Allowance dated Apr. 9, 2019, in corresponding U.S. Appl. No. 15/723,908 (22 pages).
(Continued)

Primary Examiner — Wei Y Zhen
Assistant Examiner — Brahim Bourzik
(74) Attorney, Agent, or Firm — Pillsbury Winthrop Shaw Pittman, LLP

(57) ABSTRACT

An extended ontology may be generated from an ontology such that one or more classes of the extended ontology is associated with a marker and input data may be received. Further, based on the extended ontology and the marker, a subgraph representation of the input data may be generated, where the subgraph representation omits a piece of information included in a first graph representation of the input data, and the subgraph representation includes a plurality of acyclic subgraphs. The acyclic subgraphs may be stored in one or more databases and an acyclic subgraph of the plurality of acyclic subgraphs may be provided as an input to an executable program, where the application of rules associated with the extended ontology by the executable program causes a cyclic graph to be generated from the acyclic subgraph such that the cyclic graph comprises a piece of information omitted from the acyclic subgraph.

20 Claims, 25 Drawing Sheets

Related U.S. Application Data which is a continuation of application No. 15/480,320, filed on Apr. 5, 2017, now Pat. No. 9,864,598, which is a continuation-in-part of application No. 15/393,238, filed on Dec. 28, 2016, now Pat. No. 9,766,879, which is a continuation of application No. 14/859,016, filed on Sep. 18, 2015, now Pat. No. 9,552,200.

(51) Int. Cl.
| | |
|---|---|
| *G06N 5/02* | (2006.01) |
| *G06Q 10/10* | (2012.01) |
| *G06F 8/36* | (2018.01) |
| *G06F 8/20* | (2018.01) |

(56) References Cited

U.S. PATENT DOCUMENTS

| | | | |
|---|---|---|---|
| 6,102,968 A | 8/2000 | Colby et al. |
| 6,112,201 A | 8/2000 | Wical |
| 6,199,195 B1 | 3/2001 | Goodwin et al. |
| 6,574,655 B1 | 6/2003 | Libert et al. |
| 6,675,382 B1 | 1/2004 | Foster |
| 6,789,252 B1 | 9/2004 | Burke et al. |
| 7,027,974 B1 | 4/2006 | Busch et al. |
| 7,093,200 B2 | 8/2006 | Schreiber et al. |
| 7,096,459 B2 | 8/2006 | Keller et al. |
| 7,152,228 B2 | 12/2006 | Goodwin et al. |
| 7,155,715 B1 | 12/2006 | Cui et al. |
| 7,200,563 B1 | 4/2007 | Hammitt et al. |
| 7,337,440 B1 | 2/2008 | Schmidt et al. |
| 7,373,325 B1 | 5/2008 | Hadingham et al. |
| 7,461,374 B1 | 12/2008 | Balint et al. |
| 7,496,891 B2 | 2/2009 | Bou-Ghannam et al. |
| 7,631,301 B2 | 12/2009 | Fortier |
| 7,640,532 B2 | 12/2009 | Jain et al. |
| 7,716,286 B2 | 5/2010 | Heins et al. |
| 7,730,123 B1 | 6/2010 | Erickson et al. |
| 7,747,980 B2 | 6/2010 | Illowsky et al. |
| 7,756,870 B2 | 7/2010 | Buchmann et al. |
| 7,770,121 B2 | 8/2010 | Jain et al. |
| 7,784,047 B2 | 8/2010 | Simpson |
| 7,784,838 B2 | 8/2010 | Levy |
| 7,844,721 B2 | 11/2010 | Lee et al. |
| 7,890,517 B2 | 2/2011 | Angelo et al. |
| 7,895,568 B1 | 2/2011 | Goodwin et al. |
| 7,899,764 B2 | 3/2011 | Martin et al. |
| 8,001,539 B2 | 8/2011 | Mitchell et al. |
| 8,028,283 B2 | 9/2011 | Sheshagiri et al. |
| 8,091,081 B2 | 1/2012 | Thorson et al. |
| 8,112,257 B2 | 2/2012 | Weber et al. |
| 8,127,286 B2 | 2/2012 | London |
| 8,131,838 B2 | 3/2012 | Bornhoevd et al. |
| 8,135,655 B2 | 3/2012 | Oaten et al. |
| 8,140,680 B2 | 3/2012 | Behrendt et al. |
| 8,171,466 B2 | 5/2012 | Langen et al. |
| 8,204,870 B2 | 6/2012 | Mukkamala et al. |
| 8,214,372 B2 | 7/2012 | Gupta et al. |
| 8,217,756 B2 | 7/2012 | Kumar et al. |
| 8,255,903 B2 | 8/2012 | Williams et al. |
| 8,291,006 B2 | 10/2012 | Andrade et al. |
| 8,370,812 B2 | 2/2013 | Feblowitz et al. |
| 8,370,863 B2 | 2/2013 | Grigoriev et al. |
| 8,402,081 B2 | 3/2013 | Sandoval et al. |
| 8,407,677 B2 | 3/2013 | Pradadarao |
| 8,418,125 B2 | 4/2013 | Hawkins et al. |
| 8,423,952 B2 | 4/2013 | Bögl et al. |
| 8,429,179 B1 * | 4/2013 | Mirhaji .................. G06F 16/248 |
| | | 707/756 |
| 8,448,162 B2 | 5/2013 | Ramanathan et al. |
| 8,448,164 B2 | 5/2013 | Greiner et al. |
| 8,468,244 B2 | 6/2013 | Redlich et al. |
| 8,484,283 B2 | 7/2013 | Afergan et al. |
| 8,494,894 B2 | 7/2013 | Jaster et al. |
| 8,516,435 B2 | 8/2013 | Akkirahu et al. |
| 8,522,195 B2 | 8/2013 | Miloslavsky et al. |
| 8,595,138 B2 | 11/2013 | Sun et al. |
| 8,620,931 B2 | 12/2013 | Zillner |
| 8,635,232 B2 | 1/2014 | Brooks et al. |
| 8,650,479 B2 | 2/2014 | Jardine-Skinner et al. |
| 8,661,107 B2 | 2/2014 | Hoffmann et al. |
| 8,666,922 B2 | 3/2014 | Hohimer et al. |
| 8,667,477 B2 | 3/2014 | Bentzien et al. |
| 8,676,833 B2 | 3/2014 | Chunilal et al. |
| 8,739,150 B2 | 3/2014 | Gass et al. |
| 8,688,749 B1 | 4/2014 | Ducott, III et al. |
| 8,712,947 B2 | 4/2014 | Shanmukh et al. |
| 8,713,012 B2 | 4/2014 | Martino et al. |
| 8,732,593 B2 | 5/2014 | Van Wie et al. |
| 8,739,124 B2 | 5/2014 | Ritter et al. |
| 8,782,597 B2 | 7/2014 | Wang et al. |
| 8,788,566 B2 | 7/2014 | Liu et al. |
| 8,832,675 B1 | 9/2014 | Abderrazzaq et al. |
| 8,849,862 B2 | 9/2014 | Visscher |
| 8,863,102 B2 | 10/2014 | Feblowitz et al. |
| 8,930,178 B2 | 1/2015 | Pestian et al. |
| 8,930,957 B2 | 1/2015 | Assuncao et al. |
| 8,935,274 B1 | 1/2015 | Mihailovici et al. |
| 8,965,957 B2 | 2/2015 | Barros |
| 8,996,660 B2 | 3/2015 | Nusser et al. |
| 9,002,896 B2 | 4/2015 | Shepherd et al. |
| 9,015,665 B2 * | 4/2015 | Kannan .................. G06F 8/10 |
| | | 717/123 |
| 9,021,456 B2 | 4/2015 | Bou-Ghannam et al. |
| 9,170,803 B2 | 10/2015 | Pavlik et al. |
| 9,183,501 B2 | 11/2015 | Bentley et al. |
| 9,213,698 B1 | 12/2015 | Tsypliaev et al. |
| 9,262,126 B2 | 2/2016 | Ghaisas |
| 9,335,991 B1 | 5/2016 | Dufresne |
| 9,367,425 B1 * | 6/2016 | Hale .................. G06F 3/0481 |
| 9,372,667 B2 | 6/2016 | Kossman et al. |
| 9,372,684 B1 | 6/2016 | Dufresne |
| 9,552,200 B1 | 1/2017 | Dufresne |
| 9,582,495 B2 | 2/2017 | Song |
| 9,672,497 B1 | 6/2017 | Lewis et al. |
| 9,800,644 B2 | 10/2017 | Ben Jemâa |
| 9,870,247 B2 | 1/2018 | Suit et al. |
| 9,871,888 B2 | 1/2018 | Sankaranarasimhan et al. |
| 9,940,581 B2 | 4/2018 | Bostick et al. |
| 2002/0173971 A1 * | 11/2002 | Stirpe ................ G06Q 30/0255 |
| | | 705/14.53 |
| 2003/0014502 A1 | 1/2003 | Snider |
| 2003/0115078 A1 | 6/2003 | Young |
| 2004/0083135 A1 | 4/2004 | Chau et al. |
| 2005/0197995 A1 | 9/2005 | Badt, Jr. et al. |
| 2005/0289504 A1 | 12/2005 | Buchmann et al. |
| 2006/0020565 A1 | 1/2006 | Rzevski et al. |
| 2006/0053098 A1 | 3/2006 | Gardner et al. |
| 2006/0053135 A1 | 3/2006 | Beaumont et al. |
| 2006/0053172 A1 | 3/2006 | Gardner et al. |
| 2006/0075013 A1 | 4/2006 | Hite et al. |
| 2006/0130024 A1 | 6/2006 | Fortier |
| 2006/0248458 A1 | 11/2006 | Li et al. |
| 2007/0038438 A1 | 2/2007 | Cho et al. |
| 2007/0143285 A1 | 6/2007 | Drumm et al. |
| 2007/0156622 A1 | 7/2007 | Akkiraju et al. |
| 2007/0299799 A1 | 12/2007 | Meehan et al. |
| 2008/0021700 A1 | 1/2008 | Moitra et al. |
| 2008/0189278 A1 | 8/2008 | Akkiraju et al. |
| 2008/0208774 A1 | 8/2008 | Kim et al. |
| 2008/0243770 A1 | 10/2008 | Aasman |
| 2008/0320460 A1 | 12/2008 | Miller et al. |
| 2009/0037237 A1 | 2/2009 | Weber et al. |
| 2009/0063224 A1 | 3/2009 | Gorthi et al. |
| 2009/0083110 A1 | 3/2009 | Markovic et al. |
| 2009/0113394 A1 | 4/2009 | Weber et al. |
| 2009/0119095 A1 | 5/2009 | Beggelman et al. |
| 2009/0144306 A1 | 6/2009 | Min et al. |
| 2009/0157587 A1 | 6/2009 | Lim et al. |
| 2009/0177777 A1 | 7/2009 | Behrendt et al. |
| 2009/0249375 A1 | 10/2009 | Itamoto |
| 2009/0254540 A1 | 10/2009 | Musgrove et al. |
| 2009/0254574 A1 | 10/2009 | De et al. |

(56) References Cited

U.S. PATENT DOCUMENTS

| | | | |
|---|---|---|---|
| 2009/0319981 A1 | 12/2009 | Akkiraju et al. | |
| 2010/0010957 A1 | 1/2010 | Cho et al. | |
| 2010/0082691 A1 | 4/2010 | Jaster et al. | |
| 2010/0088665 A1* | 4/2010 | Langworthy | G06F 8/75 717/104 |
| 2010/0107165 A1 | 4/2010 | Koskimies et al. | |
| 2010/0122238 A1* | 5/2010 | Kannan | G06F 8/36 717/123 |
| 2010/0153160 A1 | 6/2010 | Bezemer et al. | |
| 2010/0162222 A1 | 6/2010 | Bou-Ghannam et al. | |
| 2010/0333078 A1 | 12/2010 | Sun et al. | |
| 2011/0038375 A1* | 2/2011 | Liu | G06N 5/025 370/392 |
| 2011/0047149 A1 | 2/2011 | Vaananen et al. | |
| 2011/0093463 A1 | 4/2011 | Oliver et al. | |
| 2011/0113069 A1 | 5/2011 | Morgan | |
| 2011/0131560 A1 | 6/2011 | Pradadarao | |
| 2011/0225293 A1 | 9/2011 | Rathod | |
| 2011/0271176 A1 | 11/2011 | Menday et al. | |
| 2011/0289520 A1 | 11/2011 | Grigoriev et al. | |
| 2011/0320187 A1 | 12/2011 | Motik et al. | |
| 2012/0016858 A1 | 1/2012 | Rathod | |
| 2012/0158691 A1 | 6/2012 | Yang et al. | |
| 2012/0166992 A1 | 6/2012 | Huynh et al. | |
| 2012/0239605 A1 | 9/2012 | Hohimer et al. | |
| 2012/0310963 A1 | 12/2012 | Seo et al. | |
| 2013/0054286 A1 | 2/2013 | Oberhofer et al. | |
| 2013/0066921 A1 | 3/2013 | Mark et al. | |
| 2013/0151553 A1 | 6/2013 | Kim et al. | |
| 2013/0197966 A1 | 8/2013 | Liebman et al. | |
| 2013/0212060 A1 | 8/2013 | Crouse et al. | |
| 2013/0268260 A1 | 10/2013 | Lundberg et al. | |
| 2013/0275164 A1 | 10/2013 | Gruber et al. | |
| 2014/0032617 A1* | 1/2014 | Stanfill | G06F 16/25 707/809 |
| 2014/0040275 A1 | 2/2014 | Dang et al. | |
| 2014/0142924 A1 | 5/2014 | Friedman | |
| 2014/0156733 A1 | 6/2014 | Goranson | |
| 2014/0164298 A1 | 6/2014 | Goranson et al. | |
| 2014/0278479 A1 | 9/2014 | Wang et al. | |
| 2014/0279201 A1 | 9/2014 | Iyoob et al. | |
| 2014/0280314 A1 | 9/2014 | Coleman et al. | |
| 2014/0280918 A1 | 9/2014 | Grandhe et al. | |
| 2014/0281846 A1 | 9/2014 | Sorin et al. | |
| 2014/0324501 A1 | 10/2014 | Davidow et al. | |
| 2014/0337273 A1 | 11/2014 | Bentley et al. | |
| 2015/0007156 A1 | 1/2015 | Tkach et al. | |
| 2015/0019207 A1 | 1/2015 | Dou et al. | |
| 2015/0040099 A1 | 2/2015 | Mall et al. | |
| 2015/0088888 A1 | 3/2015 | Brennan et al. | |
| 2015/0095473 A1 | 4/2015 | Goetsch | |
| 2015/0106837 A1 | 4/2015 | Li et al. | |
| 2015/0112664 A1 | 4/2015 | Srinivasan et al. | |
| 2015/0178071 A1 | 6/2015 | Pavlik et al. | |
| 2015/0227452 A1 | 8/2015 | Raghavan et al. | |
| 2015/0254289 A1 | 9/2015 | Junkergard et al. | |
| 2015/0363386 A1 | 12/2015 | Song | |
| 2016/0012126 A1 | 1/2016 | Franceschini et al. | |
| 2016/0034578 A1 | 2/2016 | Wang et al. | |
| 2016/0103912 A1 | 4/2016 | Dagett et al. | |
| 2016/0117162 A1 | 4/2016 | Searle et al. | |
| 2016/0179934 A1 | 6/2016 | Stubley et al. | |
| 2016/0224537 A1 | 8/2016 | Starostin et al. | |
| 2016/0239745 A1 | 8/2016 | Bagchi et al. | |
| 2017/0316061 A1 | 11/2017 | Hubauer et al. | |
| 2017/0337268 A1 | 11/2017 | Ait-Mokhtar et al. | |
| 2018/0075161 A1 | 3/2018 | Saeed et al. | |
| 2020/0004759 A1* | 1/2020 | Brebner | G06F 16/245 |
| 2020/0327426 A1* | 10/2020 | Li | G06F 16/367 |
| 2021/0073285 A1* | 3/2021 | Hunter | G06F 8/35 |

OTHER PUBLICATIONS

Cadar et al., "Multi-version Software Updates," IEEE, pp. 36-40 (2012).
Al-Azwari et al., "Updating OWL2 Ontologies Using Pruned Rulesets," ACM, pp. 105-112 (2015).
Grandi, "Dynamic Multi-version Ontology-based Personalization," ACM, pp. 224-232 (2013).
Uchibayashi et al., "A Grid Application Service Framework for Extracted Sub-ontology Update," ACM, pp. 849-852 (2010).
International Search Report and Written Opinion of the International Searching Authority dated Jul. 9, 2018, in corresponding International Patent Application No. PCT/US2018/025062 (8 pages).
Notice of Allowance dated Aug. 3, 2018, in corresponding U.S. Appl. No. 15/626,963 (12 pages).
Djuric et al., "Modeling Ontologies as Executable Domain Specific Languages," 2010 (10 pages).
Lyell et al., "An Ontology-based Spatio-temporal Data Model and Query Language for Use in GIS-type Applications," 2011 (9 pages).
Office Action dated Aug. 3, 2018, in corresponding U.S. Appl. No. 15/633,680 (12 pages).
Buche et al., "Fuzzy Querying of Incomplete, Imprecise, and Heterogeneously Structured Data in the Relational Model Using Ontologies and Rules," IEEE Transactions on Fuzzy Systems, vol. 13, No. 3, pp. 373-383 (2005).
Necib et al., "Semantic Query Transformation using Ontologies," ACM, pp. 1-13 (2005).
Notice of Allowance dated Oct. 11, 2018, in corresponding U.S. Appl. No. 15/633,680 (9 pages).
Fernandez-Breis et al., "Towards Scott Domains-Based Topological Ontology Models: An Application to a Cancer Domain," ACM, pp. 127-138 (2001).
Labsky et al., "Towards Web Information Extraction using Extraction Ontologies and (Indirectly) Domain Ontologies," Acm, pp. 201-202 (2007).
Leidig et al., "Improving Simulation Management Systems through Ontology Generation and Utilization," ACM, pp. (2011). 435-436.
Su et al., "ODE: Ontology-Assisted Data Extraction," ACM Transactions on Database Systems, vol. 34, No. 2, Article 12, pp. 1-35 (2009).
Maedche et al., "Managing Multiple and Distributed Ontologies on the SemanticWeb," ACM, pp. 286-302 (2003).
Zhang et al., "Formal Approach and Automated Tool for Constructing Ontology from Object-oriented Database Model," ACM, pp. 1329-1332 (2010).
Picca et al., "Semantic Domains and Supersense Tagging for Domain-Specific Ontology Learning," ACM, pp. 102-107 (2007).
Wagner et al., "Automated Planning and Creation of Simulation Experiments with a Domain-Specific Ontology for Semiconductor Manufacturing AMHS," IEEE, pp. 2628-2629 (2019).
Kietz et al., "Extracting a Domain-Specific Ontology from a Corporate Intranet," ACM, pp. 167-175 (2000).
Guo, "Ontology Learning and its Application in Software-Intensive Projects," IEEE, pp. 843-846 (2016).
Falbo et al., "An Ontological Approach to Domain Engineering," ACM, pp. 351-358 (2002).
Guo et al., "Towards an Intelligent Domain-Specific Traceability Solution," ACM, pp. 755-765 (2014).
Wongthongtham et al., "Development of a Software Engineering Ontology for Multi-Site Software Development," IEEE, pp. 1-14 (2009).
Notice of Allowance dated Feb. 12, 2016, in corresponding U.S. Appl. No. 14/858,980 (7 pages).
Holmes et al., "Semantic Interoperability Integrating and Augmenting Legacy Applications with OWL Ontologies," IEEE, pp. 1-16 (2008).
Non-Final Office Action dated Jul. 21, 2016, in corresponding U.S. Appl. No. 15/141,814 (42 pages).
Non-Final Office Action dated Aug. 26, 2016, in corresponding U.S. Appl. No. 15/093,714 (14 pages).
International Search report dated Aug. 31, 2016, in corresponding International Patent Application No. PCT/US2016/033176 (18 pages).
Final Office Action dated Sep. 27, 2016, in corresponding U.S. Appl. No. 15/093,714 (24 pages).

(56) References Cited

OTHER PUBLICATIONS

Kowalski et. al., "A Logic-Based Framework for Reactive Systems," RuleML'12 Proceedings of the 6th International Conference on Rules on the Web: Research and Applications, Aug. 27, 2012, 15 pages, Springer-Verlag Berlin, Heidelberg.
Notice of Allowance dated Sep. 14, 2016, in corresponding U.S. Appl. No. 14/859,016 (15 pages).
Non-Final Office Action dated May 11, 2016, in corresponding U.S. Appl. No. 14/859,016 (15 pages).
Faber et al, "Linking a Domain-Specific Ontology to a General Ontology," ACM, pp. 564-569 (2011).
Siy et al., "Ontology-based Product Line Modeling and Generation," 2011 (5 pages).
Quinton et al., "Towards Multi-cloud Configurations using Feature Models and Ontologies," Apr. 2013 (6 pages).
Notice of Allowance dated Mar. 28, 2016, in corresponding U.S. Appl. No. 14/859,032 (17 pages).
Final Office Action dated Jan. 26, 2017, in corresponding U.S. Appl. No. 15/093,714 (15 pages).
Non-Final Office Action dated Dec. 24, 2015, in corresponding U.S. Appl. No. 14/858,980 (10 pages).
Non-Final Office Action dated Dec. 8, 2015, in corresponding U.S. Appl. No. 14/859,032 (23 pages).
Non-Final Office Action dated Feb. 10, 2017, in corresponding U.S. Appl. No. 15/393,238 (8 pages).
Olajubu, "A Textual Domain Specific Language for Requirement Modelling," ACM, pp. 1060-1062 (2015).
Heitmann, "An Open Framework for Multi-source, Cross-domain Personalization with Semantic Interest Graphs," ACM, pp. 313-316 (2012).
Kalibatiene et al., "On OWL/SWRL Mapping to UML/OCL," ACM, pp. 58-63 (2010).
Li et al., "Efficient Extraction of Ontologies from Domain Specific Text Corpora," ACM, pp. 1537-1541 (2012).
Non-Final Office Action dated Mar. 12, 2018, in corresponding U.S. Appl. No. 15/626,963 (12 pages).
Non-Final Office Action dated May 11, 2017, in corresponding U.S. Appl. No. 15/480,320 (9 pages).
Notice of Allowance dated May 12, 2017, in corresponding U.S. Appl. No. 15/393,238 (16 pages).
Falconer et al., "An Analysis of Collaborative Patterns in Large-Scale Ontology Development Projects," ACN, pp. 1-7 (2011).
Salomie et al., "Towards Automated Web Service Composition with Fluent Calculus and Domain Ontologies," ACM, pp. 201-207 (2008).
Belmonte et al., "Using Domain Ontologies in a Dynamic Analysis for Program Comprehension," ACM, pp. 1-6 (2010).
Fengel et al., "Model-Based Domain Ontology Engineering," ACM, pp. 55-58 (2009).
Hamza, "Developing Business Object Models with Patterns and Ontologies," ACM, pp. 106-107 (2005).
Damjanovic, "Ontology Design Patterns for the Semantic Business Processes," ACM, pp. 51-54 (2009).
Cestnik et al., "Constructing Semantic Ontologies for Business Analytics," ACM, pp. 436-441 (2010).
Obrst et al., "Ontological Engineering for B2B E-Commerce," ACM, pp. 117-226 (2001).
Notice of Allowance dated Mar. 13, 2017, in corresponding U.S. Appl. No. 15/093,714 (9 pages).
Dasilva et al., "Ontology-based Multi-domain Metadata for Research Data Management Using Triple Stores," Jul. 2017 (10 pages).
Goknil et al., "Ontological Perspective in Metamodeling for Model Transformations," Nov. 2005 (7 pages).
Roy-Choudhary et al., "Cross-platform Feature Matching for Web Applications," Jul. 2014 (11 pages).
Ramprasad et al., "Ontological Design," ACM, pp. 1-7 (2009).
Amagasa et al., "A Scheme for Privacy-Preserving Ontology Mapping," ACM, pp. 87-95 (2014).
Arpirez et al., "WebODE: a Scalable Workbench for Ontological Engineering," ACM, pp. 6-13 (2001).
Berri et al., "Ontology-based Framework for Context-Aware Mobile Learning," ACM, pp. 1307-1310 (2006).
Notice of Allowance dated Sep. 13, 2017, in corresponding U.S. Appl. No. 15/480,320 (11 pages).
International Search Report and Written Opinion issued in corresponding International Application No. PCT/US2020/039368 dated Oct. 13, 2020 (9 pages).
International Preliminary Report on Patentability dated Oct. 8, 3019, in corresponding PCT/US2018/025062 (6 pages).

* cited by examiner

FIG. 13

EFFICIENT INFORMATION STORAGE AND RETRIEVAL USING SUBGRAPHS

CROSS-REFERENCE TO RELATED APPLICATIONS

This application is a continuation-in-part of U.S. patent application Ser. No. 15/847,274, filed Dec. 19, 2017, which is a continuation of U.S. patent application Ser. No. 15/480,320 (now U.S. Pat. No. 9,864,598), filed Apr. 5, 2017 (issued Jan. 9, 2018), which is a continuation-in-part of U.S. patent application Ser. No. 15/393,238 (now U.S. Pat. No. 9,766,879), filed Dec. 28, 2016 (issued Sep. 19, 2017), which is a continuation of U.S. patent application Ser. No. 14/859,016 (now U.S. Pat. No. 9,552,200), filed Sep. 18, 2015 (issued Jan. 24, 2017), each of which is hereby incorporated by reference in its entirety.

This application is also related to U.S. patent application Ser. No. 14/858,980 (now U.S. Pat. No. 9,335,991), filed Sep. 18, 2015 (issued May 10, 2016) and U.S. patent application Ser. No. 14/859,032 (now U.S. Pat. No. 9,372,684), filed Sep. 18, 2015, (issued Jun. 21, 2016), each of which is also hereby incorporated by reference herein in its entirety.

FIELD OF THE INVENTION

The invention relates to enabling access to information, including, for example, providing ontology-configurable computer programs, supplemental functionalities for computer programs, and/or acyclic subgraphs for retrieval of information.

BACKGROUND OF THE INVENTION

Storage and retrieval of large amounts of information requires a large amount of available memory space to store such information and a large amount of communication resources to convey such information. Since there is limited amount of memory to store information and limited amount of communication resources to convey information, there may not be enough memory space to store the entire information and there may not be enough communication resources to convey the entire information. However, in order to perform a task, the entire information may be needed. As a result, there is a need for accessing the entire information without actually storing the entire information and conveying the entire information. These and other drawbacks exist.

SUMMARY OF THE INVENTION

One aspect of the disclosure relates to a method for improving storage and retrieval of information using an acyclic subgraph. The method may include generating an extended ontology from an ontology such that one or more classes of the extended ontology is associated with a marker and receiving input data. Further, the method may include generating, based on the extended ontology and the marker associated with the one or more classes of the extended ontology, a subgraph representation of the input data, the subgraph representation omitting at least one piece of information included in a first graph representation of the input data, and the subgraph representation including a plurality of acyclic subgraphs, storing the plurality of acyclic subgraphs in one or more databases, and providing an acyclic subgraph of the plurality of acyclic subgraphs as an input to an executable program, wherein application of rules associated with the extended ontology by the executable program causes a cyclic graph to be generated from the acyclic subgraph such that the cyclic graph comprises one or more pieces of information omitted from the acyclic subgraph.

Another aspect of the disclosure relates to a system for improving storage and retrieval of information using a subgraph. The system may include a computer system that includes one or more physical processors programmed with computer program instructions that, when executed, cause the computer system to generate an extended ontology from an ontology such that one or more classes of the extended ontology is associated with a marker and receive input data. Further, the computer program instructions that, when executed, cause the computer system to generate, based on the extended ontology and the marker associated with the one or more classes of the extended ontology, a subgraph representation of the input data, the subgraph representation omitting at least one piece of information included in a first graph representation of the input data, and the subgraph representation including a plurality of subgraphs, store the plurality of subgraphs in one or more databases, and provide a subgraph of the subgraphs as an input to an executable program, wherein application of rules associated with the extended ontology by the executable program causes a graph to be generated from the subgraph such that the graph comprises one or more pieces of information omitted from the subgraph.

Another aspect of the disclosure relates to non-transitory computer readable media. The computer readable media may store computer program instructions that, when executed by a computer system, may cause the computer system to generate an extended ontology from an ontology such that one or more classes of the extended ontology is associated with a marker, receive input data, generate, based on the extended ontology and the marker associated with the one or more classes of the extended ontology, a subgraph representation of the input data, the subgraph representation omitting at least one piece of information included in a first graph representation of the input data, and the subgraph representation including a plurality of subgraphs, store the plurality of subgraphs in one or more databases, and provide a subgraph of the subgraphs as an input to an executable program, wherein application of rules associated with the extended ontology by the executable program causes a graph to be generated from the subgraph such that the graph comprises one or more pieces of information omitted from the subgraph.

Various other aspects, features, and advantages of the inventions will be apparent through the detailed description of the invention and the drawings attached hereto. It is also to be understood that both the foregoing general description and the following detailed description are exemplary and not restrictive of the scope of the inventions. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 13 shows an ontology describing a class of BPM applications, in accordance with some embodiments.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

To mitigate the problems described herein, the inventors had to both invent solutions and, in some cases just as importantly, recognize problems overlooked (or not yet foreseen) by others in the field of enterprise software development. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

The complexity of software, particularly in business applications, has expanded dramatically in recent years. As a result, the cost of many types of custom software has risen. It is also believed that the responsiveness of developers to changing business needs has decreased. In part, this is caused by code added to address more complex use cases and extensive testing of new versions to understand complex interactions introduced by revisions to applications.

These issues, in some cases, are mitigated by some embodiments described below. Some embodiments may separately address two aspects of an application: (1) those aspects particular to a class of business applications; and (2) those aspects particular to a domain in which an instance of the class is to be applied. In some cases, relatively flexible executable code is generated for a class of business applications, and then functionality of that code is refined with an ontology that reflects more specific aspects of a particular domain. In some cases, the ontology can be created much more efficiently than the corresponding bespoke application can be created from scratch, as the ontology can facilitate code re-use across domains in some embodiments. And in some cases, the ontology can be modified with less risk to the larger code base, often without compiling new code. In some cases, information may be retrieved more efficiently via acyclic subgraphs generated based on an extended ontology.

It should be emphasized, though, that several inventions are described. These inventions are independently useful, so not all embodiments mitigate all of the problems addressed above, and some embodiments provide other benefits discussed below.

Description of Example Systems

Figure 1:
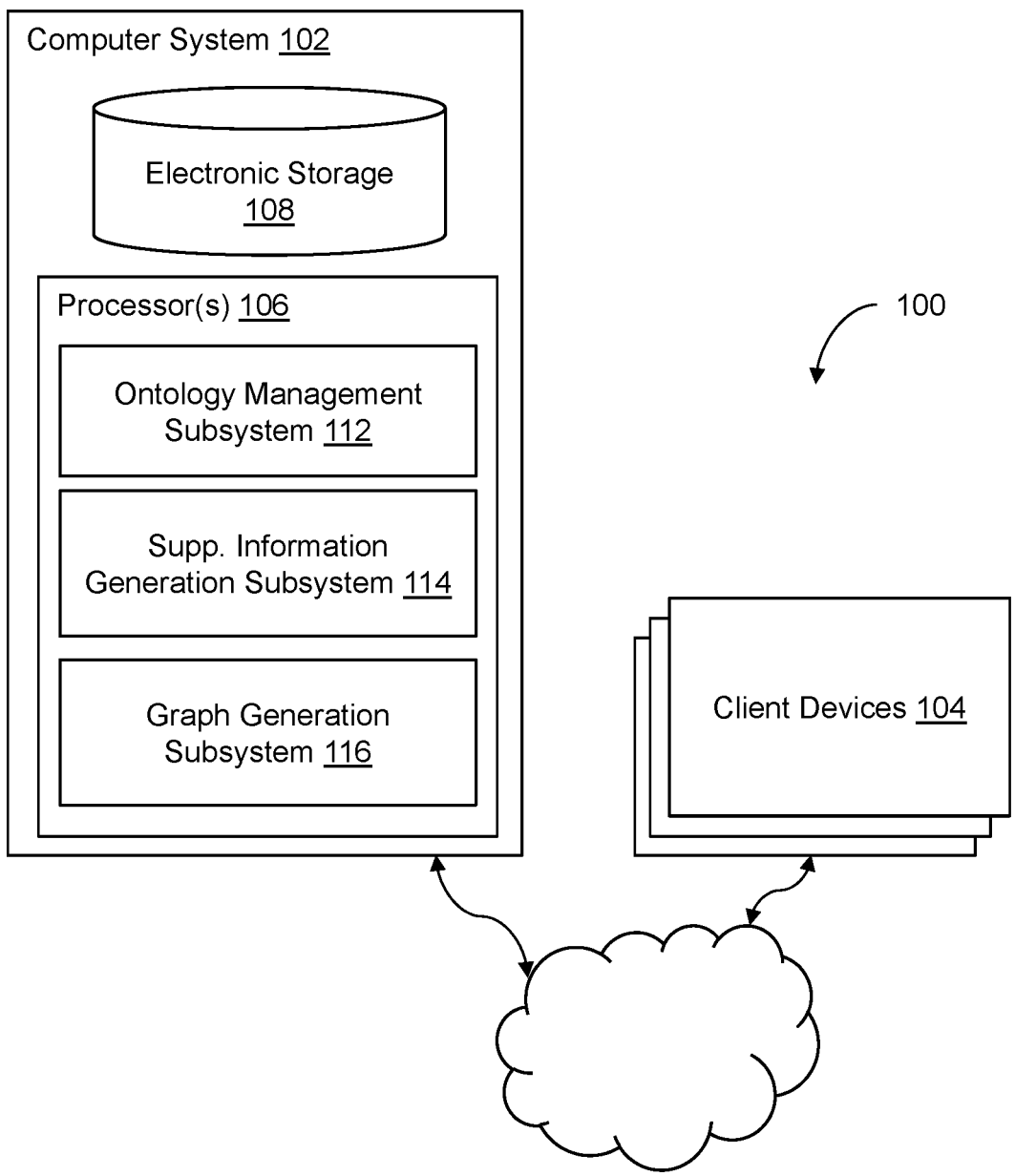
FIG. 1 shows a system for providing ontology-configurable computer programs, supplemental functionalities for computer programs, and/or acyclic subgraphs for retrieval of information, in accordance with some embodiments.

FIG. 1 shows a system 100 for providing supplemental functionalities for an executable program via ontology instances and for generating and providing acyclic graphs of an extended ontology, in accordance with some embodiments. As shown in FIG. 1, the system 100 may comprise a computer system 102 (which may be multiple computer systems 102). The computer system 102 may comprise one or more physical processors 106 programmed with one or more computer program instructions and electronic storage 108, or other components. Various programs and subsystems may be implemented on the physical processors 106, including ontology management subsystem 112, supplemental information generation subsystem 114, graph generation subsystem 116, or other components (for example, ontology-configurable computer programs or applications, other subsystems, etc.).

In some embodiments, the computer system 102 in FIG. 1 may include communication lines or ports to enable the exchange of information with a network or other computing platforms. The computer system 102 may include a plurality of hardware, software, and/or firmware components operating together to provide the functionality attributed herein to the computer system 102. For example, the computer system 102 may be implemented by a cloud of computing platforms operating together as the computer system 102.

The electronic storage 108 may comprise non-transitory storage media that electronically stores information. The electronic storage media of the electronic storage 108 may include one or both of system storage that is provided integrally (for example, substantially non-removable) with the computer system 102 or removable storage that is removably connectable to the computer system 102 via, for example, a port (for example, a USB port, a firewire port, etc.) or a drive (for example, a disk drive, etc.). The electronic storage 108 may include one or more of optically readable storage media (for example, optical disks, etc.), magnetically readable storage media (for example, magnetic tape, magnetic hard drive, floppy drive, etc.), electrical charge-based storage media (for example, EEPROM, RAM, etc.), solid-state storage media (for example, flash drive, etc.), and/or other electronically readable storage media. The electronic storage 108 may include one or more virtual storage resources (for example, cloud storage, a virtual private network, and/or other virtual storage resources). The electronic storage 108 may store software algorithms, information determined by the processors 106, information received from the computer system 102, information received from client computing platforms, or other information that enables the computer system 102 to function as described herein.

The processors 106 may be programmed to provide information processing capabilities in the computer system 102. As such, the processors 106 may include one or more of a digital processor, an analog processor, a digital circuit designed to process information, an analog circuit designed to process information, a state machine, and/or other mechanisms for electronically processing information. In some embodiments, the processors 106 may include a plurality of processing units. These processing units may be physically located within the same device, or the processors may represent processing functionality of a plurality of devices operating in coordination. The processors 106 may be programmed to execute computer program instructions to perform functions described herein of the subsystems 112-116, or other components. The processors 106 may be programmed to execute computer program instructions by software; hardware; firmware; some combination of software, hardware, or firmware; and/or other mechanisms for configuring processing capabilities on the processors 106.

A computer program on the computer system 102 may comprise an application runtime that can cause the computer system 102 to perform indicated tasks according to encoded instructions. The instructions may be any instructions (such as bytecode) for a software interpreter including, but not limited to, machine code instructions for the processors 106, scripting language source file, etc. In some cases, the instructions may be complied or interpreted instructions for which source code is not provided to the party developing ontologies. An executable (of the computer program) may be hand-coded in machine language directly or may be developed as source code in any high-level programming language or assembly language and then complied into either an executable machine code file or non-executable machine code object files. The executable program may further include a runtime system, which provides runtime language features and interactions with the runtime environment of the computer system 102. In one example, the runtime system of the executable program may be a logic program including a rule engine and a set of runtime rules that control the execution of the executable program. As an example, specialization of the executable program may be achieved by accessing supplemental information in a working memory at runtime without the need to modify the executable program (for example, reprogramming the source code and/or recompiling the source code of the executable program). For example, functionalities of any particular application or a class of applications in a particular domain of interest may be enabled on the executable program using one or more ontologies as will be described in detail below. In some embodiments, the executable program may be a logic program for executing functionalities of an application using the supplemental information. In another example, additional information may be retrieved or inferred by accessing other information (for example, represented as graphs (or subgraphs) described herein or other data representations) stored in a working memory at runtime and reconstructing the acyclic graphs (or subgraphs) into cyclic graphs (or subgraphs) via an executable program without requiring the cyclic graphs (or subgraphs) to be transmitted from the computer system 102 to a client device 104 or without requiring the computer system 102 to store cyclic graphs (or subgraphs). The working memory and executable program may be implemented in the computer system 102 or client device 104.

The ontology management subsystem 112 may perform various functions with respect to different types of ontologies in different embodiments. An ontology may be a machine-processable artifact that defines and captures the relationships between concepts (classes) and objects (individuals of such classes) in some domain of interest. A logic-based ontology language allows ontologies to be specified as logical theories, meaning that it is possible to reason about the relationships between the concepts and objects that are expressed in such an ontology.

Figure 2:
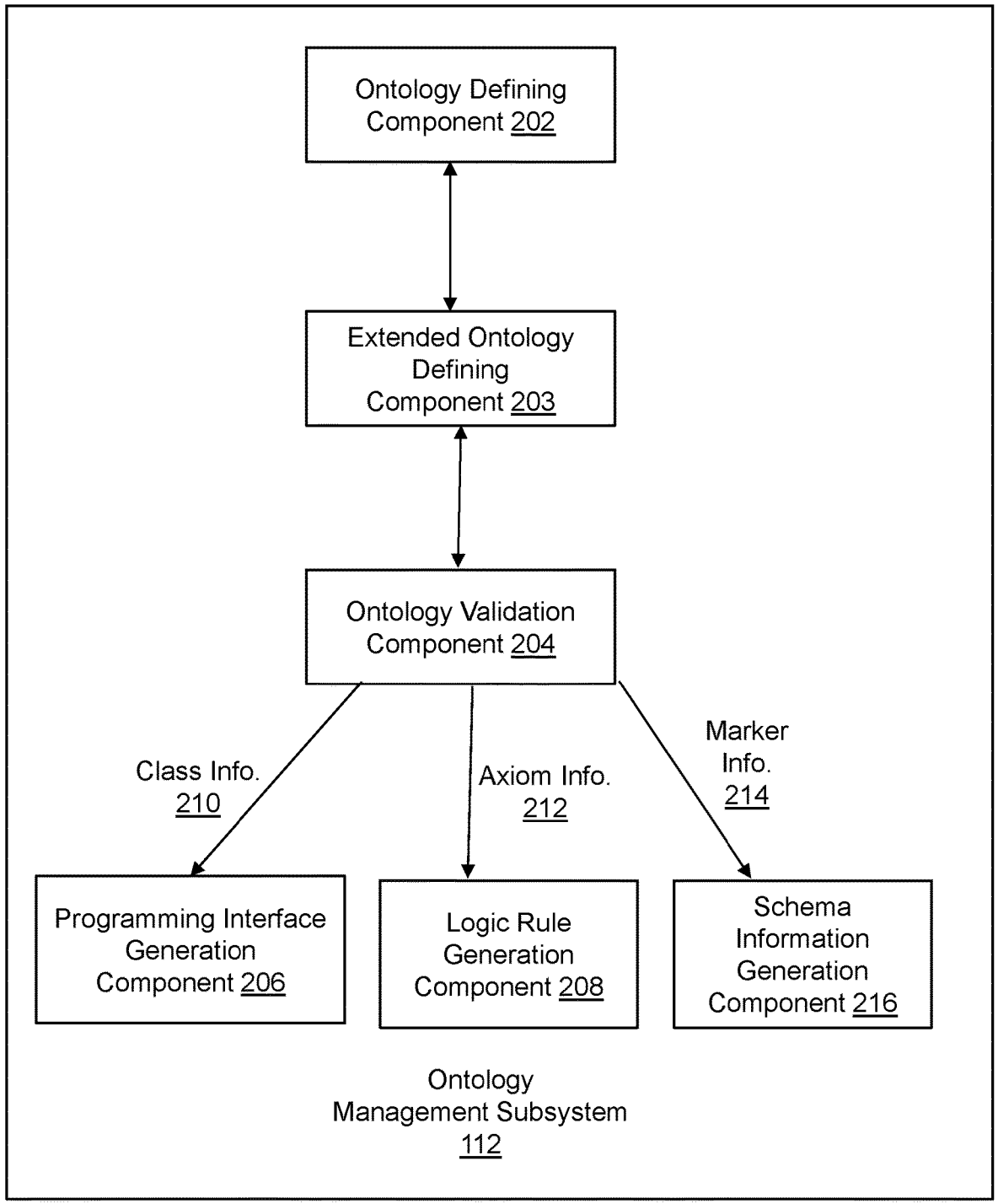
FIG. 2 shows an ontology management subsystem, in accordance with some embodiments.

Referring now to FIG. 2 (in which an ontology management subsystem 112 is shown), the ontology management subsystem 112 may include an ontology defining component 202 configured to define an ontology. The ontology may be defined in any logic-based ontology language or specific version of logic-based ontology language using any semantic editor. For example, the ontology management subsystem 112 may define and modify an ontology in Web Ontology Language DL 2.0 (OWL DL 2.0) using the Protégé ontology editor. An ontology (for example, a domain_ontology.owl file) may be defined as follows:

```
<?xml version="1.0"?>
<rdf:RDF xmlns="http://owl.reactivecore.com/domain#"
    xml:base="http://owl.reactivecore.com/domain"
    xmlns:domain="http://owl.reactivecore.com/domain#"
    xmlns:rdf="http://www.w3.org/1999/02/22-rdf-syntax-ns#"
    xmlns:owl="http://www.w3.org/2002/07/owl#"
    xmlns:xml="http://www.w3.org/XML/1998/namespace"
    xmlns:xsd="http://www.w3.org/2001/XMLSchema#"
    xmlns:rdfs="http://www.w3.org/2000/01/rdf-schema#">
    <owl:Ontology rdf:about="http://owl.reactivecore.com/domain"/>
    <!--
    ///////////////////////////////////////////////////////////////////
    // Data properties
    ///////////////////////////////////////////////////////////////////
    -->
    <owl:DatatypeProperty rdf:about="http://owl.reactivecore.com/domain#person_name">
        <rdf:type rdf:resource="http://www.w3.org/2002/07/owl#FunctionalProperty"/>
        <rdfs:domain rdf:resource="http://owl.reactivecore.com/domain#Person"/>
        <rdfs:range rdf:resource="http://www.w3.org/2001/XMLSchema#string"/>
    </owl:DatatypeProperty>
    <owl:DatatypeProperty rdf:about="http://owl.reactivecore.com/domain#dob">
        <rdf:type rdf:resource="http://www.w3.org/2002/07/owl#FunctionalProperty"/>
        <rdfs:domain rdf:resource="http://owl.reactivecore.com/domain#Person"/>
        <rdfs:range rdf:resource="http://www.w3.org/2001/XMLSchema#date"/>
    </owl:DatatypeProperty>
    <owl:DatatypeProperty rdf:about="http://owl.reactivecore.com/domain#hobby">
        <rdfs:domain rdf:resource="http://owl.reactivecore.com/domain#Person"/>
        <rdfs:range rdf:resource="http://www.w3.org/2001/XMLSchema#string"/>
    </owl:DatatypeProperty>
    <owl:DatatypeProperty rdf:about="http://owl.reactivecore.com/domain#address_type">
        <rdf:type rdf:resource="http://www.w3.org/2002/07/owl#FunctionalProperty"/>
        <rdfs:domain rdf:resource="http://owl.reactivecore.com/domain#Address"/>
        <rdfs:range rdf:resource="http://www.w3.org/2001/XMLSchema#string"/>
    </owl:DatatypeProperty>
    <owl:DatatypeProperty rdf:about="http://owl.reactivecore.com/domain#line1">
        <rdf:type rdf:resource="http://www.w3.org/2002/07/owl#FunctionalProperty"/>
        <rdfs:domain rdf:resource="http://owl.reactivecore.com/domain#Address"/>
        <rdfs:range rdf:resource="http://www.w3.org/2001/XMLSchema#string"/>
    </owl:DatatypeProperty>
    <owl:DatatypeProperty rdf:about="http://owl.reactivecore.com/domain#city">
        <rdf:type rdf:resource="http://www.w3.org/2002/07/owl#FunctionalProperty"/>
        <rdfs:domain rdf:resource="http://owl.reactivecore.com/domain#Address"/>
        <rdfs:range rdf:resource="http://www.w3.org/2001/XMLSchema#string"/>
    </owl:DatatypeProperty>
    <owl:DatatypeProperty rdf:about="http://owl.reactivecore.com/domain#zip">
        <rdf:type rdf:resource="http://www.w3.org/2002/07/owl#FunctionalProperty"/>
        <rdfs:domain rdf:resource="http://owl.reactivecore.com/domain#Address"/>
        <rdfs:range rdf:resource="http://www.w3.org/2001/XMLSchema#string"/>
    </owl:DatatypeProperty>
    <owl:DatatypeProperty rdf:about="http://owl.reactivecore.com/domain#estate_type">
        <rdf:type rdf:resource="http://www.w3.org/2002/07/owl#FunctionalProperty"/>
        <rdfs:domain rdf:resource="http://owl.reactivecore.com/domain#Estate"/>
        <rdfs:range rdf:resource="http://www.w3.org/2001/XMLSchema#string"/>
    </owl:DatatypeProperty>
    <owl:DatatypeProperty rdf:about="http://owl.reactivecore.com/domain#size">
        <rdf:type rdf:resource="http://www.w3.org/2002/07/owl#FunctionalProperty"/>
        <rdfs:domain rdf:resource="http://owl.reactivecore.com/domain#Estate"/>
        <rdfs:range rdf:resource="http://www.w3.org/2001/XMLSchema#integer"/>
    </owl:DatatypeProperty>
    <owl:DatatypeProperty rdf:about="http://owl.reactivecore.com/domain#purchase_date">
        <rdf:type rdf:resource="http://www.w3.org/2002/07/owl#FunctionalProperty"/>
        <rdfs:domain rdf:resource="http://owl.reactivecore.com/domain#Estate"/>
        <rdfs:range rdf:resource="http://www.w3.org/2001/XMLSchema#date"/>
    </owl:DatatypeProperty>
    <!--
    ///////////////////////////////////////////////////////////////////
    // Object properties
    ///////////////////////////////////////////////////////////////////
    -->
    <owl:ObjectProperty rdf:about="http://owl.reactivecore.com/domain#hasEstate">
        <rdfs:domain rdf:resource="http://owl.reactivecore.com/domain#Person"/>
        <rdfs:range rdf:resource="http://owl.reactivecore.com/domain#Estate"/>
    </owl:ObjectProperty>
    <owl:ObjectProperty rdf:about="http://owl.reactivecore.com/domain#hasAddress">
        <rdfs:domain rdf:resource="http://owl.reactivecore.com/domain#Estate"/>
```

-continued

```
    <rdfs:range rdf:resource="http://owl.reactivecore.com/domain#Address"/>
  </owl:ObjectProperty>
  <owl:ObjectProperty rdf:about="http://owl.reactivecore.com/domain#owner">
    <owl:inverseOf rdf:resource="http://owl.reactivecore.com/domain#hasEstate"/>
    <rdf:type rdf:resource="http://www.w3.org/2002/07/owl#FunctionalProperty"/>
    <rdfs:domain rdf:resource="http://owl.reactivecore.com/domain#Estate"/>
    <rdfs:range rdf:resource="http://owl.reactivecore.com/domain#Person"/>
  </owl:ObjectProperty>
  <!--
  ///////////////////////////////////////////////////////////////////////
  // Classes
  ///////////////////////////////////////////////////////////////////////
  -->
  <owl:Class rdf:about="http://owl.reactivecore.com/domain#Person"/>
  <owl:Class rdf:about="http://owl.reactivecore.com/domain#Estate"/>
  <owl:Class rdf:about="http://owl.reactivecore.com/domain#Address"/>
</rdf:RDF>
```

In different embodiments, various types of ontologies may be defined by the ontology management subsystem 112, such as an ontology describing a class of applications (a.k.a. a class ontology), for example, a BPM class ontology; an ontology that is associated with a specific domain of interest (a.k.a. a domain-specific ontology), for example, a human resource domain ontology; and an ontology that can interpret any domain-specific ontology (a.k.a. a general ontology), for example, a domain meta model ontology defined to describe the class structure of any domain-specific ontology. More examples of classes of applications and domains of interests are shown below in Table 1.

TABLE 1

| Class of Applications | Domain of Interest |
|---|---|
| Business Process Management (BPM) | Healthcare |
| Enterprise Resource Planning (ERP) | Finance and Banking |
| Claim Adjudication | Human Resource |
| Content Management System (CMS) | Manufacturing |
| Workforce Management | Distribution and Logistics |
| Customer Relationship Management (CRM) | Government and Public Sector |
| Call Center Management | Defense Industry |
| Master Data Management (MDM) | Automotive |
| Enterprise Asset Management (EAM) | Engineering |
| Supply Chain Management (SCM) | Insurance |
| Accounting Management | Media |
| Revenue Cycle Management (RCM) | Real Estate |
| Order and Fulfillment Management | Retail |
| Operation Management | Technology |
| Help Desk Management | Telecommunication |
|  | Transportation & Travel |
|  | Education |

It should be understood that multiple domains of interest (domain-specific verticals) may be applied to each class of applications. For example, each of the domains of interest listed in Table 1 that use computers may be applied to the Help Desk Management class of applications, and ERP software has applications in manufacturing, finance, banking, healthcare services, etc.

Figure 13:
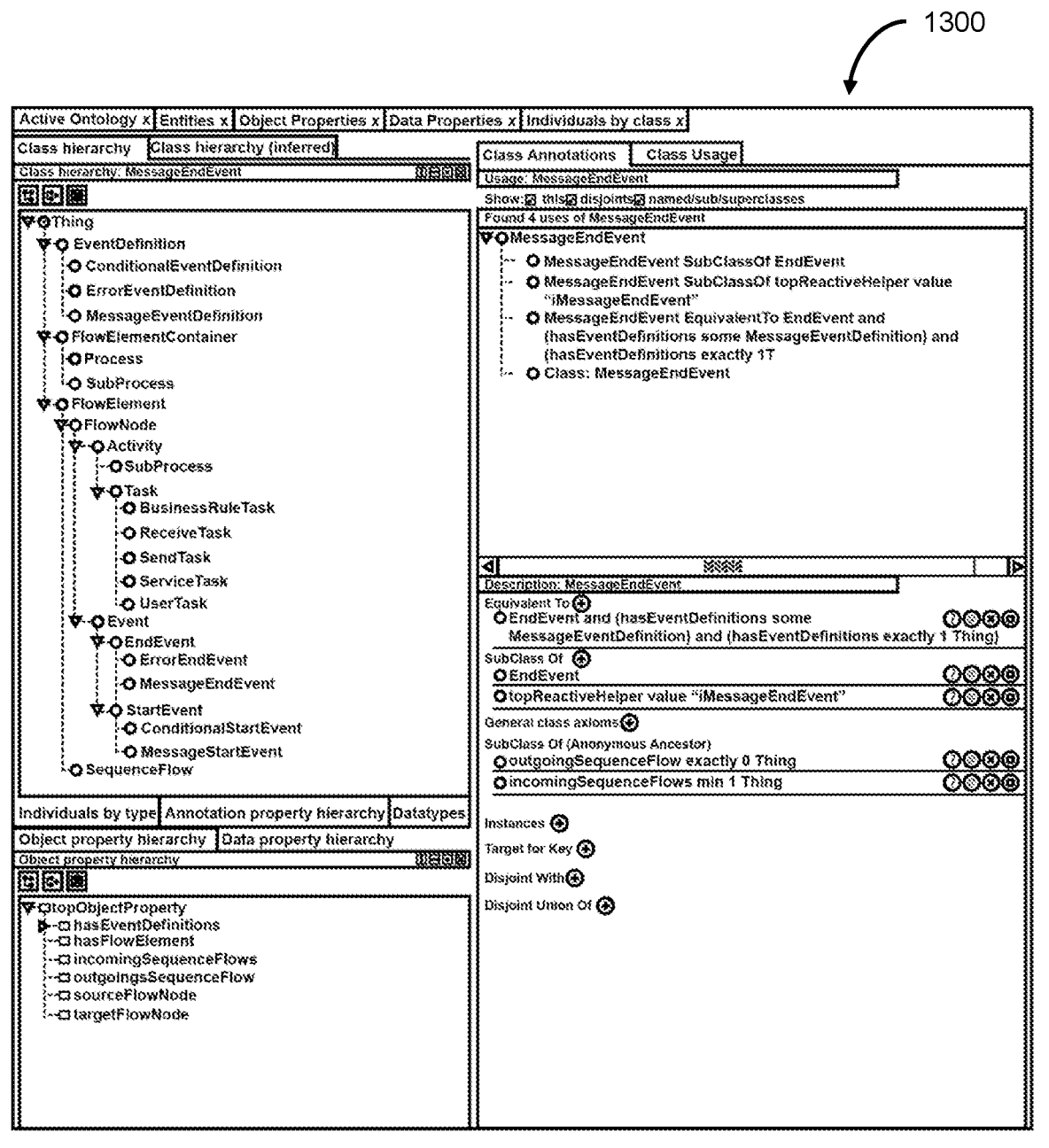
Figure 14:
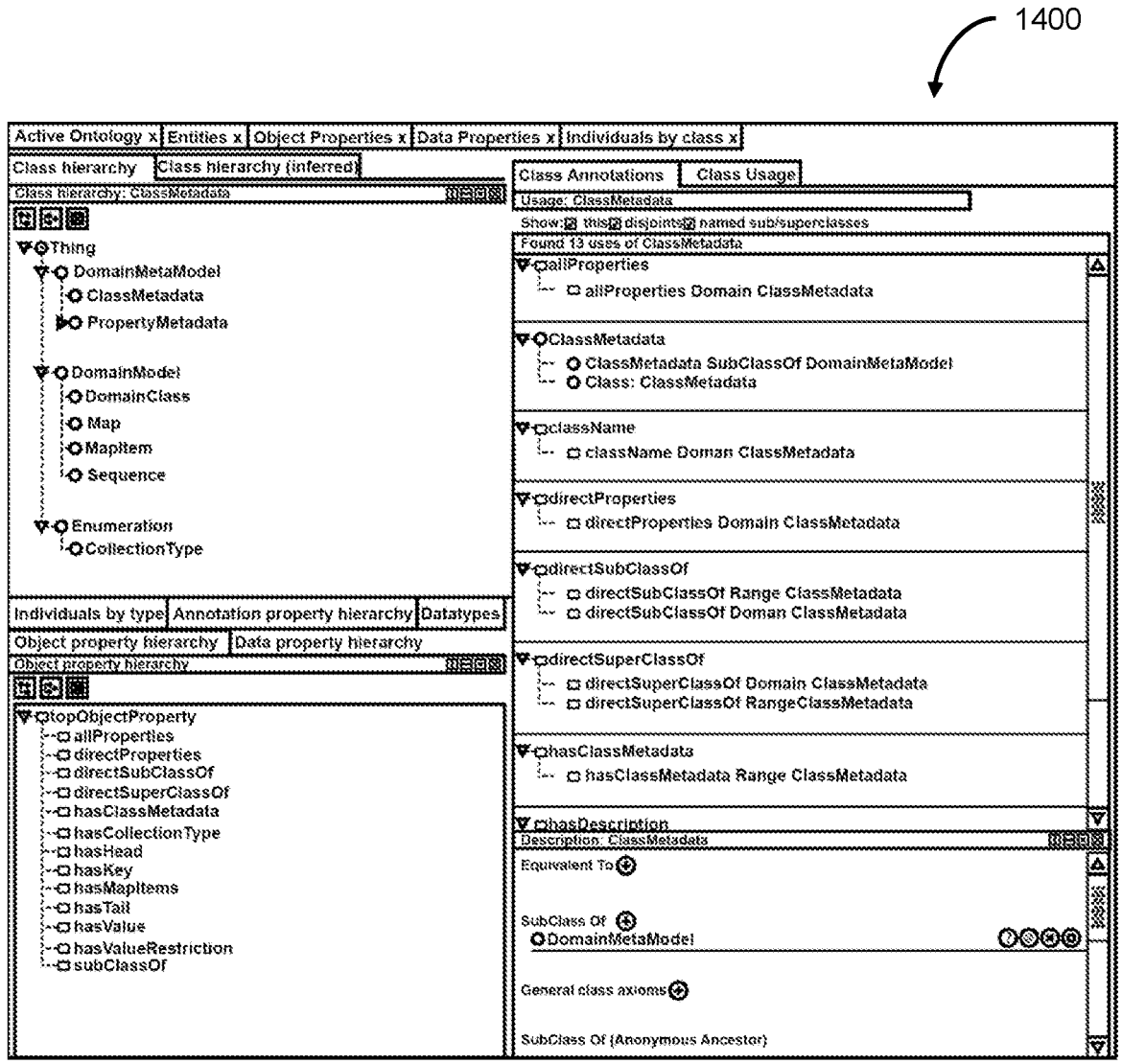
FIG. 14 shows a general ontology, in accordance with some embodiments.
Figure 15:
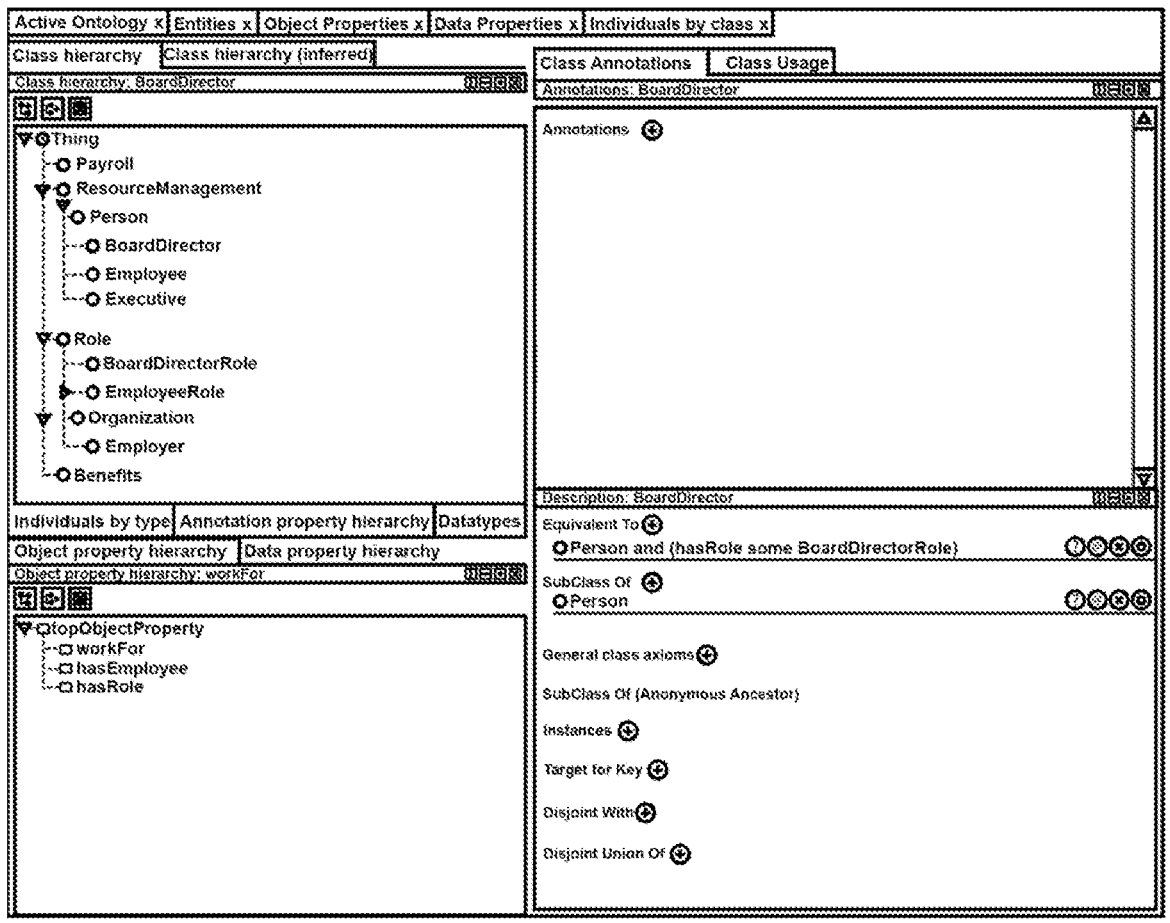
FIG. 15 shows a domain-specific ontology in the human resource domain, in accordance with some embodiments.

FIGS. 13-15 illustrate various examples of ontologies described in OWL DL 2.0 using the Protégé ontology editor. Each ontology includes information indicating various attributes, such as classes, properties, and axioms. FIG. 13 shows an extract of a class ontology 1300 describing the class of BPM applications. In this example, the BPMN 2.0 specification from the Object Management Group (OMG) is used as a guide for elaborating an ontology for the class of BPM applications. The ontology, being logic-based, embodies axioms contained the textual description of the BPMN specification. The class information, such as class hierarchy (class structure), is shown on the upper left section in FIG. 13; the property information is shown on the lower left section of FIG. 13. As an example, in FIG. 13, the axioms of class MessageEndEvent are shown in the lower right section. The first axiom is a class construct describing an equivalent class to the class MessageEndEvent: MessageEndEvent≡EndEvent and (hasEventDefinitions some MessageEventDefinition) and (hasEventDefinition exactly 1 Thing).

This axiom can be translated into plain language as: A MessageEndEvent is equivalent to EndEvent having a single EventDefinition of type MessageEventDefinition. Once the ontology is defined by the ontology defining component 202, it may be saved as a file in any suitable format, such as RDF/XML. RDF is a known data model for encoding metadata and knowledge on the Semantic Web using facts expressed as triples. For example, the definitions of the class MessageEndEvent may be described in the saved RDF/XML file as:

```
<owl:Class rdf:about="&bpmn;MessageEndEvent">
  <owl:equivalentClass>
    <owl:Class>
      <owl:intersectionOf rdf:parseType="Collection">
        <rdf:Description rdf:about="&bpmn;EndEvent"/>
        <owl:Restriction>
          <owl:onProperty rdf:resource="&bpmn;hasEventDefinitions"/>
          <owl:someValuesFrom rdf:resource="&bpmn;MessageEventDefinition"/>
        </owl:Restriction>
        <owl:Restriction>
          <owl:onProperty rdf:resource="&bpmn;hasEventDefinitions"/>
          <owl:cardinality rdf:datatype="&xsd;nonNegativeInteger">1</owl:cardinality>
        </owl:Restriction>
```

```
      </owl:intersectionOf>
    </owl:Class>
  </owl:equivalentClass>
  <rdfs:subClassOf rdf:resource="&bpmn;EndEvent"/>
  <rdfs:subClassOf>
    <owl:Restriction>
      <owl:onProperty rdf:resource="&bpmn;topReactiveHelper"/>
      <owl:hasValue>iMessageEndEvent</owl:hasValue>
    </owl:Restriction>
  </rdfs:subClassOf>
</owl:Class>
```

FIG. 14 shows an extract of a general ontology 1400 that can describe and interpret any domain-specific ontology. A domain-specific ontology may be described using metadata information. The metadata information may describe the domain-specific ontology class and property information. The structure of the metadata information may be itself described using a general ontology called the domain meta model ontology. The domain meta model ontology may not be modified and have no dependency on any domain-specific ontology. The domain meta model may become a known and explicit structure used by an executable program (for example, an ontology-configurable executable program) to interpret the structure of the domain-specific ontology. The key classes of this general ontology in FIG. 14 include ClassMetadata and PropertyMetadata describing the structure of class and property respectively.

FIG. 15 shows an extract of a domain-specific ontology 1500 that is associated with the human resource domain (a human resource domain-ontology). The human resource domain ontology may be described by instances of the domain meta model ontology shown in FIG. 14. For example, the ontology in FIG. 14 shows that a Person can be Employee, BoardDirector and Executive depending on the Role they have. It should be understood that FIGS. 13-15 show illustrative ontologies only and are by no means complete in order to describe the class of BPM applications, the domain meta model, and the human resource domain, respectively.

Further, with respect to FIG. 2, the ontology management subsystem 112 may also include an extended ontology defining component 203 configured to define an extended ontology. The ontology defined by the ontology defining component 202 may be extended (for example, extended_domain_ontology.owl) by mixing classes from a marker ontology or framework ontology (for example, rdv_core.owl) into the ontology. The marker ontology or the framework ontology includes information to select certain classes of the ontology to be marked as persisted class using a mechanism in the ontology constructs such as class inheritance or class annotation. The information to select certain classes of the ontology as a persisted class may include usage pattern of the class or the amount of data to be processed or stored. Accordingly, based on such information, certain classes of the ontology may be marked as a persisted class and thus, an extended ontology (with marked classes) may be defined by the extended ontology defining component 203. An extended ontology (for example, a extended_domain_ontology.owl file) may be defined as follows:

```
<?xml version="1.0"?>
<rdf:RDF xmlns="http://owl.reactivecore.com/ext_dom#"
    xml:base="http://owl.reactivecore.com/ext_dom"
    xmlns:rdv_core="http://owl.reactivecore.com/rdv-core#"
    xmlns:domain="http://owl.reactivecore.com/domain#"
    xmlns:ext_dom="http://owl.reactivecore.com/ext_dom#"
    xmlns:rdf="http://www.w3.org/1999/02/22-rdf-syntax-ns#"
    xmlns:owl="http://www.w3.org/2002/07/owl#"
    xmlns:xml="http://www.w3.org/XML/1998/namespace"
    xmlns:xsd="http://www.w3.org/2001/XMLSchema#"
    xmlns:rdfs="http://www.w3.org/2000/01/rdf-schema#">
    <owl:Ontology rdf:about="http://owl.reactivecore.com/ext_dom">
        <owl:imports rdf:resource="http://owl.reactivecore.com/rdv-core"/>
        <owl:imports rdf:resource="http://owl.reactivecore.com/domain"/>
    </owl:Ontology>
    <!--
    ///////////////////////////////////////////////////////////////////
    // Object properties
    ///////////////////////////////////////////////////////////////////
    -->
    <owl:ObjectProperty rdf:about="http://owl.reactivecore.com/ext_dom#hasEstate">
        <rdfs:subPropertyOf rdf:resource="http://owl.reactivecore.com/domain#hasEstate"/>
        <rdfs:domain rdf:resource="http://owl.reactivecore.com/ext_dom#Person"/>
        <rdfs:range rdf:resource="http://owl.reactivecore.com/ext_dom#Estate"/>
    </owl:ObjectProperty>
    <!--
    ///////////////////////////////////////////////////////////////////
    // Classes
    ///////////////////////////////////////////////////////////////////
    -->
    <owl:Class rdf:about="http://owl.reactivecore.com/ext_dom#Person">
        <rdfs:subClassOf rdf:resource="http://owl.reactivecore.com/domain#Person"/>
```

```
    <rdfs:subClassOf rdf:resource="http://owl.reactivecore.com/rdv-core#PersistedClassMarker"/>
  </owl:Class>
  <owl:Class rdf:about="http://owl.reactivecore.com/ext_dom#Estate">
    <rdfs:subClassOf rdf:resource="http://owl.reactivecore.com/domain#Estate"/>
    <rdfs:subClassOf rdf:resource="http://owl.reactivecore.com/rdv-core#PersistedClassMarker"/>
  </owl:Class>
  <owl:Class rdf:about="http://owl.reactivecore.com/ext_dom#Address">
    <rdfs:subClassOf rdf:resource="http://owl.reactivecore.com/domain#Address"/>
    <rdfs:subClassOf rdf:resource="http://owl.reactivecore.com/rdv-core#SupportEntity"/>
  </owl:Class>
</rdf:RDF>
```

As illustrated in the above example of an extended ontology, the classes "Person" and "Estate" are marked as a "PersistedClass," while the "Address" class is a "Support Entity," for example, by using class inheritance mechanism. Such marking of the classes of the ontology allows for decomposing a graph representation of data and generating a subgraph (for example, an acyclic subgraph) representation of the data, which will be described in more detail below.

With respect to FIG. 2, the ontology management subsystem 112 may also include an ontology validation component 204 configured to validate any ontology and assign a freeze to the validated ontology. In some embodiments, the ontology validation component 204 may include any semantic reasoners, such as Pellet, RacerPro, FaCT++, and HermiT, for ensuring an ontology is consistent once the ontology has been defined by the ontology defining component 202. An inconsistent ontology may be an ontology that, by virtue of what has been stated in the ontology, cannot have any models, and entails everything, meaning any conclusion can be deduced. Once the ontology and the extended ontology are complete (meaning they describes all the concepts, objects, their relationships, and axioms) and are ensured to be consistent, they may be frozen by the ontology validation component 204 such that the ontology and the extended ontology can no longer be changed or modified. If the ontology or the extended ontology need to be changed, they need to be redefined by the ontology defining component 202 and the extended ontology defining component 203 as new versions of the ontology and extended ontology. It should be noted that any types of ontologies defined by the ontology defining component 202 (and extended ontology defining component 203), for example, class ontologies, general ontologies, and domain-specific ontologies, may be validated and frozen by the ontology validation component 204.

The ontology management subsystem 112 in FIG. 2 may further include a programming interface generation component 206, a logic rule generation component 208, and a schema information generation component 216. The programming interface generation component 206 may extract class information 210 from a frozen ontology (for example, ontology or extended ontology) and generate, based on the extracted class information 210, a programming interface to allow an executable program (for example, an ontology-configurable executable program) to access the supplemental information via the programming interface or the subgraphs via the programming interface. An ontology (for example, ontology or extended ontology) may be processed by a computer program to extract class information 210 including, for example, the class structure (concept hierarchy), the data properties associated with each class, and the relationships, if any, shared between classes. The class information 210 may be used by the programming interface generation component 206 to generate computer code in any programming language, such as Scala, JAVA™, Python™, C++, C#, Ruby, etc., to be used as a programming interface for a class of applications and/or applications in a domain of interest. The programming interface referred herein may be computer code in a programming language that describes classes corresponding to the static structure of the ontology (for example, ontology or extended ontology) and that provides a natural interface to the executable program for accessing the supplemental information (for example, metadata of ontology class structures) stored in a working memory at runtime or other information (for example, represented as the subgraphs described herein or other data representations) stored in a working memory at runtime.

The logic rule generation component 208 in FIG. 2 may extract axiom information 212 from a frozen ontology (for example, ontology or extended ontology) and generate, based on the axiom information 212, a set of logic rules. The logic rules may be used to compute entailments on the instances of an ontology (for example, ontology or extended ontology). The entailments may include the inferred class and property hierarchy (asserted and inferred class membership of the instances), property restrictions as well as be used to ensure the asserted instances are consistent with the ontology (for example, ontology or extended ontology). That is, the logic rules may be used to transform ontology instances into application metadata information and used to validate ontology instances to ensure conformance of the instances with the ontology (for example, ontology or extended ontology). In some embodiments, an ontology instance is frozen, and its corresponding metadata information becomes read-only once the ontology instance has been validated by the logic rules generated by the logic rule generation component 208. In some embodiments, the logic rules may be used to reconstruct an acyclic graph (or an acyclic subgraph) into a cyclic graph (or a cyclic subgraph). Depending on the type of ontology (for example, ontology or extended ontology) from which the logic rules are generated, the logic rules may include class logic rules generated based on a class ontology, general logic rules generated based on a general ontology, and specific logic rules generated based on a domain-specific ontology. In some embodiments, only the class logic rules and general logic rules may be used for computing entailments on ontology instances and for validating ontology instances. The logic rules may be augmented with the runtime rules of the executable program to control the execution of the executable program. For example, the specific logic rules generated based on a domain-specific ontology may be applied to the domain-specific ontology instance by the executable program at runtime. As another example, the specific logic rules generated based on an extended ontology may be applied to an acyclic graph (or acyclic subgraph) of data by the executable program at runtime so as to reconstruct the acyclic graph (or acyclic subgraph) into a cyclic graph (or cyclic subgraph).

The schema information generation component 216 in FIG. 2 may extract the marker information 214 from an extended ontology (or a combined ontology+extended ontology) and generate, based on the marker information 214, schema information (or metadata). The marker information 214 includes information regarding the classes marked as "PersistedClass" and "SupportEntity," as discussed above, with regard to the extended ontology. This marker information (from the marker ontology or the framework ontology) is used to generate the schema information that includes a description of possible properties and expected range values for each class marked as "PersistedClass" and "SupportEntity." The schema information contains information on how to represent the instances of each of the classes of the extended ontology in a database (for example, a graph database). Schema information may be used to inform a database on how to store and how to manage the instances of each of the classes of the extended ontology. The schema information may be augmented with runtime rules and logic rules of the executable program to control the execution of the executable program. As an example, the schema information may be represented in the following j son notation:

```
{
  "schema_definition": {
    "support_entities": {
      "ext_dom:Address": {
        "properties": {
          "rdf:type": {
            "type": "array",
            "items": {
              "type": "symbol"
            }
          },
          "domain:address_type": {
            "type": "string"
          },
          "domain:city": {
            "type": "string"
          },
          "domain:line1": {
            "type": "string"
          },
          "domain:zip": {
            "type": "string"
          },
          "rdv_core:key": {
            "type": "string"
          }
        },
        "required": [
          "rdf:type"
        ]
      }
    },
    "persisted_data_types": {
      "ext_dom:Estate": {
        "properties": {
          "rdf:type": {
            "type": "array",
            "items": {
              "type": "symbol"
            }
          },
          "domain:estate_type": {
            "type": "string"
          },
          "domain:purchase_date": {
            "type": "date"
          },
          "domain:size": {
            "type": "integer"
          },
          "domain:hasAddress": {
            "type": "array",
            "items": {
              "type": "support",
              "class_name": "domain:Address"
            }
          },
          "rdv_core:key": {
            "type": "string"
          }
        },
        "required": [
          "rdf:type",
          "rdv_core:key"
        ]
      },
      "ext_dom:Person": {
        "properties": {
          "rdf:type": {
            "type": "array",
            "items": {
              "type": "symbol"
            }
          },
          "domain:dob": {
            "type": "date"
          },
          "domain:hobby": {
            "type": "array",
            "items": {
              "type": "string"
            }
          },
          "domain:person_name": {
            "type": "string"
          },
          "ext_dom:hasEstate": {
            "type": "array",
            "items": {
              "type": "proxy",
              "class_name": "ext_dom:Estate",
              "pdt_name": "ext_dom:Estate"
            }
          },
          "rdv_core:key": {
            "type": "string"
          }
        },
        "required": [
          "rdf:type",
          "rdv_core:key"
        ]
      }
    }
  }
}
```

Turning back to FIG. 1, the supplemental information generation subsystem 114 may generate supplemental information related to one or more functionalities of an application based on an instance of an ontology defined by the ontology management subsystem 112. In one use case, the instance may be from a class ontology and specify one of a class of applications (for example, a BPM application), and the supplemental information is related to functionalities of one of the BPM applications. In another use case, the instance may be from a general ontology (for example, a domain meta model ontology) and describe a domain-specific ontology (for example, the human resource domain), and the supplemental information is related to functionalities of an application in the human resource domain. An ontology instance may be described in any suitable format, such as in the forms of triples in the RDF/XML format. The supplemental information generated by the supplemental information generation subsystem 114 may include metadata information transformed from the ontology instance. Additionally or optionally, the logic rules generated by the logic rule generation component 208 of the ontology management subsystem 112 may be used by the supplemental information generation subsystem 114 to infer additional metadata information as part of the supplemental information. Supplemental information may be represented as a subgraph and the details discussed below with regard to graphs and subgraphs may also apply to supplemental information.

Figure 21:
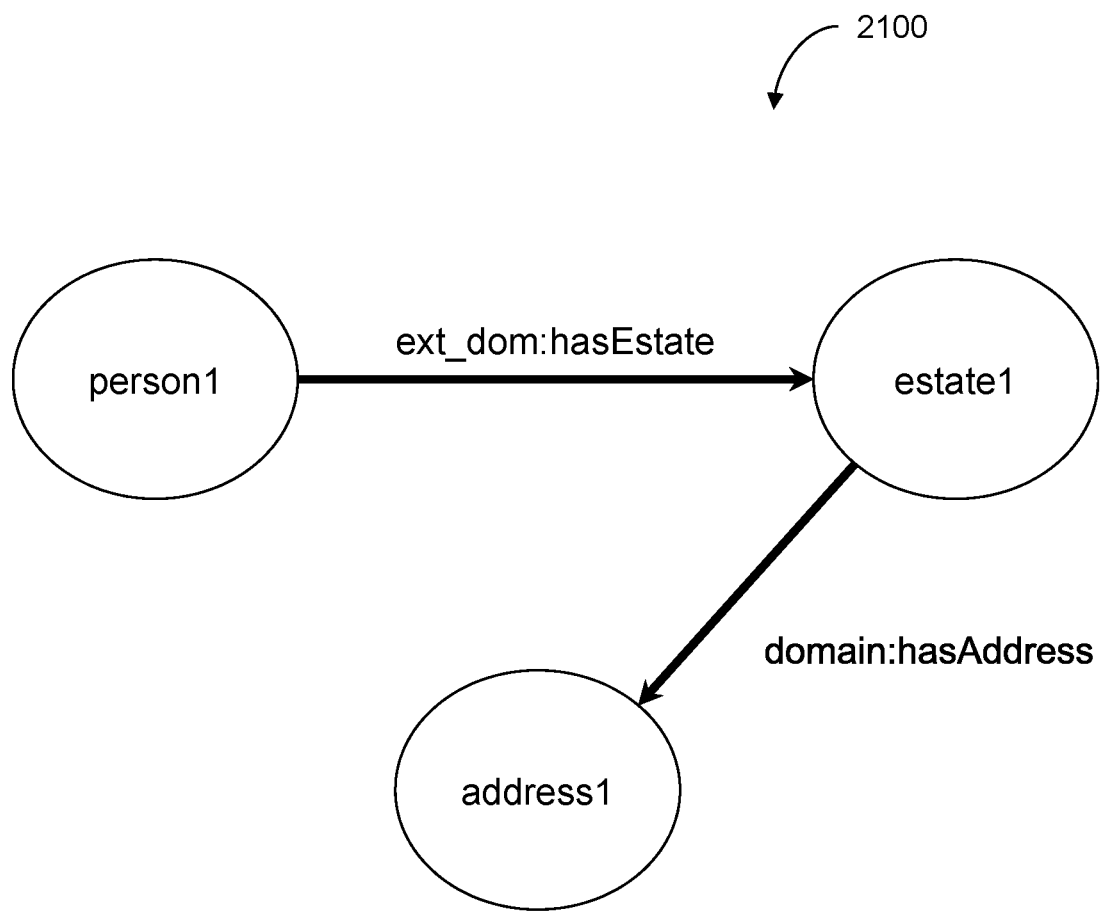
FIG. 21 shows a graph representation of input data, in accordance with some embodiments.
Figure 22:
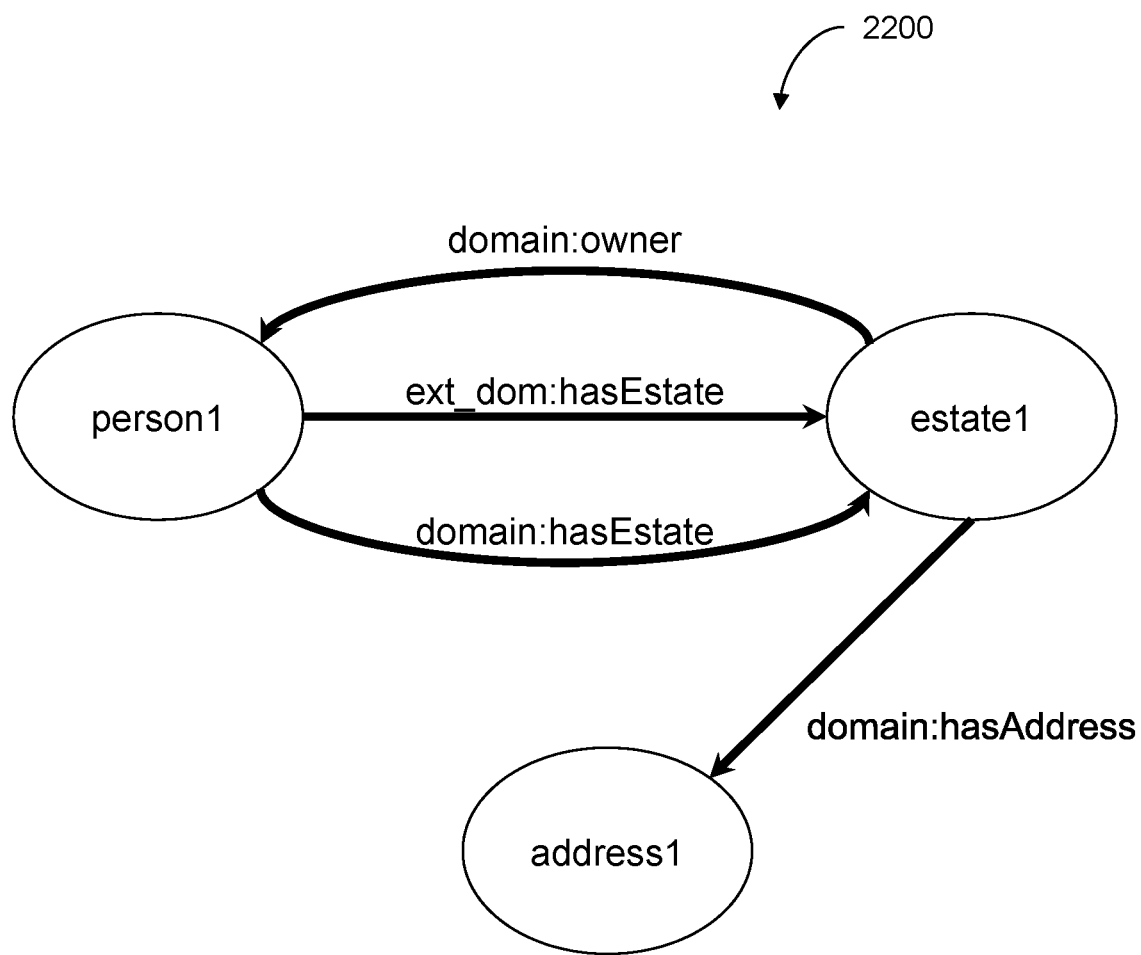
FIG. 22 shows another graph representation of input data, in accordance with some embodiments.

FIG. 1 also includes a graph generation subsystem 116. The graph generation subsystem 116 may map input data to the extended ontology, generate a graph representation (for example, a fact-based graph) of the input data (known as facts to the system) based on such mapping and augment the facts-based graph representation of the input data based on the application of logic rules associated with the extended ontology to generated another graph representation (for example, an augmented graph). The augmented graph may be a cyclic graph. The graph generation subsystem 116 may decompose the augmented graph, based on the marker information into a subgraph representation (for example, a set of subgraphs) of the input data, thereby generating a subgraph representation of the input data based on the extended ontology and the marker information. The subgraph representation of the input data may omit one or more pieces of information included in the augmented graph representation of the input data (the one or more pieces of information can be recovered by the application of the logic rules). The desired characteristics of these subgraphs is to be acyclic therefore, the augmented graph (which may be a cyclic graph) may be represented by a set of acyclic subgraphs. The graph representation 2100 of the input data (generated based on mapping of the input data to the extended ontology) in FIG. 21 is illustrated to include nodes "person1," "estate1," and "address1" and edges "ext_dom: hasEstate" and "domain:hasAddress." As illustrated in FIG. 21, the relationships (represented by edges of the graph) between the nodes are acyclic. Although the graph representation 2100 of the input data (the graph representation of the input data may also be referred to as a graph representation of instances of the classes of the extended ontology) is illustrated to be acyclic, it should be understood that such a graph representation may also be cyclic. In other words, the input data obtained by the graph generation subsystem 116 (either from an external device, for example, a network device 104, or from a memory of the computer system 102) may be acyclic or cyclic. FIG. 22 illustrates a cyclic graph representation 2200 of the input data. Such a graph representation 2200 illustrated in FIG. 22 may be generated based on the application of logic rules (which are derived from the axioms of the ontology and/or the extended ontology) to the graph representation 2100 illustrated in FIG. 21. The graph representation 2200 in FIG. 22 is illustrated to include nodes "person1," "estate1," and "address1" and edges "ext_dom: hasEstate," "domain:owner," "domain:hasEstate," and "domain:hasAddress." As illustrated in FIG. 22, the relationships (represented by edges of the graph) between the nodes are cyclic in nature. For example, a plurality of relationships between nodes "person1" and "estate1" are illustrated, which indicates the cyclic nature of this graph. The graph representation of the input data in FIG. 21 does not include two relationships (namely, domain:owner" and "domain:hasEstate") that are illustrated in the graph representation in FIG. 22. FIG. 22 illustrates instances of FIG. 21 with augmented information derived by applying the logic rules derived from the axioms of the ontology and/or the extended ontology. The application of logic rules to subgraphs and graphs to generate larger subgraphs or graphs is discussed below with regard to FIG. 3. The same details discussed below with regard to FIG. 3 are applicable with regard to the generation of graph representations discussed above and below.

Figure 23:
FIG. 23 shows a subgraph representation of input data, in accordance with some embodiments.

Further, the graph generation subsystem 116 may decompose the generated augmented graph representation 2200 into a set of subgraphs of the input data illustrated in FIG. 23. The decomposition of the graph representation 2200 results in the generation of a subgraph representation (which includes subgraphs 2302 and 2304) illustrated in FIG. 23. Such decomposition is performed such that the augmented graph (for example, FIG. 22) can be reconstructed by applying the logic rules on the union of the subgraphs based on marker information described above with regard to FIG. 2. In other words, the graph generation subsystem 116 recognizes, based on the marker information (and/or the logic rules), that the two relationships (namely, domain: owner" and "domain:hasEstate") between "person1" and "estate1," may be reconstructed using logic rules. The subgraph representation (including subgraphs 2304 and 2302) of the data are stored in one or more databases. As illustrated in FIG. 23, the subgraph representation omits at least one piece of information from the graph representation 2200 illustrated in FIG. 22. Although the nodes in FIGS. 22 and 23 are labeled "person1" and "estate1," it should be understood that the information contained in the nodes in these figures may be different. For example, node "estate1" in FIG. 23 may include information associated with node "address1," which may not be the case for the node "estate1" in FIG. 22 An advantage of storing acyclic subgraphs in a database (as opposed to a cyclic graph/subgraph) is that the data storage subsystem can take advantage of the fact that the subgraphs are acyclic graphs. Additionally, utilization of computer and communication resources for transmission and reception of an acyclic graph (or subgraph) may be reduced due to smaller size of the acyclic graphs (or subgraphs), as compared to the resources required for transmission and reception of the cyclic graphs (or subgraphs). Accordingly, the use of such acyclic graphs (or subgraphs) may make it more efficient to retrieve or infer information. For illustrative purposes, a subgraph may be defined as being rooted at a specific node. For example, in the graph illustrated in FIG. 23, a first subgraph may be rooted at node "person1" and a second subgraph may be rooted at node "estate1." Each of these subgraphs rooted at a particular node in FIG. 23 is marked as a persisted data type by definition.

Figure 3:
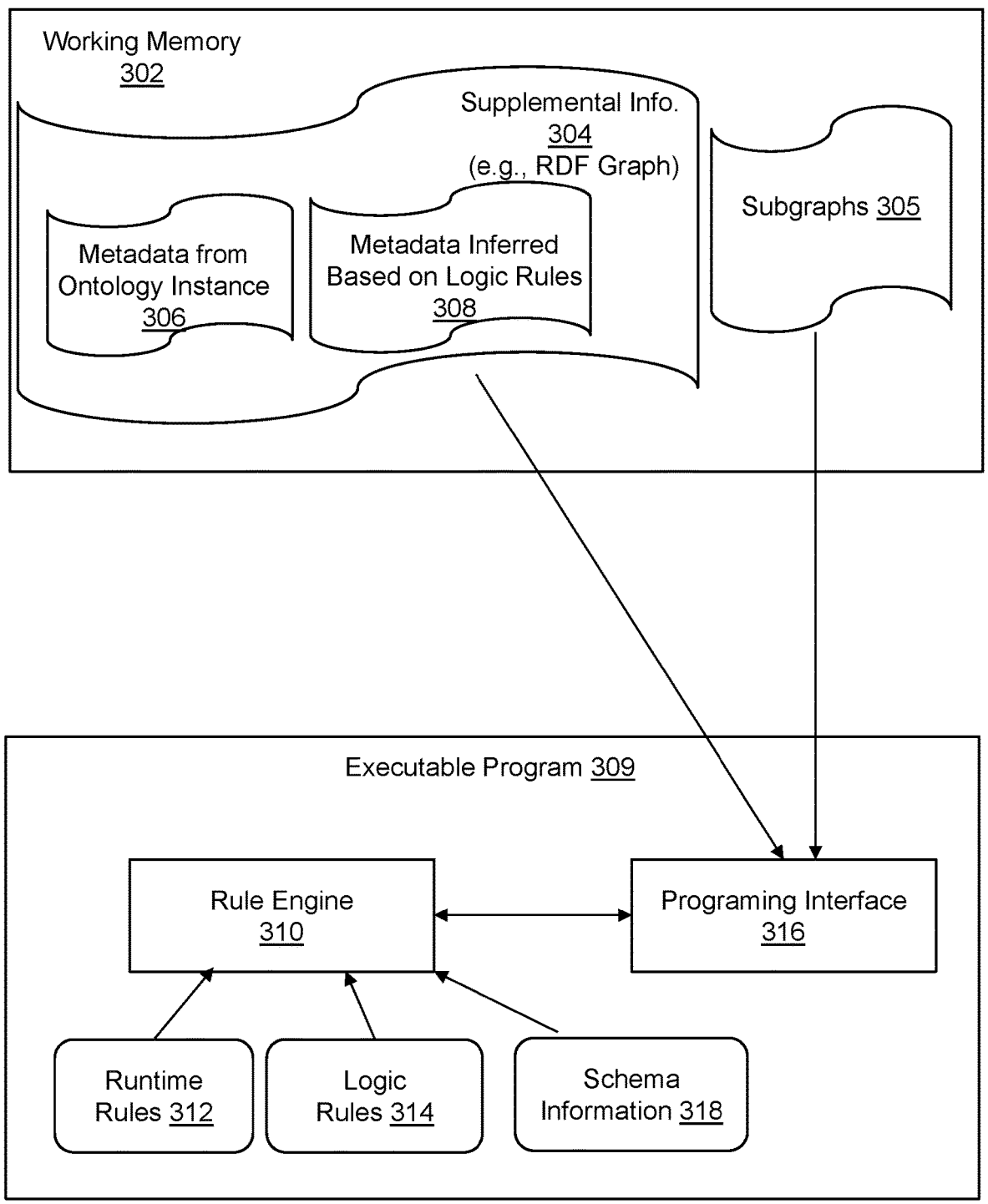
FIG. 3 shows an executable program that accesses supplemental information or other information (for example, represented as subgraphs or other data representations) in a working memory at runtime, in accordance with some embodiments.

Referring to FIG. 3, in some embodiments, the supplemental information 304 includes metadata in a graph data structure, such as an RDF graph, stored in a working memory 302. The supplemental information 304 may include metadata 306 transformed directly from an ontology instance and metadata 308 inferred from an ontology instance based on the logic rules generated by the logic rule generation component 208 of the ontology management subsystem 112. For metadata 306, it may include facts, for example, objects (or individuals) of the classes, asserted by a class ontology, which can be used to describe a particular application in the class of applications corresponding to the class ontology. Metadata 306 may include facts, for example, objects (or individuals) of the classes, asserted by a general ontology (for example, a domain meta model ontology) that can be used to describe and interpret any domain-specific ontology. For metadata 308, it may include entailments computed from objects in metadata 306 using the logic rules. The entailments may include the verification that the objects are consistent with the axioms of the ontology, meaning that no axioms are violated. Both metadata 306 and 308 may be augmented using the logic rules to form the supplemental information 304 that is related to functionalities of an application.

In FIG. 3, an executable program 309 may include a rule engine 310 that manipulates the supplemental information 304 in the working memory 302 at runtime via the programming interface 316 based on a set of rules including the runtime rules 312 and logic rules 314. As mentioned above, the programming interface 316 may be generated by the programming interface generation component 206 of the ontology management subsystem 112. The programming interface 316 may include computer code in a programming language describing the class structures that are used by the supplemental information 304 in the working memory 302. The executable program 309 can thus get access to the metadata 306, 308 via the programming interface 316. The logic rules 314 used by the rule engine 310 may include class logic rules, general logic rules, and specific logic rules generated from corresponding types of ontologies, each of which may be utilized for controlling the executable program 309 to access corresponding information. The runtime rules 312, on the other hand, may not alter the supplemental information 304 in any way and provide control capability to the executable program 309. The runtime rules 312 may be utilized for controlling the executable program 309 to access context information of executing the executable program 309. Accordingly, by placing different supplemental information 304 corresponding to functionalities of different applications in the working memory 302 and applying the programming interface 316 and logic rules 314 generated from the corresponding ontologies, the executable program 309 can be specialized with different functionalities without the need of adding or modifying computer code.

Further, FIG. 3 illustrates that a working memory 302 may include subgraphs 305 (for example, subgraphs generated by the graph generation subsystem 116, as discussed above). The working memory 302 and executable program 309 may be implemented at the computer system 102 or client device 104. These subgraphs 305 may be retrieved from one or more databases in the computer system 102 based on a query. For example, a query (including one or more uniform resource identifiers (URI)) may be received by the computer system 102, for example, from a client device 104, and in response to such a query, subgraphs 305 may be retrieved. The subgraphs may correspond to a subset of the graph (for example, a graph representation of instances of classes of an extended ontology) stored in one or more databases. The subgraphs 305 may be queried using an arangoDB query language (AQL), cypher query language, graphQL, Gremlin, or SPARQL. For example, the subgraphs 305 may correspond to subgraphs illustrated in FIG. 23 or subgraphs of the graph representation 2100 illustrated in FIG. 21.

In some embodiments, each of the subgraphs of the graph representation of the instances of the classes of the extended ontology may be associated with a URI. Accordingly, based on the URI included in the query, one or more subgraphs may be retrieved from the database. As an example, FIG. 23 illustrates two subgraphs (subgraph 2304 rooted at node "person1" and subgraph 2302 rooted at node "estate1") that may be retrieved based on a query, and these subgraphs may be stored in a working memory 302. Additionally, or alternatively, as noted above, a graph representation 2100 may be generated based on a mapping of the input data to an extended ontology and subgraphs of this graph representation 2100 may be loaded onto the working memory 302.

Further, in some embodiments, an executable program 309 may include a rule engine 310 that may manipulate subgraphs 305 at runtime via the programming interface 316 based on a set of rules (including the runtime rules 312 and logic rules 314) and the schema information 318. As mentioned above, the programming interface 316 may be generated by the programming interface generation component 206 of the ontology management subsystem 112. The programming interface 316 may include computer code in a programming language describing the class structures that are used by the subgraphs 305 in the working memory 302. The executable program 309 can thus get access to the subgraphs 305 via the programming interface 316. The logic rules 314 used by the rule engine 310 may include class logic rules, general logic rules, and specific logic rules generated from corresponding types of ontologies, each of which may be utilized for controlling the executable program 309 to access (or retrieve or infer) corresponding information, for example, by reconstructing the subgraphs 305 into a graph (or larger subgraphs). The runtime rules 312, on the other hand, may not alter the subgraphs 305 in any way and provide control capability to the executable program 309. The runtime rules 312 may be utilized for controlling the executable program 309 to access context information of executing the executable program 309. The schema information 318 may also be used by the rule engine 310 for controlling the executable program 309 to access (or retrieve or infer) corresponding information, for example, by reconstructing the subgraphs into a graph (or larger subgraphs). For example, by applying the logic rules 314 and the schema information 318 to the acyclic subgraphs illustrated in FIG. 23, a cyclic graph (or larger cyclic subgraphs) (for example, FIG. 22) may be reconstructed.

For example, the following set of triples representing subgraph 2302 rooted at "estate1" may be stored in one or more databases:

(estate1, domain:estate_type, "primary_home")
(estate1, domain:purchase_date, "2015-May-15")
(estate1, domain:size, "1200")
(estate1, domain: hasAddress, address1)
(estate1, rdf:type, domain:Estate)
(estate1, rdf:type, ext_dom:Estate)
(estate1, rdf:type, owl:Thing)
(estate1, rdf:type, rdv_core:PersistedClassMarker)
(estate1, rdf:type, rdv_core:RdvEntity)
(estate1, rdv_core:key, "estate1")
(estate1, rdv_core:persisted_data_type, "ext_dom:Estate")
(address1, rdf:type, domain:Address)
(address1, rdf:type, owl:Thing)
(address1, rdf:type, rdv_core:RdvEntity)
(address1, rdf:type, rdv_core:SupportEntity)

Further, the following set of triples representing subgraph 2304 rooted at "person1" may be stored in one or more databases:

(estate1, rdf:type, domain:Estate)
(estate1, rdf:type, ext_dom:Estate)
(estate1, rdf:type, owl:Thing)

-continued

```
(estate1, rdf:type, rdv_core:PersistedClassMarker)
(estate1, rdf:type, rdv_core:ProxyDataEntityMarker)
(estate1, rdf:type, rdv_core:RdvEntity)
(estate1, rdv_core:key, "estate1")
(person1, domain:dob, "1970-Jan-27")
(person1, domain:hobby, "Hiking")
(person1, domain:hobby, "Skiing")
(person1, domain:person_name, "John Doe")
(person1, ext_dom:hasEstate, estate1)
(person1, rdf:type, domain:Person)
(person1, rdf:type, ext_dom:Person)
(person1, rdf:type, owl:Thing)
(person1, rdf:type, rdv_core:PersistedClassMarker)
(person1, rdf:type, rdv_core:RdvEntity)
(person1, rdv_core:key, "person1")
(person1, rdv_core:persisted_data_type, "ext_dom:Person")
```

The rule engine 310 may utilize and apply the logic rules 314 and schema information 318 to subgraph 2304 to generate a set of entailments (inferred information): (estate1, domain:owner, person1) and (person1, domain:hasEstate, estate1). Accordingly, based on such inferred information and based on the triples representing subgraphs 2302 and 2304 stored in one or more databases, a cyclic graph (or larger cyclic subgraphs) may be reconstructed. FIG. 22 illustrates a cyclic graph (or larger cyclic subgraphs) that may be reconstructed based on the application of logic rules 314 and schema information 318 to the subgraphs 2302 and 2304 in FIG. 23.

Accordingly, by providing one or more acyclic subgraphs as an input to an executable program 309 and applying logic rules 314, runtime rules 312, and schema information 318 by the executable program 309, the acyclic subgraph (or acyclic graph) may be reconstructed into a cyclic graph (or cyclic subgraph) such that the cyclic graph (or cyclic subgraph) comprises one or more pieces of information omitted (for example, the set of entailments noted above) from the acyclic subgraph (or acyclic graph). In other words, the application of the logic rules 314, runtime rules 312, and schema information 318 by the executable program 309 causes the acyclic subgraphs (as illustrated in FIG. 23) to be augmented with inferred information from the axioms of the extended ontology embodied in the logic rules 314 to obtain the cyclic graph (or larger cyclic subgraphs), as illustrated in FIG. 22, such that the cyclic graph (or larger cyclic subgraphs) in FIG. 22 comprises one or more pieces of information omitted from the acyclic subgraphs illustrated in FIG. 23. FIG. 22 may comprise one or more pieces of information derived from the input facts using the axioms embodied in the extended domain ontology (for example, the triple (estate1, domain:owner, person1) is inferred from (person1, domain:hasEstate, estate1) which was inferred from the input fact (person1, ext_dom:hasEstate, estate1) using the axioms that ext_dom:hasEstate is a sub-property of domain:hasEstate and domain:owner is the inverse property of domain:hasEstate. This allows a cyclic graph (or larger cyclic subgraphs) to be made available via the executable program 309, for example, at the client device 104 without actually providing the cyclic graph (or larger cyclic subgraphs) to the client device 104 from the computer system 102. Accordingly, based on the acyclic subgraphs provided to the executable program, additional information may be retrieved (or inferred).

FIG. 22 comprises one or more pieces of information omitted (for example, the "domain:owner" and "domain:hasEstate" edges connecting the "person1" node and the "estate1" node illustrated in FIG. 22) from the acyclic subgraphs illustrated in FIG. 23. This allows a cyclic graph (or larger cyclic subgraphs) to be made available via the executable program 309, for example, at the client device 104 without actually providing the cyclic graph (or larger cyclic subgraphs) to the client device 104 from the computer system 102. Accordingly, based on the acyclic subgraphs provided to the executable program, additional information may be retrieved (or inferred). The node "address1" (which is not illustrated in FIG. 23) may be embedded in the "estate1" node as a support entity in FIG. 23.

Additionally, or alternatively, additional information may be retrieved (or inferred) based on input data received by the computer system 102 or client device 104. In the example discussed above, acyclic subgraphs are retrieved based on a query and cyclic graph (or larger cyclic subgraphs) are reconstructed based on the application of logic rules. However, instead of a query, input data may be received and in response to the received input data, the graph generation subsystem 116 may map the input data to the extended ontology in order to generate a graph representation of the input data. For example, input data may be expressed as the following triples:

```
(address1, domain:address_type, "location")
(address1, domain: city, "Belleville")
(address1, domain:line1, "1250 main st")
(address1, domain:zip, "12345")
(address1, rdf:type, ext_dom:Address)
(estate1, domain:estate_type, "primary_home")
(estate1, domain: hasAddress, address1)
(estate1, domain:purchase_date, "2015-May-15")
(estate1, domain:size, "1200")
(estate1, rdf:type, ext_dom:Estate)
(person1, domain:dob, "1970-Jan-27")
(person1, domain:hobby, "Hiking")
(person1, domain:hobby, "Skiing")
(person1, domain:person_name, "John Doe")
(person1, ext_dom:hasEstate, estate1)
(person1, rdftype, ext_dom:Person)
```

In some embodiments, this input data may be mapped to the extended ontology, and a result of the mapping (for example, the generation of the graph representation 2100) is illustrated in FIG. 21. In FIG. 21 the input data may be mapped such that the input data may be represented by three nodes ("person1," "estate1," and "address1") and two edges ("ext_dom:hasEstate" and "domain:has Address"). These subgraphs in FIG. 21 may be stored in the working memory 302 and based on the application of logic rules 314, runtime rules 312, and schema information 318, a graph (or larger subgraphs), as illustrated in FIG. 22, may be reconstructed. Based on the application of logic rules 314, runtime rules 312, and schema information 318, the following data may be inferred:

```
(address 1, rdf:type, domain:Address)
(address 1, rdf:type, owl:Thing)
(address 1, rdf:type, rdv_core:RdvEntity)
(address 1, rdf:type, rdv_core:SupportEntity)
(estate1, domain:owner, person1)
(estate1, rdf:type, domain :Estate)
(estate1, rdf:type, owl:Thing)
(estate1, rdf:type, rdv_core:PersistedClassMarker)
(estate1, rdf:type, rdv_core:RdvEntity)
(person 1, domain:hasEstate, estate1)
```

(person 1, rdf:type, domain :Person)
(person 1, rdf:type, owl:Thing)
(person 1, rdf:type, rdv_core:PersistedClassMarker)
(person 1, rdf:type, rdv_core:RdvEntity)

In some embodiments, based on the combination of the input data and the inferred data, a cyclic graph (or larger cyclic subgraphs), as illustrated in FIG. 22, may be reconstructed (created or obtained).

As noted above, in some embodiments, once the cyclic graph (or larger cyclic subgraphs), as illustrated in FIG. 22, is generated, this cyclic graph (or larger cyclic subgraphs) may be decomposed (or segmented) into two acyclic subgraphs by omitting information certain pieces of information. Such acyclic subgraphs may be generated by the graph generation subsystem 116 based on schema information (for example, based on the marker ontology or the framework ontology) and based on logic rules. For example, a first cyclic subgraph rooted as estate1 may be generated based on the following triples:

(estate1, domain:estate type, "primary_home")
(estate1, domain:purchase_date, "2015-May-15")
(estate1, domain:size, "1200")
(estate1, rdf:type, domain:Estate)
(estate1, rdf:type, ext_dom:Estate)
(estate1, rdf:type, owl:Thing)
(estate1, rdf:type, rdv_core:PersistedClassMarker)
(estate1, rdf:type, rdv_core:RdvEntity)
(estate1, rdv_core:key, "estate1")
(estate1, rdv_core:persisted_data_type, "ext_dom:Estate")
(estate1, domain: hasAddress, address1)
(address1, domain:address_type, "location")
(address1, domain: city, "Belleville")
(address1, domain:line1, "1250 main st")
(address1, domain:zip, "12345")
(address1, rdf:type, ext_dom:Address)
(address1, rdf:type, domain:Address)
(address1, rdf:type, owl:Thing)
(address1, rdf:type, rdv_core:RdvEntity)
(address1, rdf:type, rdv_core:SupportEntity)

Further, a second cyclic subgraph rooted at person1 may be generated based on the following triples:

(estate1, rdf:type, domain:Estate)
(estate1, rdf:type, ext dom:Estate)
(estate1, rdf:type, owl:Thing)
(estate1, rdf:type, rdv_core:PersistedClassMarker)
(estate1, rdf:type, rdv_core:ProxyDataEntityMarker)
(estate1, rdf:type, rdv_core:RdvEntity)
(estate1, rdv_core:key, "estate 1")
(person1, domain:dob, "1970-Jan-27")
(person1, domain:hobby, "Hiking")
(person1, domain:hobby, "Skiing")
(person1, domain:person_name, "John Doe")
(person1, ext dom:hasEstate, estate1)
(person1, rdf:type, domain:Person)
(person1, rdf:type, ext_dom:Person)
(person1, rdf:type, owl:Thing)
(person1, rdf:type, rdv_core:PersistedClassMarker)
(person1, rdf:type, rdv_core:RdvEntity)
(person1, rdv core:key, "person1")
(person1, rdv core:persisted_data _type, "ext_dom:Person")

And by omitting the following triples:

(estate1, domain:owner person1)
(person1, domain:hasEstate, estate1)

The resulting two acyclic subgraphs (for example, subgraph 2304 rooted at node "person1" and subgraph 2302 rooted at node "estate1") generated based on such omitted information is illustrated in FIG. 23. It should be noted that the "domain:owner" and "domain:hasEstate" edges connecting the "person1" node and the "estate1" node (as illustrated in FIG. 22) have been omitted from the subgraph 2304 in FIG. 23, reducing the subgraph 2304 to be acyclic, as this omitted information can be recreated based on the application of the logic rules and schema information discussed above.

These decomposed or segmented subgraphs may be stored in one or more databases and as a result, the database may be updated based on these subgraphs. Decomposing or segmenting the cyclic graphs into acyclic graphs has several advantages. For one, storing and manipulating an acyclic graph in a database (as opposed to a cyclic graph) can be done more efficiently than using cyclic graphs. Additionally, utilization of computer and communication resources for transmission and reception of an acyclic graph (or subgraph) may be reduced due to smaller size of the acyclic graphs (or subgraphs), as compared to the resources required for transmission and reception of the cyclic graphs (or subgraphs). Accordingly, the use of such acyclic graphs (or subgraphs) may make it more efficient to store and retrieve (or infer) information as it saves memory space since redundant information can be recreated using the logic rules. Flowcharts associated with this portion of the disclosure are described starting with FIG. 24.

It should be appreciated that the description of the functionality provided by the different subsystems 112-116 described herein is for illustrative purposes only, and is not intended to be limiting, as any of subsystems 112-116 may provide more or less functionality than is described. For example, additional subsystems may be programmed to perform some or all of the functionality attributed herein to one of subsystems 112-116.

The system 100 may further comprise a client device 104 (or multiple client devices 104). A client device 104 may comprise any type of mobile terminal, fixed terminal, or other device. By way of example, a client device 104 may comprise a desktop computer, a notebook computer, a netbook computer, a tablet computer, a smartphone, a navigation device, an electronic book device, a gaming device, or other user device. Users may, for instance, utilize one or more client devices 104 to interact with computer system 102 or other components of system 100. The users may include administrative users such as managers or programmers who manage the subsystems 112-116. The users may also include customers who use ontology-configurable programs and applications derived thereof.

Attention will now be turned to a more detailed description of various embodiments comprising one or more features related to providing ontology-configurable computer programs and/or supplemental functionalities for computer programs via ontology instances. It should be noted that features described herein may be implemented separately or in combination with one another.

Functionalities Provided Via a Class Ontology Instance

Figure 4:
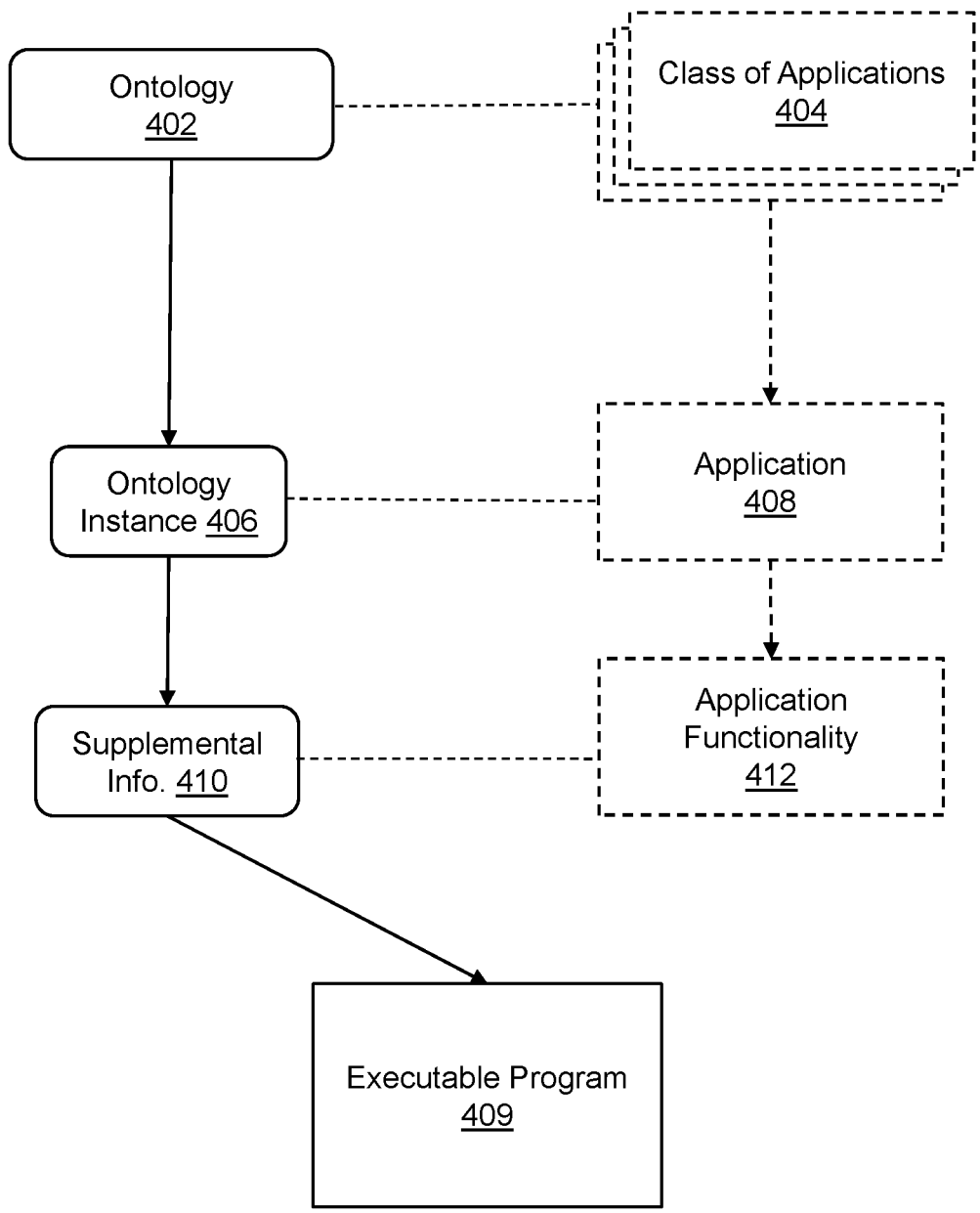
FIG. 4 shows a process of providing supplemental functionalities for a computer program via an instance of an ontology describing a class of applications, in accordance with some embodiments.
Figure 5:
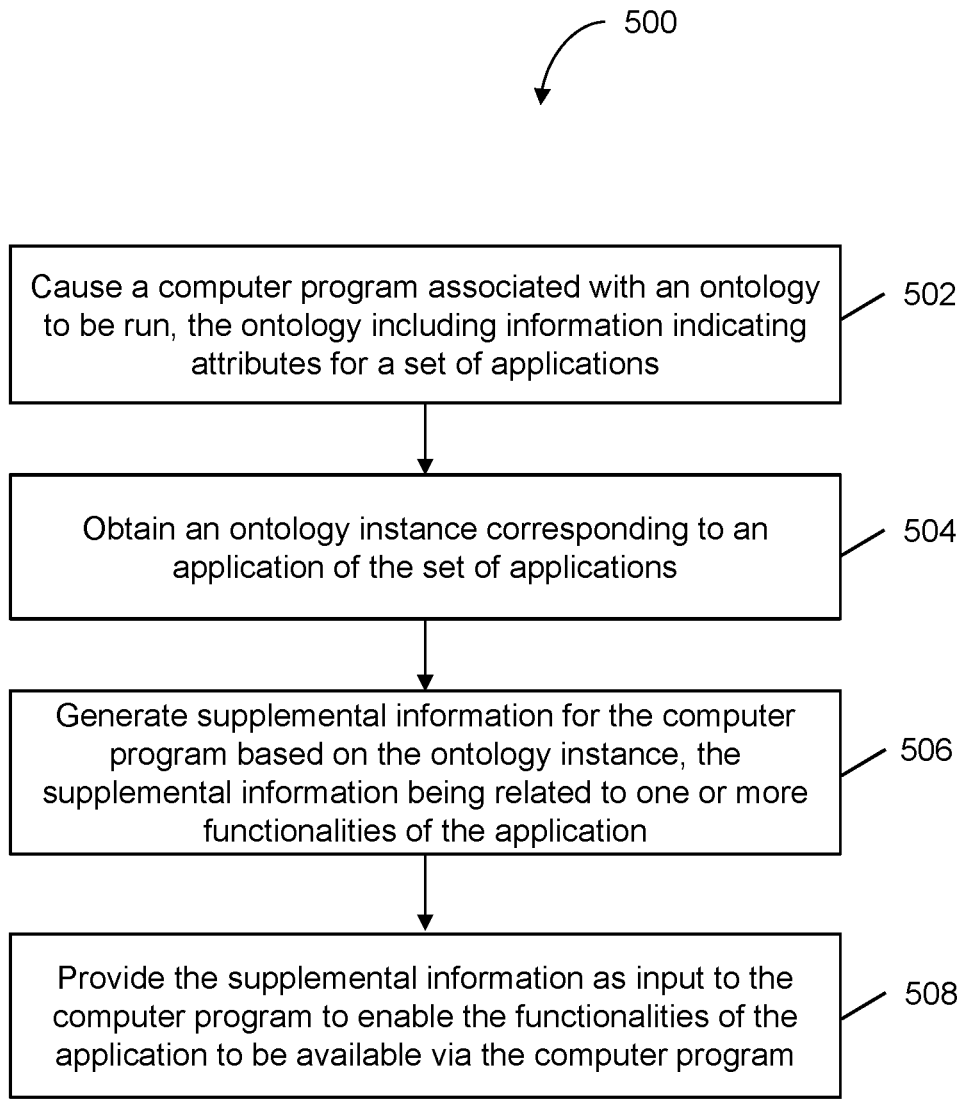
FIG. 5 is a flowchart of a method of providing supplemental functionalities for a computer program via an instance of an ontology describing a class of applications, in accordance with some embodiments.
Figure 6:
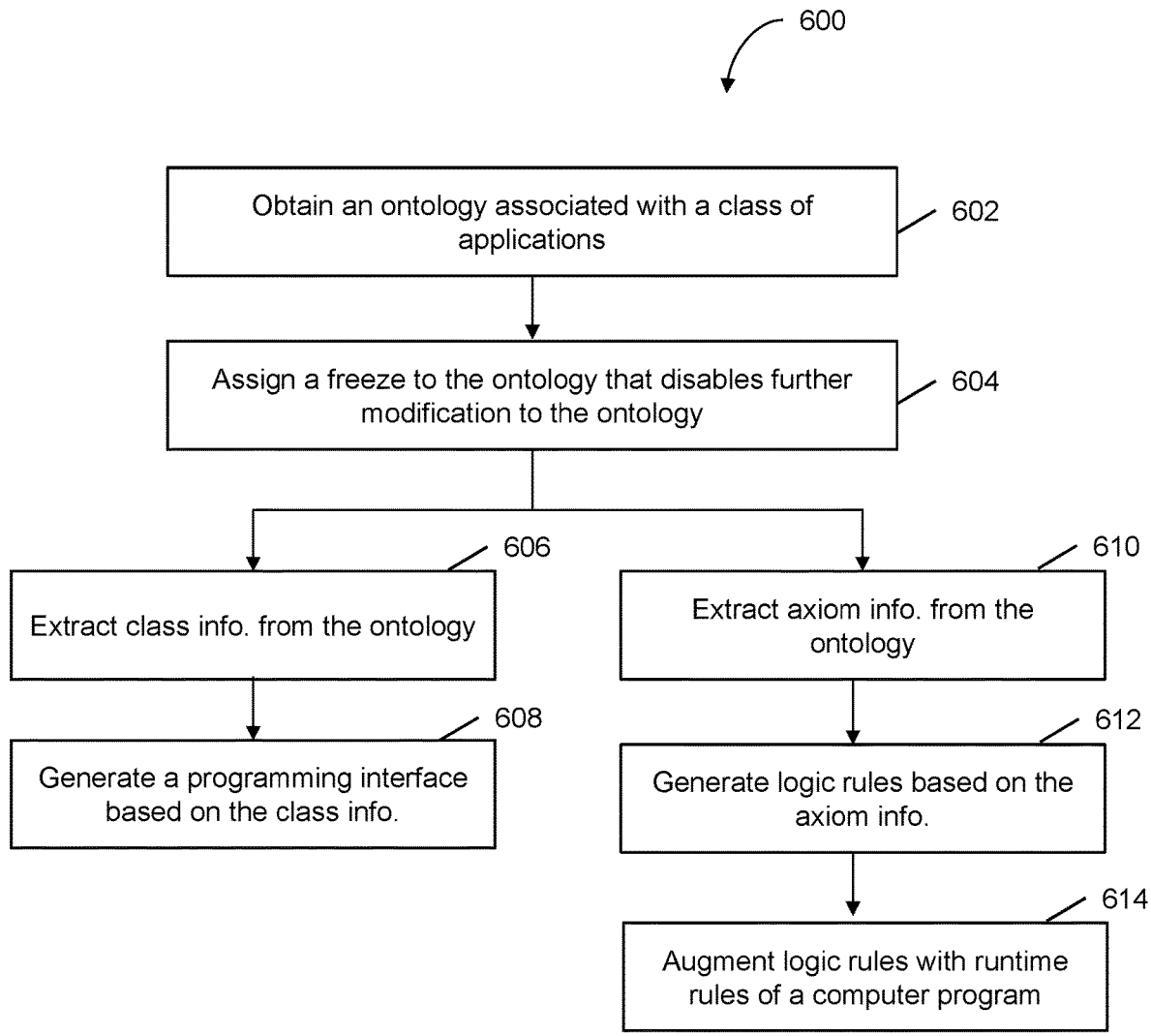
FIG. 6 is a flowchart of a method of generating a programming interface and logic rules based on an ontology describing a class of applications, in accordance with some embodiments.

FIGS. 4-6 illustrate one aspect of the invention, which can provide supplemental functionalities for an executable program via a class ontology instance. FIGS. 4-6 further describe the design and creation of a class of applications by the use of a class ontology. The ontology describes the class of applications, and, at runtime, instances of the ontology are used as metadata for specifying a particular application.

As shown in FIG. 4, an ontology 402 (a class ontology) describes a class of applications 404, such as the classes listed in Table 1. For example, a BPM class ontology may embody all of the axioms contained in the textual description of the BPMN specification. An example BPM class ontology has been described above with respect to FIG. 13. As mentioned above, both class information and axiom information may be extracted from a class ontology and used to generate the programming interface and logic rules, respectively. Following the BPM class ontology example described in FIG. 13, the BPM class ontology in the format RDF/XML may be processed by a computer program to generate classes in programming languages equivalent to the static structure of the BPM class ontology. For example, the class in Scala programming language representing the MessageEndEvent class in RDF/XML is:

```
object MessageEndEventCriteria {
    def apply(m: Model) = new MessageEndEventCriteria(m, List( (m.owl.owlResource.rdfType,
m.rn.MessageEndEvent) ))
}
class MessageEndEventCriteria(m: Model, l: List[(topengine.api.rdf.Resource,
topengine.api.rdf.Resource)]) extends topengine.api.owl.Criteria(l) {
    def addTopReactiveHelper(o: String) = new MessageEndEventCriteria(m,
(m.rn.topReactiveHelper, m.rdfSession.createLiteral(o)) :: criteria)
    def addHasEventDefinitions(o: EventDefinition) = new MessageEndEventCriteria(m,
(m.rn.hasEventDefinitions, o.s) :: criteria)
    def addIncomingSequenceFlows(o: SequenceFlow) = new MessageEndEventCriteria(m,
(m.rn.incomingSequenceFlows, o.s) :: criteria)
    def addOutgoingSequenceFlow(o: SequenceFlow) = new MessageEndEventCriteria(m,
(m.rn.outgoingSequenceFlow, o.s) :: criteria)
}
object MessageEndEvent {
    def apply(m: Model, s: topengine.api.rdf.Resource) = {
        new MessageEndEventImpl(m, m.createInstanceOf(s, m.rn.MessageEndEvent))
    }
    def createInstance(m: Model) = new MessageEndEventImpl(m,
m.createInstanceOf(m.rn.MessageEndEvent))
    def createNamedInstance(m: Model, name: String) = new MessageEndEventImpl(m,
m.createNamedInstanceOf(name, m.rn.MessageEndEvent))
    def asMessageEndEvent(m: Model, s: topengine.api.rdf.Resource): Option[MessageEndEvent]
= {
        if(m.isInstanceOf(s, m.rn.MessageEndEvent)) Some(MessageEndEvent(m, s))
        else None
    }
    def find(m: Model): Iterable[MessageEndEvent] =
m.findCustomSubject(m.rn.MessageEndEvent, MessageEndEventCriteria(m), {r =>
MessageEndEvent.asMessageEndEvent(m.bpmn, r) match {
        case Some(c) => c
        case None => throw topengine.api.TopEngineException("MessageEndEvent.find has
subject(s) that are not type MessageEndEvent") }})
    def find(m: Model, criteria: MessageEndEventCriteria): Iterable[MessageEndEvent] =
m.findCustomSubject(m.rn.MessageEndEvent, criteria, {r =>
MessageEndEvent.asMessageEndEvent(m.bpmn, r) match {
        case Some(c) => c
        case None => throw topengine.api.TopEngineException("MessageEndEvent.find has
subject(s) that are not type MessageEndEvent") }})
}
trait MessageEndEvent extends EndEvent {
    val s: topengine.api.rdf.Resource
    // Properties
}
class MessageEndEventImpl(m: Model, s: topengine.api.rdf.Resource) extends
topengine.api.owl.ThingImpl(m.owl, s) with MessageEndEvent {
    // Base classes
    def asEndEvent: EndEvent = EndEvent(m.bpmn, s)
    def asEvent: Event = Event(m.bpmn, s)
    def asFlowNode: FlowNode = FlowNode(m.bpmn, s)
    def asFlowElement: FlowElement = FlowElement(m.bpmn, s)
    def as Thing: topengine.api.owl.Thing = topengine.api.owl.Thing(m.owl, s)
    // Properties
    // topReactiveHelper is a Datatype Functional Property, range is String
    def topReactiveHelper: Option[String] = m.hasObjectAsLiteral(s, m.rn.topReactiveHelper)
map { _.getString }
    def setTopReactiveHelper(o: String) = m.setFunctionalPropertyValue(s,
m.rn.topReactiveHelper, o)
```

```
// hasEventDefinitions is an Object Property
   def hasEventDefinitions: Iterable[EventDefinition] = m.rdfSession.getCustomObjects(s,
m.rn.hasEventDefinitions, {r => EventDefinition.asEventDefinition(m.bpmn, r) match {
      case Some(c) => c
      case None => throw
topengine.api.TopEngineException("MessageEndEvent.hasEventDefinitions has object(s) that
are not type EventDefinition") }})
   def addHasEventDefinitions(o: EventDefinition) = m.addPropertyValue(s,
m.rn.hasEventDefinitions, o.s)
   def removeHasEventDefinitions(o: EventDefinition) = m.removePropertyValue(s,
m.rn.hasEventDefinitions, o.s)
   def removeAllHasEventDefinitions = m.removePropertyValue(s, m.rn.hasEventDefinitions)
// incomingSequenceFlows is an Object Property
   def incomingSequenceFlows: Iterable[SequenceFlow] = m.rdfSession.getCustomObjects(s,
m.rn.incomingSequenceFlows, {r => SequenceFlow.asSequenceFlow(m.bpmn, r) match {
      case Some(c) => c
      case None => throw
topengine.api.TopEngineException("MessageEndEvent.incomingSequenceFlows has object(s)
that are not type SequenceFlow") }})
   def addIncomingSequenceFlows(o: SequenceFlow) = m.addPropertyValue(s,
m.rn.incomingSequenceFlows, o.s)
   def removeIncomingSequenceFlows(o: SequenceFlow) = m.removePropertyValue(s,
m.rn.incomingSequenceFlows, o.s)
   def removeAllIncomingSequenceFlows = m.removePropertyValue(s,
m.rn.incomingSequenceFlows)
// outgoingSequenceFlow is an Object Property
   def outgoingSequenceFlow: Iterable[SequenceFlow] = m.rdfSession.getCustomObjects(s,
m.rn.outgoingSequenceFlow, {r => SequenceFlowasSequenceFlow(m.bpmn, r) match {
      case Some(c) => c
      case None => throw
topengine.api.TopEngineException("MessageEndEvent.outgoingSequenceFlow has object(s) that
are not type SequenceFlow") }})
   def addOutgoingSequenceFlow(o: SequenceFlow) = m.addPropertyValue(s,
m.rn.outgoingSequenceFlow, o.s)
   def removeOutgoingSequenceFlow(o: SequenceFlow) = m.removePropertyValue(s,
m.rn.outgoingSequenceFlow, o.s)
   def removeAllOutgoingSequenceFlow = m.removePropertyValue(s,
m.rn.outgoingSequenceFlow)
   override def equals(o: Any) = o match {
      case that: topengine.api.owl.ThingImpl => that.s.key == s.key
      case => false
   }
   override def hashCode = s.key
}
```

The generated class provides a natural interface to executable programs written in Scala programming language for accessing supplemental information (for example, metadata) stored in a working memory. The class MessageEndEvent-Impl is the generated implementation class that performs the access to the underlying supplemental information, for example, in RDF graph.

The generated classes in the programming language may capture the static data model embodied by the ontology. The axioms may be taken into consideration by logic rules that are applied to the supplemental information continuously as data is added to or subtracted from the supplemental information. The logic rules may be generated automatically from the BPM class ontology described in FIG. 13. For example, the logic rules corresponding to the class equivalence axiom for the class MessageEndEvent are:

```
# bpmn:MessageEndEvent is equivalent to the following conjunction:
   [n=bpmn52, s=100]:
   (?s rdf:type bpmn:EndEvent).
   (?s bpmn:hasEventDefinitions ?o). (?o rdf:type
bpmn:MessageEventDefinition).
   [?s test_cardinality_bpmn_res:8]
   ->
   (?s rdf:type bpmn:MessageEndEvent)
```

Back to FIG. 4, an instance 406 of the class ontology 402 may be obtained from the class ontology 402. The ontology instance 406 may specify an application 408 in the class of applications 404. Following the BPM class ontology example described in FIG. 13, a sample human resource employee on-boarding process may be specified as an instance of the example BPM class ontology, and thus, the employee on-boarding application is a member of the class of BPM applications. The on-boarding process described herein is for illustrative purposes only and is not meant to be complete. The process includes an instance of bpmn:Process class having a single bpmn:FlowElement of type bpmn:StartEvent. This start event has an event definition of type bpmn:MessageEventDefinition. The event definition defines the mapping elements for the message initiating the business process. In this example, it defines the mapping for the first and last name of the employee. The example employee on-boarding process may be expressed as individuals of the example BPM class ontology and can be expressed as an OWL document in the RDF/XML format:

```
<!-- http://owl.reactivecore.com/topreactive/sample/bpmn/acme-bpmn-
hr#iAcmeOnboardingProcess -->
    <owl:NamedIndividual rdf:about="&acme-bpmn-hr;iAcmeOnboardingProcess">
        <rdf:type rdf:resource="&bpmn;Process"/>
        <bpmn:hasFlowElement rdf:resource="&acme-bpmn-hr;iAcmeStartOnboarding"/>
    </owl:NamedIndividual>
    <!-- http://owl.reactivecore.com/topreactive/sample/bpmn/acme-bpmn-
hr#iAcmeStartOnboarding -->
    <owl:NamedIndividual rdf:about="&acme-bpmn-hr;iAcmeStartOnboarding">
        <rdf:type rdf:resource="&bpmn;StartEvent"/>
        <bpmn:hasEventDefinitions rdf:resource="&acme-bpmn-
hr;iStartOnboardingMessageDefinition"/>
    </owl:NamedIndividual>
    <!-- http://owl.reactivecore.com/topreactive/sample/bpmn/acme-bpmn-
hr#iFirstNameMappingElm -->
    <owl:NamedIndividual rdf:about="&acme-bpmn-hr;iFirstNameMappingElm">
        <rdf:type rdf:resource="&bpmn;MappingElement"/>
        <bpmn:sourceFieldName>GivenName</bpmn:sourceFieldName>
        <bpmn:targetFieldName>hr:firstName</bpmn:targetFieldName>
        <bpmn:targetFieldType>xsd:string</bpmn:targetFieldType>
        <bpmn:sourceFieldType>xsd:string</bpmn:sourceFieldType>
    </owl:NamedIndividual>
    <!-- http://owl.reactivecore.com/topreactive/sample/bpmn/acme-bpmn-
hr#iLastNameMappingElm -->
    <owl:Namedindividual rdf:about="&acme-bpmn-hr;iLastNameMappingElm">
        <rdf:type rdf:resource="&bpmn;MappingElement"/>
        <bpmn:targetFieldType>xsd:string</bpmn:targetFieldType>
        <bpmn:targetFieldName>hr:lastName</bpmn:targetFieldName>
        <bpmn: sourceFieldName>FamilyName</bpmn:sourceFieldName>
        <bpmn: sourceFieldType>xsd:string</bpmn:sourceFieldType>
    </owl:NamedIndividual>
    <!-- http://owl.reactivecore.com/topreactive/sample/bpmn/acme-bpmn-
hr#iStartOnboardingMessageDefinition -->
    <owl:NamedIndividual rdf:about="&acme-bpmn-hr;iStartOnboardingMessageDefinition">
        <rdf:type rdf:resource="&bpmn;MessageEventDefinition"/>
        <bpmn:hasEventDefinitions rdf:resource="&acme-bpmn-hr;iFirstNameMappingElm"/>
        <bpmn:hasEventDefinitions rdf:resource="&acme-bpmn-hr;iLastNameMappingElm"/>
    </owl:NamedIndividual>
```

In FIG. 4, supplemental information 410 may be generated based on the ontology instance 406. The supplemental information 410 may be related to functionalities 412 of the application 408 in the class of applications 404. As mentioned above with respect to FIG. 3, the supplemental information 410 may include metadata transformed from the ontology instance 406 and metadata inferred from the ontology instance 406 using logic rules generated based on the class ontology 402. The supplemental information 410 may be provided as input to an executable program 409 at runtime so as to enable the application functionalities 412 to be available via the executable program 409. As mentioned above with respect to FIG. 3, the programming interface generated based on the class ontology 402 may be provided to the executable program 409 for accessing the supplemental information 410 in the working memory at runtime.

Following the BPM class ontology example described in FIG. 13, the ontology instance 406 defining the employee on-boarding process may be expressed as triples in the working memory:

```
(acme-bpmn-hr:iAcmeOnboardingProcess, rdf:type, bpmn:Process)
(acme-bpmn-hr:iAcmeOnboardingProcess, rdf:type, owl:NamedIndividual)
(acme-bpmn-hr:iAcmeOnboardingProcess, bpmn:hasFlowElement, acme-bpmn-
hr:iAcmeStartOnboarding)
(acme-bpmn-hr:iAcmeStartOnboarding, rdf:type, bpmn:StartEvent)
(acme-bpmn-hr:iAcmeStartOnboarding, rdf:type, owl:NamedIndividual)
(acme-bpmn-hr:iAcmeStartOnboarding, bpmn:hasEventDefinitions, acme-bpmn-
hr:iStartOnboardingMessageDefinition)
(acme-bpmn-hr:iStartOnboardingMessageDefinition, rdf:type, bpmn:iMessageEventDefinition)
(acme-bpmn-hr:iStartOnboardingMessageDefinition, rdf:type, owl:NamedIndividual)
(acme-bpmn-hr:iStartOnboardingMessageDefinition, bpmn:hasEventDefinitions, acme-bpmn-
hr:iFirstNameMappingElm)
(acme-bpmn-hr:iStartOnboardingMessageDefinition, bpmn:hasEventDefinitions, acme-bpmn-
hr:iLastNameMappingElm)
(acme-bpmn-hr:iFirstNameMappingElm, rdf:type, bpmn:MappingElement)
(acme-bpmn-hr:iFirstNameMappingElm, rdf:type, owl:NamedIndividual)
(acme-bpmn-hr:iFirstNameMappingElm, bpmn:sourceFieldName, "GivenName")
(acme-bpmn-hr:iFirstNameMappingElm, bpmn:sourceFieldType, "xsd:string")
(acme-bpmn-hr:iFirstNameMappingElm, bpmn:targetFieldName, "hr:firstName")
(acme-bpmn-hr:iFirstNameMappingElm, bpmn:targetFieldType, "xsd:string")
(acme-bpmn-hr:iLastNameMappingElm, rdf:type, bpmn:MappingElement)
(acme-bpmn-hr:iLastNameMappingElm, rdf:type, owl:NamedIndividual)
(acme-bpmn-hr:iLastNameMappingElm, bpmn:sourceFieldName, "FamilyName")
```

```
(acme-bpmn-hr:iLastNameMappingElm, bpmn:sourceFieldType, "xsd:string")
(acme-bpmn-hr:iLastNameMappingElm, bpmn:targetFieldName, "hr:lastName")
(acme-bpmn-hr:iLastNameMappingElm, bpmn:targetFieldType, "xsd:string")
```

At runtime, the executable program 409 may be using the BPM definition above along with the corresponding generated logic rules to have a complete definition of the metadata defining the employee on-boarding application.

In order to increase the runtime performance of the executable program 409 with the supplemental functionalities, it is possible to augment the ontology instance 406 with entailments computed by the logic rules generated based on the class ontology 402 to have more comprehensive supplemental information. As an example, the employee on-boarding process may be augmented with entailments of the BPM class ontology using the generated logic rules to obtain the following supplemental information:

```
(acme-bpmn-hr:iAcmeOnboardingProcess, rdf:type, owl:Thing)
(acme-bpmn-hr:iAcmeOnboardingProcess, rdf:type, bpmn:FlowElementContainer)
(acme-bpmn-hr:iAcmeOnboardingProcess, rdf:type, bpmn:Process)
(acme-bpmn-hr:iAcmeOnboardingProcess, rdf:type, owl:NamedIndividual)
(acme-bpmn-hr:iAcmeOnboardingProcess, bpmn:hasFlowElement, acme-bpmn-
hr:iAcmeStartOnboarding)
(acme-bpmn-hr:iAcmeStartOnboarding, rdf:type, owl:Thing)
(acme-bpmn-hr:iAcmeStartOnboarding, rdf:type, bpmn:Event)
(acme-bpmn-hr:iAcmeStartOnboarding, rdf:type, bpmn:FlowElement)
(acme-bpmn-hr:iAcmeStartOnboarding, rdf:type, bpmn:FlowNode)
(acme-bpmn-hr:iAcmeStartOnboarding, rdf:type, bpmn:MessageStartEvent)
(acme-bpmn-hr:iAcmeStartOnboarding, rdf:type, bpmn:StartEvent)
(acme-bpmn-hr:iAcmeStartOnboarding, rdf:type, owl:NamedIndividual)
(acme-bpmn-hr:iAcmeStartOnboarding, bpmn:hasEventDefinitions, acme-bpmn-
hr:iStartOnboardingMessageDefinition)
(acme-bpmn-hr:iAcmeStartOnboarding, bpmn:hasMessageEventDefinitions, acme-bpmn-
hr:iStartOnboardingMessageDefinition)
(acme-bpmn-hr:iAcmeStartOnboarding, bpmn:topReactiveHelper, "iMessageStartEvent")
(acme-bpmn-hr:iAcmeStartOnboarding, top:consistent_on, bpmn:hasEventDefinitions)
(acme-bpmn-hr:iStartOnboardingMessageDefinition, rdf:type, owl: Thing)
(acme-bpmn-hr:iStartOnboardingMessageDefinition, rdf:type, bpmn:EventDefinition)
(acme-bpmn-hr:iStartOnboardingMessageDefinition, rdf:type,
bpmn:MessageEventDefinition)
(acme-bpmn-hr:iStartOnboardingMessageDefinition, rdf:type, owl:NamedIndividual)
(acme-bpmn-hr:iStartOnboardingMessageDefinition, bpmn:hasEventDefinitions, acme-
bpmn-hr:iFirstNameMappingElm)
(acme-bpmn-hr:iStartOnboardingMessageDefinition, bpmn:hasEventDefinitions, acme-
bpmn-hr:iLastNameMappingElm)
(acme-bpmn-hr:iFirstNameMappingElm, rdf:type, owl:Thing)
(acme-bpmn-hr:iFirstNameMappingElm, rdf:type, bpmn:SupportingElement)
(acme-bpmn-hr:iFirstNameMappingElm, rdf:type, bpmn:MappingElement)
(acme-bpmn-hr:iFirstNameMappingElm, rdf:type, owl:NamedIndividual)
(acme-bpmn-hr:iFirstNameMappingElm, bpmn:sourceFieldName, "GivenName")
(acme-bpmn-hr:iFirstNameMappingElm, bpmn:sourceFieldType, "xsd:string")
(acme-bpmn-hr:iFirstNameMappingElm, bpmn:targetFieldName, "hr:firstName")
(acme-bpmn-hr:iFirstNameMappingElm, bpmn:targetFieldType, "xsd:string")
(acme-bpmn-hr:iLastNameMappingElm, rdf:type, owl:Thing)
(acme-bpmn-hr:iLastNameMappingElm, rdf:type, bpmn:SupportingElement)
(acme-bpmn-hr:iLastNameMappingElm, rdf:type, bpmn:MappingElement)
(acme-bpmn-hr:iLastNameMappingElm, rdf:type, owl:NamedIndividual)
(acme-bpmn-hr:iLastNameMappingElm, bpmn:sourceFieldName, "FamilyName")
(acme-bpmn-hr:iLastNameMappingElm, bpmn:sourceFieldType, "xsd:string")
(acme-bpmn-hr:iLastNameMappingElm, bpmn:targetFieldName, "hr:lastName")
(acme-bpmn-hr:iLastNameMappingElm, bpmn:targetFieldType, "xsd:string")
```

It is noted that the triples in bold are the inferred entailments (metadata), while the rest of the triples are metadata transformed from the BPM ontology instance.

The supplemental information with augmented metadata contains additional information. For example, the named individual acme-bpmn-hr:McmeStartOnboarding is not only a bpmn:StartEvent as the asserted facts indicated, but also of type bpmn:MessageStartEvent as a consequence of the equivalent class definition present in the ontology. This supplemental information corresponding to the employee on-boarding application functionalities may be stored in the working memory and become the metadata information used by the executable program 409 at runtime. As a result, in some embodiments, the generated logic rules may no longer be needed by the executable program 409 once the metadata information is augmented with the inferred entailments. It may be needed when a new application is defined using a new instance of the BPM class ontology.

FIG. 5 is a flowchart 500 of a method of providing supplemental functionalities for a computer program via ontology instances, in accordance with some embodiments.

In an operation 502, a computer program associated with an ontology may be caused to be run. The ontology may include information indicating attributes for a set of applications (for example, a class of BPM application). Operation 502 may be performed by one or more processors that are the same as or similar to the processors 106, in accordance with one or more embodiments.

In an operation 504, an instance of the ontology may be obtained. The ontology instance may correspond to an application of the set of applications. Operation 504 may be performed by an ontology management subsystem that is the same as or similar to the ontology management subsystem 112, in accordance with one or more embodiments.

In an operation 506, supplemental information for the computer program may be generated based on the ontology instance. The supplemental information may be related to functionalities of the application. Operation 506 may be performed by a supplemental information generation subsystem that is the same as or similar to the supplemental information generation subsystem 114, in accordance with one or more embodiments.

In an operation 508, the supplemental information may be provided as input to the computer program to enable the functionalities of the application to be available via the computer program. Operation 508 may be performed by one or more processors that are the same as or similar to the processors 106, in accordance with one or more embodiments.

It should be understood that in some embodiments, operations 504-508 may be repeated to enable different functionalities of another application in the set of application to be available via the computer program. For example, another ontology instance corresponding to the other application may be obtained, and another supplemental information related to the different functionalities may be generated based on the other ontology instance and provided as input to the computer program.

FIG. 6 is a flowchart 600 of a method of generating a programming interface and logic rules based on a class ontology, in accordance with some embodiments.

In an operation 602, an ontology associated with a class of applications may be obtained. Operation 602 may be performed by an ontology defining component that is the same as or similar to the ontology defining component 202, in accordance with one or more embodiments.

In an operation 604, a freeze may be assigned to the ontology that disables further modification of the ontology. In some embodiments, the freeze may be assigned once the ontology has been completed and validated to ensure the consistency of the ontology. Operation 604 may be performed by an ontology validation component that is the same as or similar to the ontology validation component 204, in accordance with one or more embodiments.

In an operation 606, class information may be extracted from the ontology. The class information may include, for example, class structures, data properties associated with each class, and the relationships between classes. Operation 606 may be performed by a programming interface generation component that is the same as or similar to the programming interface generation component 206, in accordance with one or more embodiments.

In an operation 608, a programming interface may be generated based on the class information. The programming interface may be in the form of computer code in a programming language and may be used by a computer program (for example, the computer program of FIG. 5) for accessing metadata information stored in the working memory. Operation 608 may be performed by a programming interface generation component that is the same as or similar to the programming interface generation component 206, in accordance with one or more embodiments.

In an operation 610, axiom information may be extracted from the ontology. Operation 610 may be performed by a logic rule generation component that is the same as or similar to the logic rule generation component 208, in accordance with one or more embodiments.

In an operation 612, logic rules may be generated based on the axiom information. The logic rules may be used to infer additional metadata, for example, entailments on the objects of the ontology. Operation 612 may be performed by a logic rule generation component that is the same as or similar to the logic rule generation component 208, in accordance with one or more embodiments.

In an operation 614, logic rules may be augmented with runtime rules of the computer program. The augmented rules may be used for executing the computer program at runtime. Operation 614 may be performed by a logic rule generation component that is the same as or similar to the logic rule generation component 208, in accordance with one or more embodiments.

Functionalities Provided Via Domain-Specific and General Ontology Instances

Figure 7:
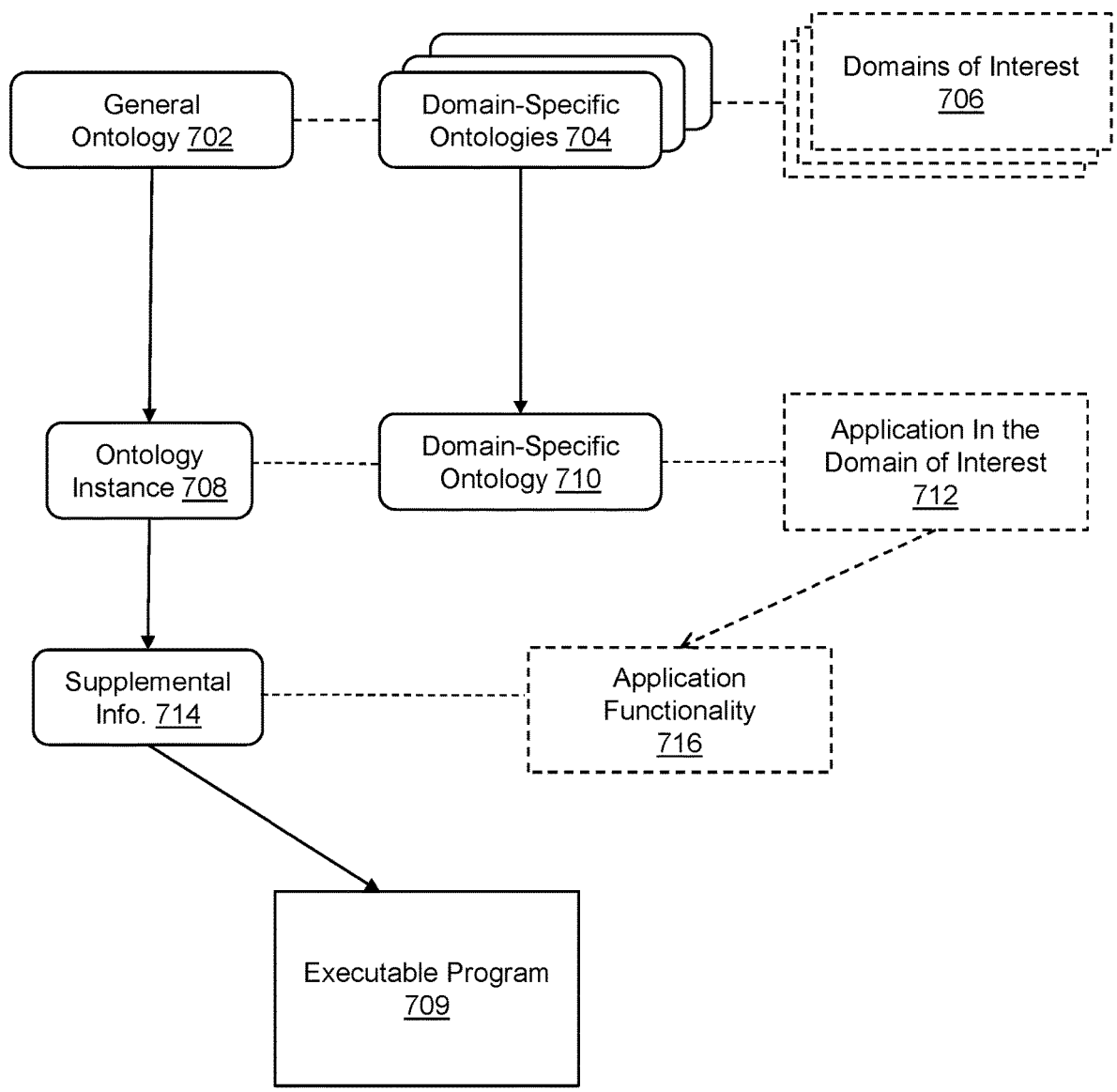
FIG. 7 shows a process of providing supplemental functionalities for a computer program via a domain-specific ontology and an instance of a general ontology, in accordance with some embodiments.
Figure 8:
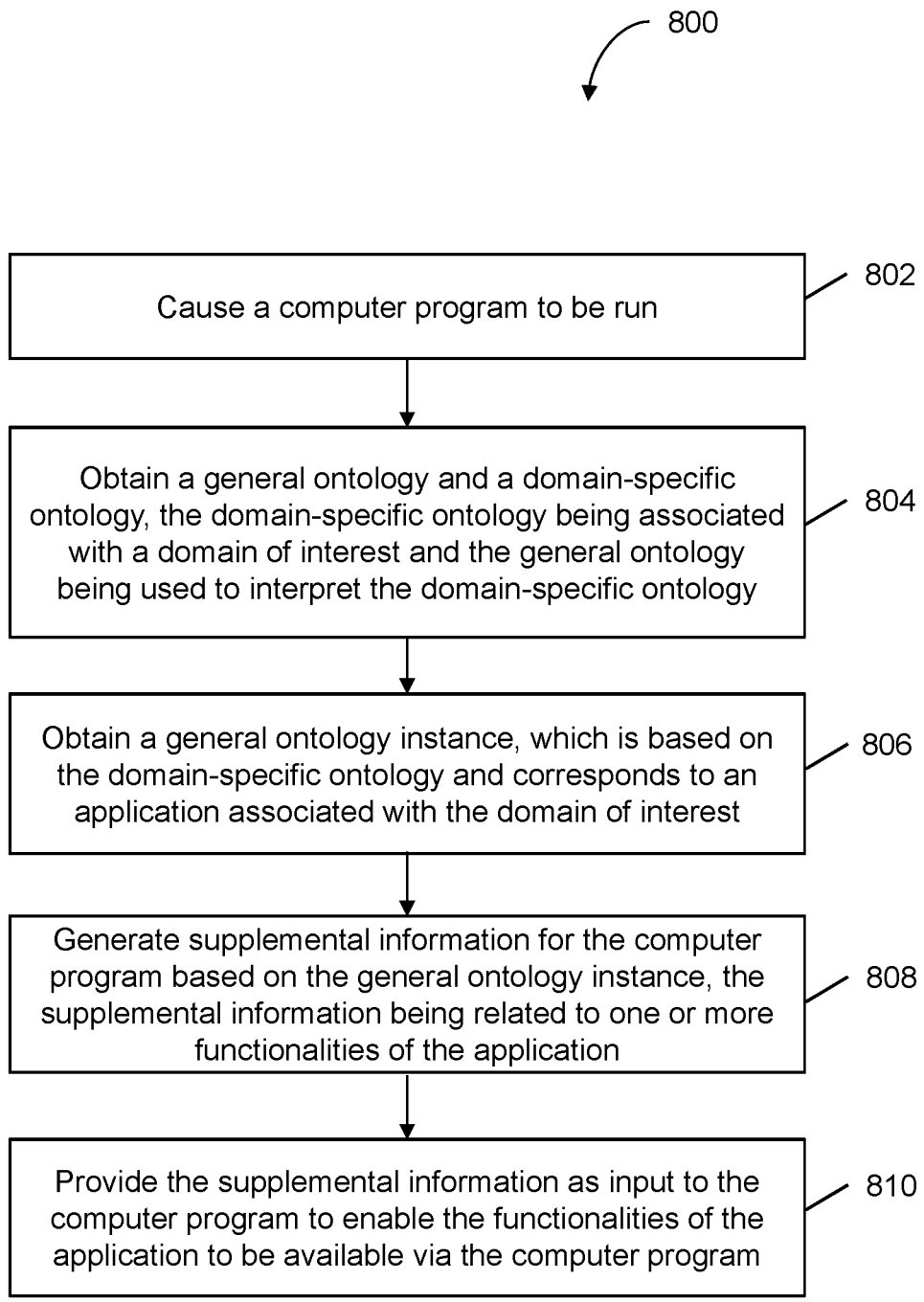
FIG. 8 is a flowchart of a method of providing supplemental functionalities for a computer program via a domain-specific ontology and an instance of a general ontology, in accordance with some embodiments.
Figure 9:
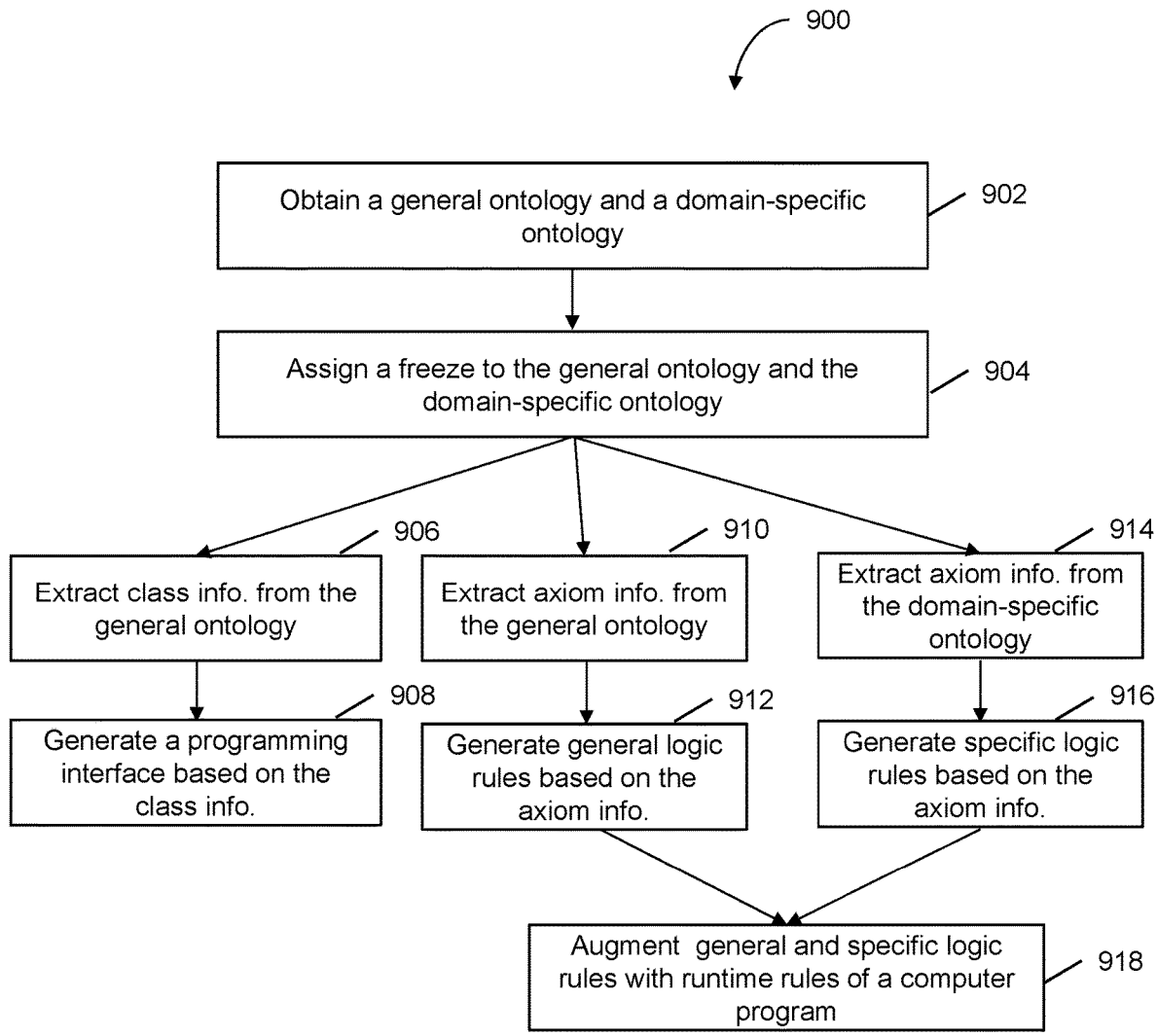
FIG. 9 is a flowchart of a method of generating a programming interface and logic rules based on a domain-specific ontology and a general ontology, in accordance with some embodiments.

In addition to a class ontology describing a class of application, a particular application often needs to access domain-specific information. The traditional approach to add domain-specific information to an application is to have programmers write application code embodying the domain-specific knowledge in some programming language, or to have the application code be generated automatically based on some information gathered from a business analyst or a domain expert. FIGS. 7-9 illustrate an example of providing supplemental functionalities for a computer program (for example, an executable program or other computer program) via a domain-specific ontology and a general ontology instance. That is, a computer program may be specialized in a particular domain of interest using a domain-specific ontology without changing the computer code of the computer program.

As shown in FIG. 7, a general ontology 702 is obtained. The general ontology 702 may be a domain meta model ontology designed to describe the class structure of any domain-specific ontologies 704. The domain-specific ontologies 704 may be associated with domains of interest 706, such as the ones listed in Table 1. The general ontology 702 may not be modified and may have no dependency on any domain-specific ontologies 704. This may become a known and explicit structure used by an executable program 709 to interpret the structure of a particular domain-specific ontology 710. An example general ontology (domain meta model ontology) has been shown above with respect to FIG. 14, and an example domain-specific ontology 710 in the human resource domain has been shown above with respect to FIG. 15. The general ontology in FIG. 14 can be used to interpret any domain-specific ontologies 704, including the human resource domain ontology in FIG. 15.

As mentioned above, both class information and axiom information may be extracted from the general ontology 702 and used to generate the programming interface and logic rules, respectively. Similarly, axiom information may be extracted from the domain-specific ontology 710 and used to generate the specific logic rules. The specific logic rules may be applied to an instance 708 of the general ontology 702 by the executable program 709. Following the human resource domain ontology example described in FIG. 15, the axioms of the human resource domain ontology may be captured in logic rules that are generated automatically from the human resource domain ontology using a computer program. For example, the axiom information includes axioms for the class BoardDirector. The restriction that a BoardDirector must have a role of type BoardDirectorRole is expressed as:

```
# hr:hasRole some hr:BoardDirectorRole
[n=hr12, s=100]: (?s rdf:type hr:BoardDirector).(?s hr:hasRole ?o).(?o rdf:type
hr:BoardDirectorRole) -> (?s top:consistent_on hr:hasRole)
[n=hr13, s=10]: (?s rdf:type hr:BoardDirector).not(?s top:consistent_on hr:hasRole) -> (?s
rdf:type owl:Nothing)
```

The first rule indicates that a BoardDirector with a role of BoardDirectorRole is a consistent individual with regard to the property hasRole. The second rule indicates the complement of the first rule, meaning that a BoardDirector that does not have a consistent relationship on the property hasRole is an inconsistent individual (indicated as a member of Nothing).

Referring back to FIG. 7, the instance 708 of the general ontology 702 may be obtained. The general ontology instance 708 may be based on the domain-specific ontology 710 and correspond to an application 712 in the domain of interest associated with the domain-specific ontology 710. Supplemental information 714 may be generated for the executable program 709 based on the general ontology instance 708. The supplemental information 714 may be related to the functionalities 716 of the application 712. The supplemental information 714 may be provided as input to the executable program 709 at runtime so as to enable the application functionalities 716 to be available via the executable program 709. As mentioned above with respect to FIG. 3, the programming interface generated based on the general ontology 702 may be provided to the executable program 709 for accessing the supplemental information 714 in a working memory at runtime. The executable program 709 may also include the rule engine 310 to execute the generated logic rules associated with programming interface and the domain-specific ontology 710. At runtime, the executable program 709 may be provided with the supplemental information 714 (for example, domain-specific metadata information). This supplemental information 714 may be accessed programmatically using the generated programming interface (for example, class structure). Logic rules may be supplied for the executable program 709 without the need to modify the computer code of the executable program. As mentioned above, the runtime rules govern the execution of the executable program 709 and do not alter the ontological definition of the general and domain-specific ontologies 702 and 710. The runtime rules may be used in conjunction with the generated logic rules from the axioms of the domain-specific ontology 710 and applied on the inputted supplemental information 714.

Following the domain meta model ontology example in FIG. 14 and the human resource domain ontology example described in FIG. 15, the ontology instance 708 is an instance of the example domain meta model ontology, the domain-specific ontology 710 is the example human resource domain ontology, and the application 712 is a human resource application. The example human resource domain ontology may be described using the instance of the domain meta model ontology. The domain meta model ontology can be used to describe any domain-specific ontology, which is an important productivity gain since the class of applications only needs to know the structure of the domain meta model ontology, using the generated classes in any programming language, to discover any domain-specific ontology without the need to change the executable program 709. As an example, the following is an extract of the domain meta model ontology instance generated automatically using a computer program with the example human resource domain ontology as input:

```
(i_hr:BoardDirector, rdf:type, domain:ClassMetadata)
(i_hr:BoardDirector, domain:className, "hr:BoardDirector")
(i_hr:BoardDirector, domain:directSubClassOf, i_hr:Person)
(i_hr:BoardDirector, domain:allProperties, i_hr:BoardDirector-hr:firstName)
(i_hr:BoardDirector, domain:allProperties, i_hr:BoardDirector-hr:hasRole)
(i_hr:BoardDirector, domain:allProperties, i_hr:BoardDirector-hr:lastName)
(i_hr:BoardDirector-hr:hasRole, rdf:type, domain:PropertyMetadata)
(i_hr:BoardDirector-hr:hasRole, domain:propertyName, "hr:hasRole")
(i_hr:BoardDirector-hr:hasRole, domain:range, "hr:Role")
(i_hr:BoardDirector-hr:hasRole, domain:hasSomeValueFromRestriction,
"hr:BoardDirectorRole")
(i_hr:BoardDirector-hr:hasRole, domain:isFunctionalProperty, "0")
(i_hr:BoardDirector-hr:hasRole, domain:isObjectProperty, "1")
```

In the extract above, the class hr:BoardDirector is described using an instance of domain:ClassMetadata named i_hr:BoardDirector. The property hr:hasRole is described using an instance of domain:PropertyMetadata and the restriction that a BoardDirector must have a role with value from the class hr:BoardDirectorRole has been captured.

The metadata describing the human resource domain ontology may be augmented with entailments from the domain meta model ontology (inferred metadata). This augments the metadata information with the inferred class structure. Using the human resource domain ontology as input, the augmented metadata information obtained after applying the logic rules generated based on the domain meta model ontology is:

```
i_hr:BoardDirector, rdf:type, owl:Thing)
(i_hr:BoardDirector, rdf:type, domain:DomainMetaModel)
(i_hr:BoardDirector, rdf:type, domain:ClassMetadata)
(i_hr:BoardDirector, domain:className, "hr:BoardDirector")
(i_hr:BoardDirector, domain:directSubClassOf, i_hr:Person)
(i_hr:BoardDirector, domain:subClassOf, i_owl:Thing)
(i_hr:BoardDirector, domain:subClassOf, i_hr:ResourceManagement)
(i_hr:BoardDirector, domain:subClassOf, i_hr:Person)
(i_hr:BoardDirector, domain:allProperties, i_hr:BoardDirector-hr:firstName)
(i_hr:BoardDirector, domain:allProperties, i_hr:BoardDirector-hr:hasRole)
(i_hr:BoardDirector, domain:allProperties, i_hr:BoardDirector-hr:lastName)
(i_hr:BoardDirector-hr:hasRole, rdf:type, owl:Thing)
(i_hr:BoardDirector-hr:hasRole, rdf:type, domain:DomainMetaModel)
(i_hr:BoardDirector-hr:hasRole, rdf:type, domain:PropertyMetadata)
(i_hr:BoardDirector-hr:hasRole, domain:propertyName, "hr:hasRole")
(i_hr:BoardDirector-hr:hasRole, domain:range, "hr:Role")
(i_hr:BoardDirector-hr:hasRole, domain:hasSomeValueFromRestriction,
"hr:BoardDirectorRole")
(i_hr:BoardDirector-hr:hasRole, domain:isFunctionalProperty, "0")
(i_hr:BoardDirector-hr:hasRole, domain:isObjectProperty, "1")
```

The inferred entailments (additional supplemental information) are indicated in bold above.

In some embodiments, the expressibility of the executable program may be augmented by integrating the general ontology into a class ontology describing a class of applications. The expressibility of the resulting executable program can be increased by integrating the general ontology (for example, a domain meta model ontology) with the class ontology. This integration may be done by importing the general ontology into the class ontology in order to specify domain-specific dependency.

As an example, it may be desired to inform the mapping algorithm of axioms present in the target elements, for example, if the property is a functional property or the ability to ensure the validity of the type is used in the range of the target element. Specifically, consider the equivalent specification of the above-mentioned example of an employee on-boarding process using the instance of the domain metal model ontology as metadata describing the human resource domain ontology example:

In the domain:DomainEntityMappingDefinition the Domain Entity is specified as an instance of domain:ClassMetadata (range of property domain: entityClassMetadata is of type domain:ClassMetadata; see highlights above in bold). Also, the Domain Property Mapping Definition (instances of domain:DomainPropertyMappingDefinition) has an instance of domain:PropertyMetadata for range of domain: targetPropertyMetadata (see highlights above in bold). This provides a rich metadata description of the target domain-specific entities with full access to axioms and restrictions providing the ability of the executable program to enforce or validate them at runtime.

```

# Metadata describing Acme Employee On-Boarding Process

(acme-bpmn-hr2:iAcmeOnboardingProcess, rdf:type, bpmn2:Process)
(acme-bpmn-hr2:iAcmeOnboardingProcess, rdf:type, owl:NamedIndividual)
(acme-bpmn-hr2:iAcmeOnboardingProcess, bpmn2:hasFlowElement, acme-bpmn-
hr2:iOnboardingStartEvent)
(acme-bpmn-hr2:iOnboardingStartEvent, rdf:type, bpmn2:StartEvent)
(acme-bpmn-hr2:iOnboardingStartEvent, rdf:type, owl:NamedIndividual)
(acme-bpmn-hr2:iOnboardingStartEvent, bpmn2:hasEventDefinitions, acme-bpmn-
hr2:iOnboardingStartEventDefinition)
(acme-bpmn-hr2:iOnboardingStartEventDefinition, rdf:type,
bpmn2:MessageEventDefinition)
(acme-bpmn-hr2:iOnboardingStartEventDefinition, rdf:type, owl:NamedIndividual)
(acme-bpmn-hr2:iOnboardingStartEventDefinition, bpmn2:hasMappingElements, acme-
bpmn-hr2:iOnboardingEmployeeMappingElement)
(acme-bpmn-hr2:iOnboardingEmployeeMappingElement, rdf:type, bpmn2:MappingElement)
(acme-bpmn-hr2:iOnboardingEmployeeMappingElement, rdf:type, owl:NamedIndividual)
(acme-bpmn-hr2:iOnboardingEmployeeMappingElement,
bpmn2:hasDomainEntityMappingDefinition, acme-bpmn-hr2:iEmployeeMappingDefinition)
(acme-bpmn-hr2:iEmployeeMappingDefinition, rdf:type,
domain:DomainEntityMappingDefinition)
(acme-bpmn-hr2:iEmployeeMappingDefinition, rdf:type, owl:NamedIndividual)
(acme-bpmn-hr2:iEmployeeMappingDefinition, domain:entityClassMetadata,
i_hr:Employee)
(acme-bpmn-hr2:iEmployeeMappingDefinition,
domain:hasDomainPropertyMappingDefinitions, acme-bpmn-hr2:iFirstNameMappingDefinition)
(acme-bpmn-hr2:iEmployeeMappingDefinition,
domain:hasDomainPropertyMappingDefinitions, acme-bpmn-hr2:iLastNameMappingDefinition)
(acme-bpmn-hr2:iFirstNameMappingDefinition, rdf:type,
domain:DomainPropertyMappingDefinition)
(acme-bpmn-hr2:iFirstNameMappingDefinition, rdf:type, owl:NamedIndividual)
(acme-bpmn-hr2:iFirstNameMappingDefinition, domain:sourceFieldName, "GivenName")
(acme-bpmn-hr2:iFirstNameMappingDefinition, domain:sourceFieldType, "xsd:string")
(acme-bpmn-hr2:iFirstNameMappingDefinition, domain:targetPropertyMetadata,
i_hr:Employee-firstName)
(acme-bpmn-hr2:iLastNameMappingDefinition, rdf:type,
domain:DomainPropertyMappingDefinition)
(acme-bpmn-hr2:iLastNameMappingDefinition, rdf:type, owl:NamedIndividual)
(acme-bpmn-hr2:iLastNameMappingDefinition, domain:sourceFieldName, "FamilyName")
(acme-bpmn-hr2:iLastNameMappingDefinition, domain:sourceFieldType, "xsd:string")
(acme-bpmn-hr2:iLastNameMappingDefinition, domain:targetPropertyMetadata,
i_hr:Employee-lastName)

# Metadata describing HR sample Domain Ontology

(i_hr:Employee, rdf:type, domain:ClassMetadata)
(i_hr:Employee, rdf:type, owl:NamedIndividual)
(i_hr :Employee, domain:className, "hr:Employee")
(i_hr:Employee, domain:directProperties, i_hr:Employee-firstName)
(i_hr:Employee, domain:directProperties, i_hr:Employee-lastName)
(i_hr:Employee-firstName, rdf:type, domain:PropertyMetadata)
(i_hr:Employee-firstName, rdf:type, owl:NamedIndividual)
(i_hr:Employee-firstName, domain:propertyName, "hr:firstName")
(i_hr:Employee-firstName, domain:range, "xsd:string")
(i_hr:Employee-firstName, domain:isFunctionalProperty, "1")
(i_hr:Employee-firstName, domain:isObjectProperty, "0")
(i_hr:Employee-lastName, rdf:type, domain:PropertyMetadata)
(i_hr:Employee-lastName, rdf:type, owl:NamedIndividual)
(i_hr:Employee-lastName, domain:propertyName, "hr:lastName")
(i_hr:Employee-lastName, domain:range, "xsd:string")
(i_hr:Employee-lastName, domain:isFunctionalProperty, "1")
(i_hr:Employee-lastName domain:isObjectProperty, "0")
```

FIG. 8 is a flowchart 800 of a method of providing supplemental functionalities for an executable program via a domain-specific ontology and an instance of a general ontology, in accordance with some embodiments.

In an operation 802, a computer program may be caused to be run. Operation 802 may be performed by one or more processors that are the same as or similar to the processors 106, in accordance with one or more embodiments.

In an operation 804, a general ontology and a domain-specific ontology may be obtained. The domain-specific ontology may be associated with a domain of interest, and the general ontology can be used to interpret the domain-specific ontology. Operation 804 may be performed by an ontology management subsystem that is the same as or similar to the ontology management subsystem 112, in accordance with one or more embodiments.

In an operation 806, an instance of the general ontology may be obtained. The general ontology instance may be based on the domain-specific ontology and correspond to an application associated with the domain of interest. Operation 806 may be performed by an ontology management subsystem that is the same as or similar to the ontology management subsystem 112, in accordance with one or more embodiments.

In an operation 808, supplemental information for the computer program may be generated based on the general ontology instance. The supplemental information may be related to functionalities of the application. Operation 808 may be performed by a supplemental information generation subsystem that is the same as or similar to the supplemental information generation subsystem 114, in accordance with one or more embodiments.

In an operation 810, the supplemental information may be provided as input to the computer program to enable the functionalities of the application to be available via the computer program. Operation 810 may be performed by one or more processors that are the same as or similar to the processors 106, in accordance with one or more embodiments.

It should be understood that, in some embodiments, operations 804-810 may be repeated to enable different functionalities of another application in a different domain of interest to be available via the computer program. For example, another domain-specific ontology in the different domain of interest and another general ontology instance corresponding to the other application may be obtained, and another supplemental information related to the different functionalities may be generated based on the other general ontology instance and domain-specific ontology and provided as input to the computer program.

FIG. 9 is a flowchart 900 of a method of generating a programming interface and logic rules based on a domain-specific ontology and a general ontology instance, in accordance with some embodiments.

In an operation 902, a general ontology and a domain-specific ontology may be obtained. Operation 902 may be performed by an ontology defining component that is the same as or similar to the ontology defining component 202, in accordance with one or more embodiments.

In an operation 904, a freeze may be assigned to the general ontology and domain-specific ontology that disables further modification of the ontologies. In some embodiments, the freeze may be assigned once an ontology has been completed and validated to ensure the consistency of the ontology. Operation 904 may be performed by an ontology validation component that is the same as or similar to the ontology validation component 204, in accordance with one or more embodiments.

In an operation 906, class information may be extracted from the general ontology. The class information may include, for example, class structures, data properties associated with each class, and the relationships between classes. Operation 906 may be performed by a programming interface generation component that is the same as or similar to the programming interface generation component 206, in accordance with one or more embodiments.

In an operation 908, a programming interface may be generated based on the class information of the general ontology. The programming interface may be in the form of computer code in a programming language and may be used by a computer program (for example, the computer program of FIG. 8) for accessing metadata information stored in the working memory. Operation 908 may be performed by a programming interface generation component that is the same as or similar to the programming interface generation component 206, in accordance with one or more embodiments.

In an operation 910, axiom information may be extracted from the general ontology. Operation 910 may be performed by a logic rule generation component that is the same as or similar to the logic rule generation component 208, in accordance with one or more embodiments.

In an operation 912, general logic rules may be generated based on the axiom information of the general ontology. The general logic rules may be used to infer additional metadata, for example, entailments on the objects of the domain-specific ontology. Operation 912 may be performed by a logic rule generation component that is the same as or similar to the logic rule generation component 208, in accordance with one or more embodiments.

In an operation 914, axiom information may be extracted from the domain-specific ontology. Operation 914 may be performed by a logic rule generation component that is the same as or similar to the logic rule generation component 208, in accordance with one or more embodiments.

In an operation 916, specific logic rules may be generated based on the axiom information of the domain-specific ontology. The specific logic rules may be applied to manipulate the supplemental information by the computer program. Operation 916 may be performed by a logic rule generation component that is the same as or similar to the logic rule generation component 208, in accordance with one or more embodiments.

In an operation 918, general and specific logic rules may be augmented with runtime rules of the computer program. The augmented rules may be used for executing the computer program at runtime. Operation 918 may be performed by a logic rule generation component that is the same as or similar to the logic rule generation component 208, in accordance with one or more embodiments.

Functionalities Provided Via Domain-Specific and Class Ontology Instances

One aspect of this invention by which one can generate a class of applications from a class ontology described in FIGS. 4-6 can be combined with the other aspect of this invention described in FIGS. 7-9 to generate a specialized application with domain-specific knowledge that belongs to a class of applications.

As an example, an application for on-boarding new employees by the human resource department of an organization is an application that belongs to the class of BPM applications. This application is specialized with human resource domain knowledge. The specialization of the application is two-fold: 1) the new employee on-boarding business process is an application that belongs to the class of BPM applications, and 2) the inclusion of human resource domain-specific knowledge specializes the on-boarding process by using data elements or attributes that are specific to an organization or industry. Combining a class of applications associated with a class ontology with a domain-specific ontology may result in a semantically informed computer program (for example, an executable program) that is a programmatic representation of the class of applications applied to the specific domain by the underlying ontologies.

Figure 10:
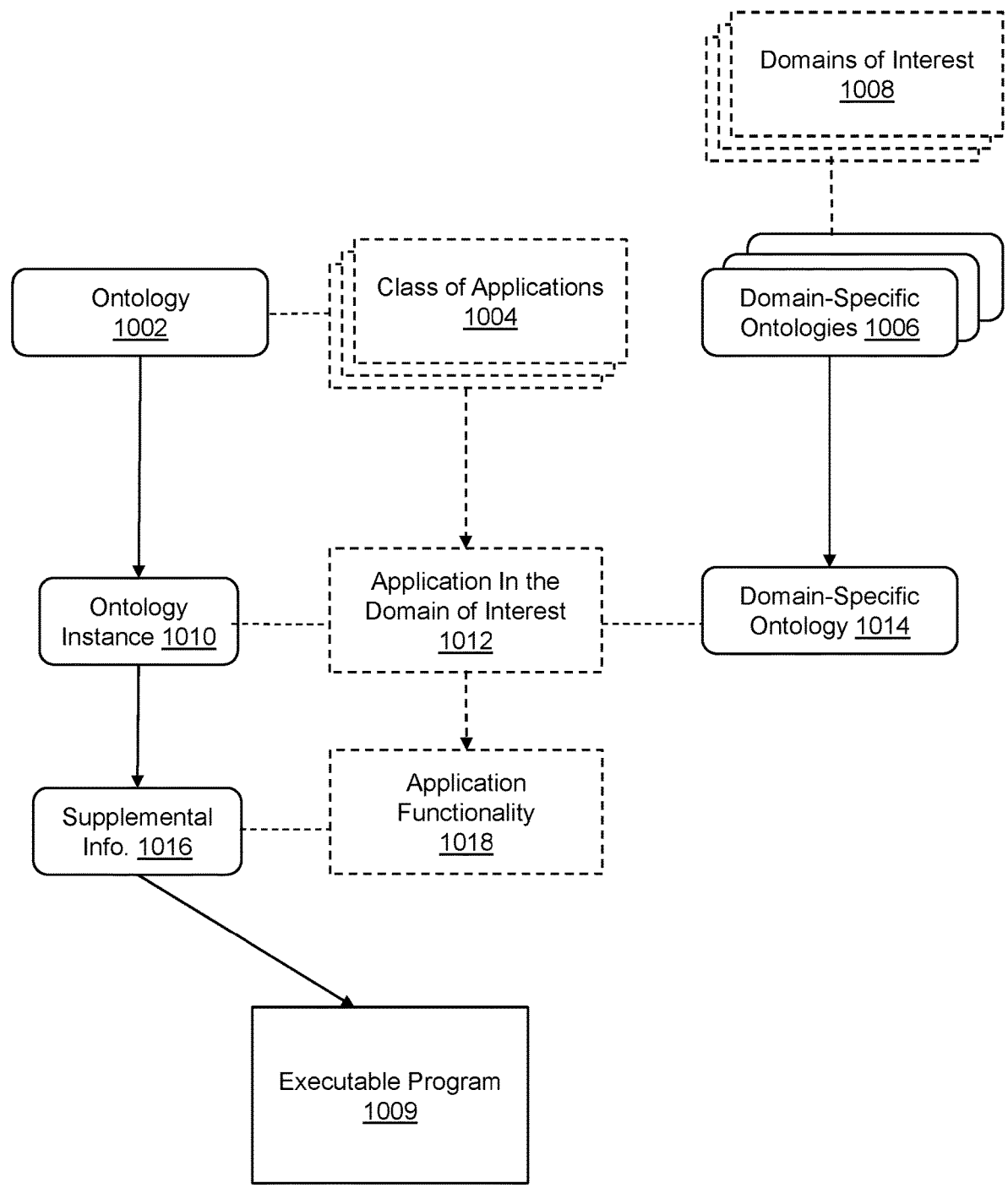
FIG. 10 shows a process of providing supplemental functionalities for a computer program via a domain-specific ontology and an instance of an ontology describing a class of applications, in accordance with some embodiments.
Figure 11:
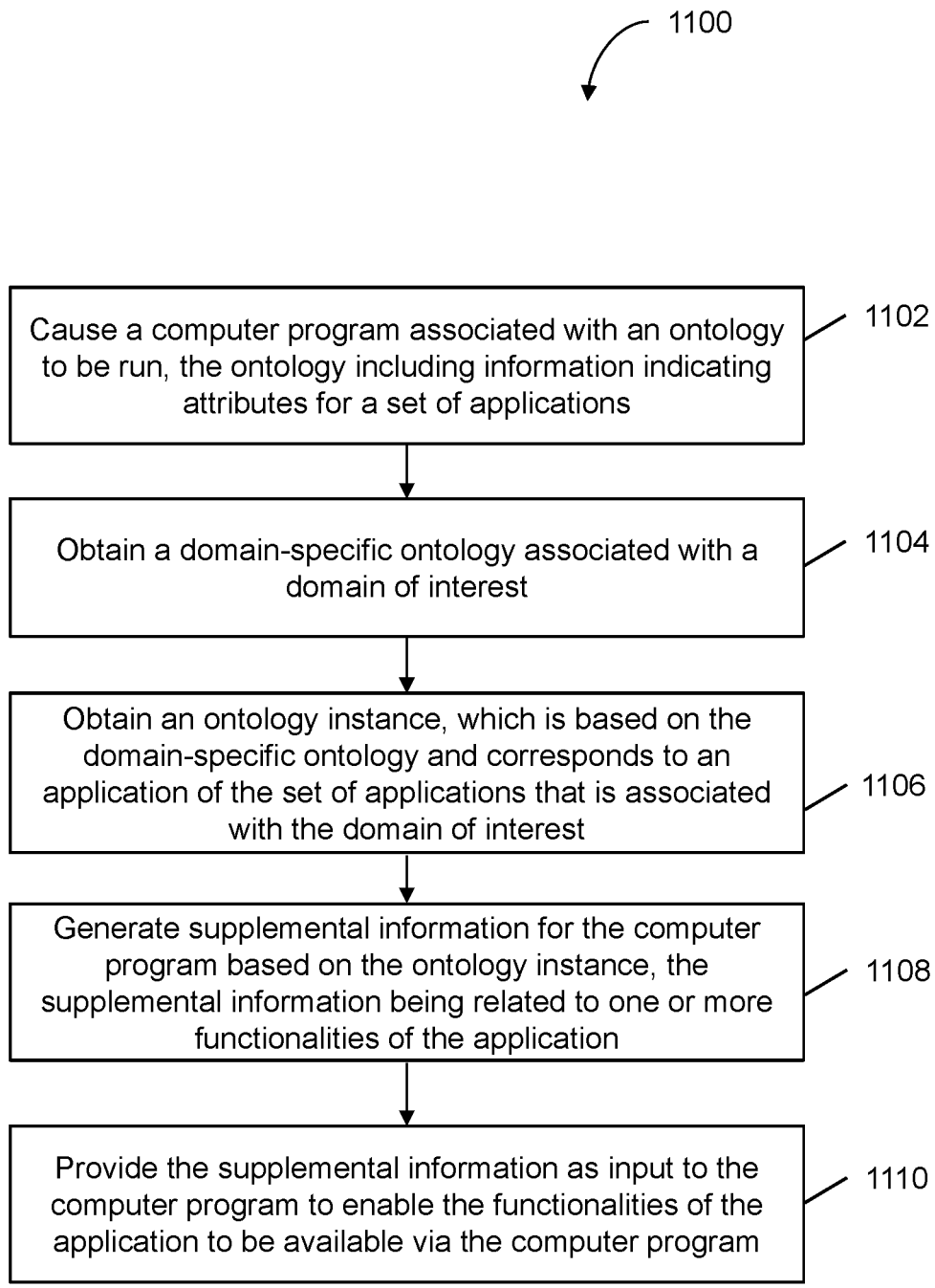
FIG. 11 is a flowchart of a method of providing supplemental functionalities for a computer program via a domain-specific ontology and an instance of an ontology describing a class of applications, in accordance with some embodiments.
Figure 12:
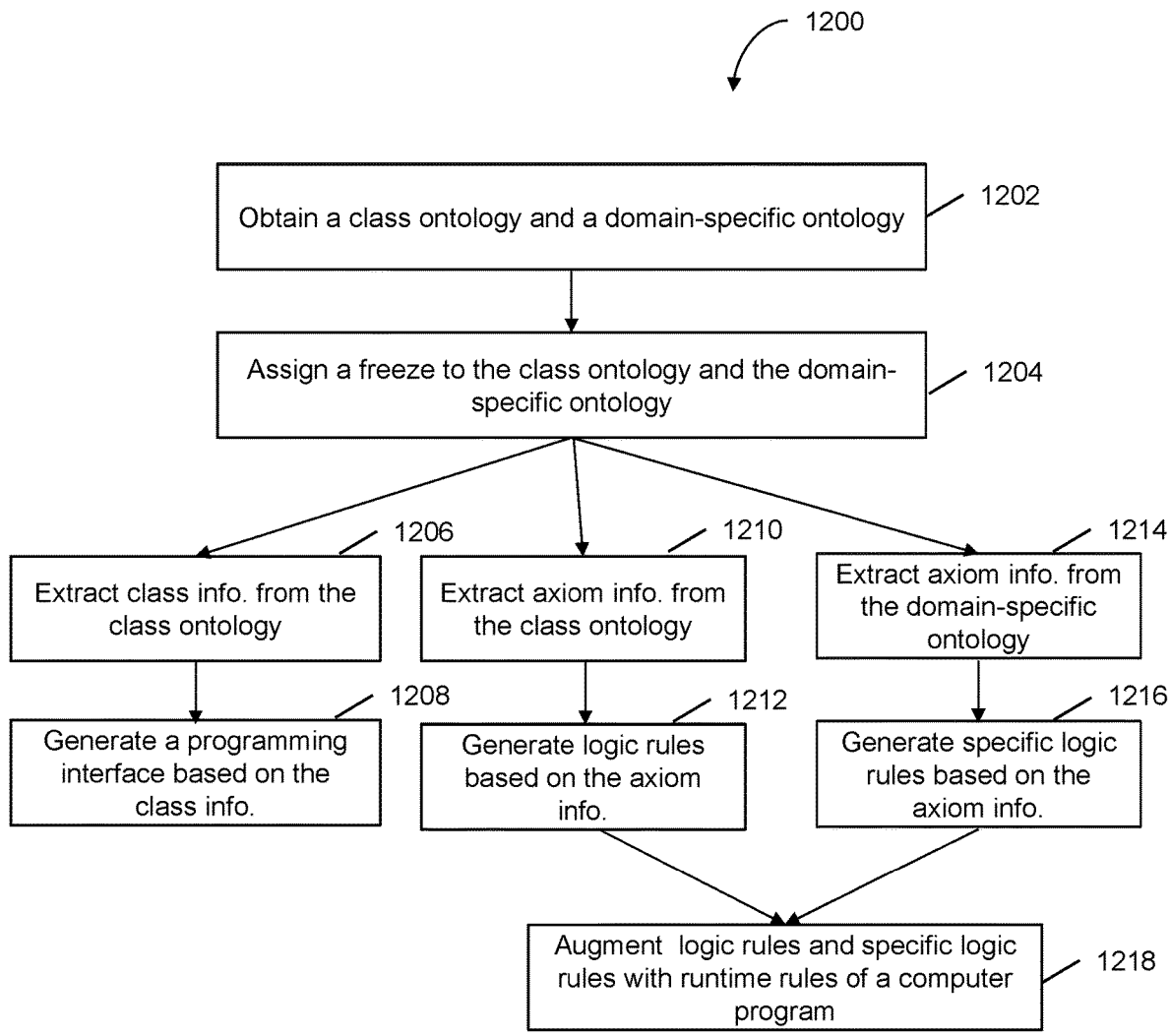
FIG. 12 is a flowchart of a method of generating a programming interface and logic rules based on a domain-specific ontology and an instance of an ontology describing a class of applications, in accordance with some embodiments.

FIGS. 10-12 illustrate an example of providing supplemental functionalities for a computer program (for example, an executable program or other computer program) via a domain-specific ontology and a class ontology instance. As shown in FIG. 10, an ontology 1002 (a class ontology) is obtained. The class ontology 1002 may include information indicating attributes for a class of applications 1004. The class of applications 1004 may include the ones listed in Table 1. On the other hand, a domain-specific ontology 1014 may be selected from a set of domain-specific ontologies 1006, which are associated with a set of domains of interest 1008, such as such as the ones listed in Table 1. An example BPM class ontology has been shown above with respect to FIG. 13, and an example human resource domain-specific ontology has been shown above with respect to FIG. 15.

As mentioned above, both class information and axiom information may be extracted from the class ontology 1002 and used to generate the programming interface and logic rules, respectively. Similarly, axiom information may be extracted from the domain-specific ontology 1014 and used to generate the specific logic rules. The specific logic rules may be applied to an instance 1010 of the class ontology 1002 by an executable program 1009. The class ontology instance 1010 may be based on the domain-specific ontology 1014 and correspond to an application 1012 of the class of applications 1004 that is associated with the domain of interest.

Supplemental information 1016 may be generated for the executable program 1009 based on the class ontology instance 1010. The supplemental information 1016 may be related to the functionalities 1018 of the application 1012. The supplemental information 1016 may be provided as input to the executable program 1009 at runtime so as to enable the application functionalities 1018 to be available via the executable program 1009. As indicated above with respect to FIG. 3, the programming interface generated based on the class ontology 1002 may be provided to the executable program 1009 for accessing the supplemental information 1016 in a working memory at runtime. The executable program 1009 may also include the rule engine 310 to execute the generated logic rules associated with programming interface and the domain-specific ontology 1014. At runtime, the executable program 1009 may be provided with the supplemental information 1016 (for example, domain-specific metadata information). This supplemental information 1016 may be accessed programmatically using the generated programming interface (for example, class structure). Logic rules may be supplied for the executable program 1009 without the need to modify the computer code of the executable program 1009. As mentioned above, the runtime rules govern the execution of the executable program 1009 and do not alter the ontological definition of the class and domain-specific ontologies 1002, 1014. The runtime rules may be used in conjunction with the generated logic rules from the axioms of the domain-specific ontology 1014 and applied on the input supplemental information 1016.

FIG. 11 is a flowchart 1100 of a method of providing supplemental functionalities for a computer program (for example, an executable program or other computer program) via a domain-specific ontology and an instance of an ontology describing a class of applications, in accordance with some embodiments.

In an operation 1102, a computer program associated with an ontology may be caused to be run. The ontology may include information indicating attributes for a set of applications (a class ontology for a class of applications). Operation 1102 may be performed by one or more processors that are the same as or similar to the processors 106, in accordance with one or more embodiments.

In an operation 1104, a domain-specific ontology may be obtained. The domain-specific ontology may be associated with a domain of interest. Operation 1104 may be performed by an ontology management subsystem that is the same as or similar to the ontology management subsystem 112, in accordance with one or more embodiments.

In an operation 1106, an instance of the class ontology may be obtained. The class ontology instance may be based on the domain-specific ontology and correspond to an application of the set of applications that is associated with the domain of interest. Operation 1106 may be performed by an ontology management subsystem that is the same as or similar to the ontology management subsystem 112, in accordance with one or more embodiments.

In an operation 1108, supplemental information for the computer program may be generated based on the class ontology instance. The supplemental information may be related to functionalities of the application. Operation 1108 may be performed by a supplemental information generation subsystem that is the same as or similar to the supplemental information generation subsystem 114, in accordance with one or more embodiments.

In an operation 1110, the supplemental information may be provided as input to the computer program to enable the functionalities of the application to be available via the computer program. Operation 1110 may be performed by one or more processors that are the same as or similar to the processors 106, in accordance with one or more embodiments.

It should be understood that, in some embodiments, operations 1106-1110 may be repeated to enable different functionalities of another application in the set of applications to be available via the computer program. For example, another class ontology instance corresponding to the other application may be obtained, and other supplemental information related to the different functionalities may be generated based on the other class ontology instance and the domain-specific ontology and provided as input to the computer program.

FIG. 12 is a flowchart 1200 of a method of generating a programming interface and logic rules based on a domain-specific ontology and a class ontology instance, in accordance with some embodiments.

In an operation 1202, a class ontology and a domain-specific ontology may be obtained. Operation 1202 may be performed by an ontology defining component that is the same as or similar to the ontology defining component 202, in accordance with one or more embodiments.

In an operation 1204, a freeze may be assigned to the class ontology and domain-specific ontology that disables further modification of the ontologies. In some embodiments, the freeze may be assigned once an ontology has been completed and validated to ensure the consistency of the ontology. Operation 1204 may be performed by an ontology validation component that is the same as or similar to the ontology validation component 204, in accordance with one or more embodiments.

In an operation 1206, class information may be extracted from the class ontology. The class information may include, for example, class structures, data properties associated with each class, and the relationships between classes. Operation 1206 may be performed by a programming interface generation component that is the same as or similar to the programming interface generation component 206, in accordance with one or more embodiments.

In an operation 1208, a programming interface may be generated based on the class information of the class ontology. The programming interface may be in the form of computer code in a programming language to be used by a computer program (for example, the computer program of FIG. 11) for accessing metadata information stored in the working memory. Operation 1208 may be performed by a programming interface generation component that is the same as or similar to the programming interface generation component 206, in accordance with one or more embodiments.

In an operation 1210, axiom information may be extracted from the class ontology. Operation 1210 may be performed by a logic rule generation component that is the same as or similar to the logic rule generation component 208, in accordance with one or more embodiments.

In an operation 1212, logic rules may be generated based on the axiom information of the class ontology. The logic rules may be used to infer additional metadata, for example, entailments on the objects of the domain-specific ontology. Operation 1212 may be performed by a logic rule generation component that is the same as or similar to the logic rule generation component 208, in accordance with one or more embodiments.

In an operation 1214, axiom information may be extracted from the domain-specific ontology. Operation 1214 may be performed by a logic rule generation component that is the same as or similar to the logic rule generation component 208, in accordance with one or more embodiments.

In an operation 1216, specific logic rules may be generated based on the axiom information of the domain-specific ontology. The specific logic rules may be applied to manipulate the supplemental information by the computer program. Operation 1216 may be performed by a logic rule generation component that is the same as or similar to the logic rule generation component 208, in accordance with one or more embodiments.

In an operation 1218, logic rules and specific logic rules may be augmented with runtime rules of the computer program. The augmented rules may be used for executing the computer program at runtime. Operation 1218 may be performed by a logic rule generation component that is the same as or similar to the logic rule generation component 208, in accordance with one or more embodiments.

Creation of Ontologies

In some embodiments, ontology defining component 202 of the ontology management subsystem 112 may be configured to create and define an ontology from a set of business and technology assets including, but not limited to, data models, data dictionaries, data files/extracts, VSAM files, glossaries, source code, or business documentation (for example, docx, csv, xlsx, etc.) associated with a business. For example, a business asset may include a document or set of documents (for example, docx, csv, xlsx, etc.) that contains business logic that clients utilize to understand and build constraints of the data used to make business decisions. A technology asset may include a document or set of documents (for example, data models, data dictionaries, source code, etc.) that provides a technical framework for business data to be stored/accessed and have business rules applied to for a business to function on a daily basis. In some embodiments, ontology defining component 202 may create and define a general ontology, a domain-specific ontology, or other ontology from a set of business and/or technology assets. In one use case, a set of documents related to claims adjudication or other components of a business may be obtained from a set of business assets, and a general human resources ontology may be created and defined based on the set of documents associated with the business assets.

An example of a data model associated with a set of business assets is represented below:

```
CREATE TABLE container (
    CONTAINER_ID           DECIMAL         NOT NULL,
    FACILITY_ID            DECIMAL         NOT NULL,
    CONTAINER_TYPE_ID      DECIMAL         NOT NULL,
    PRIMARY KEY (CONTAINER_ID));
COMMENT ON COLUMN CONTAINER.CONTAINER_ID IS 'The identifier for the
container.';
COMMENT ON COLUMN CONTAINER.FACILITY_ID IS 'The identifier for the facility.';
COMMENT ON COLUMN CONTAINER.CONTAINER_TYPE_ID IS 'The identifier for the
container type.';
COMMENT ON TABLE CONTAINER IS 'A detailed location which resides within a
facility. Example of a container include "shelf 12a", "file drawer AAA", "bin 123", "barrel
356", "room 400a", or any other detailed location.'
```

The above data model, as represented by the Data Definition Language (DDL), provides detailed information related to business and/or technical assets. In particular, the data model may include elements providing detailed information related to a container which resides within a facility. For example, the CONTAINER_ID may provide an identifier associated with the container, the FACILITY_ID may provide an identifier of a facility in which the container is located, and CONTAINER_TYPE may provide an identifier of a type of container.

An example of data dictionary definitions associated with a set of business assets is shown below in Table 2.

TABLE 2

| Term | Definition | Format | For example | Other |
|---|---|---|---|---|
| Diagnosis Code | ICD-9-CM diagnosis code, no decimals, assume decimal point after 3$^{rd}$ digit | Char | for example, 486, 49301, 5821 | Varying lengths, read using "\|" as the delimiter |
| Long Description | Complete description of the code | Char(250) | | Varying lengths, read using "\|" as the delimiter |
| Short Description | Shortened description of the code | Char(30) | | |

The above data dictionary definitions provide detailed information associated with various terms related to business and/or technical assets. For example, a term may provide a word, phrase, data descriptor, and the like expressing a concept or thing related to the business and/or technical asset, a definition may provide a statement of the meaning for each of the terms, a format may provide the structure of the data provided for each term, and other information (for example, and other columns).

Figure 16:
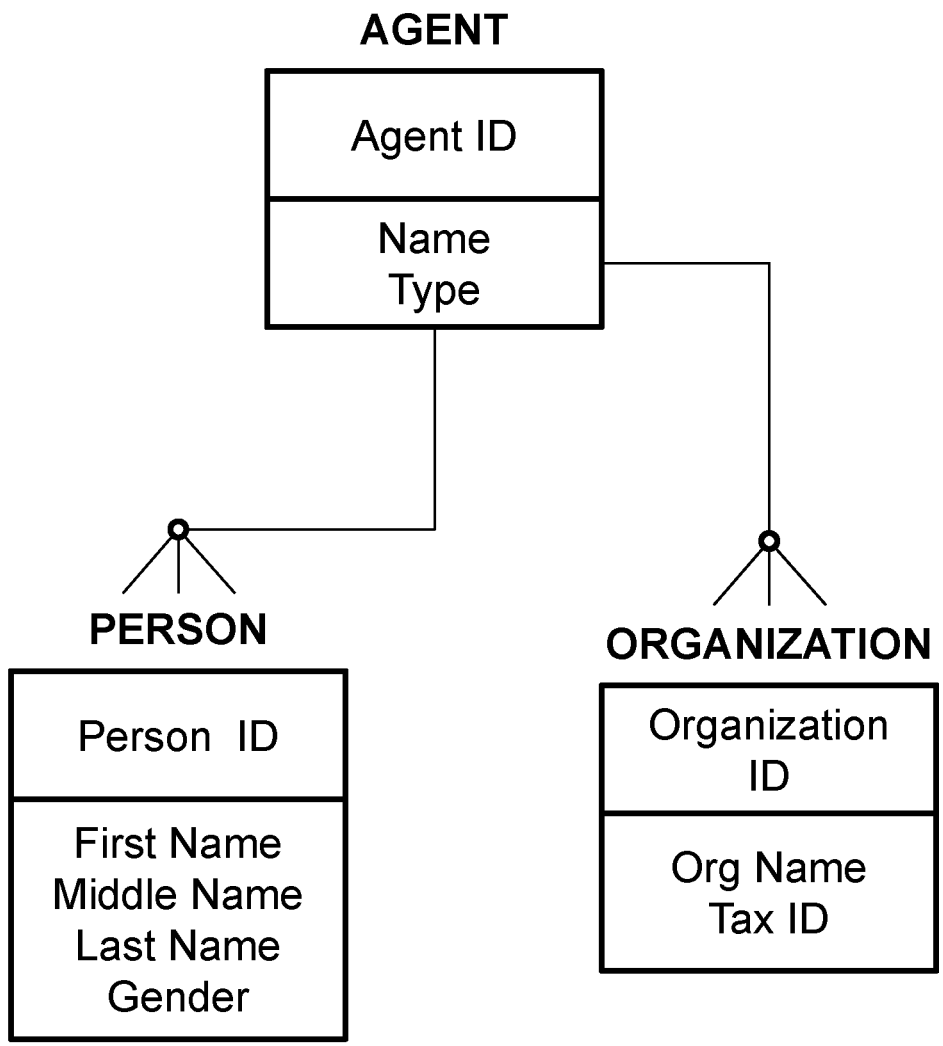
FIG. 16 shows example of a data model associated with a set of technical assets, in accordance with some embodiments.

FIG. 16 illustrates another example of a data model associated with a set of technical assets. In particular, the illustrated data model may provide detailed information expressing the concept that an Agent may be a Person or an Agent may be an Organization. The data model includes an agent identifier which may provide agent identification. It may also include a type that describes if the Agent is a Person or an Organization. The data model may also provide a person identifier including a person identification, first name, middle name, last name, and gender. The data model may also include an organization identifier including an organization identification, organization name, and tax identifier.

Figure 17:
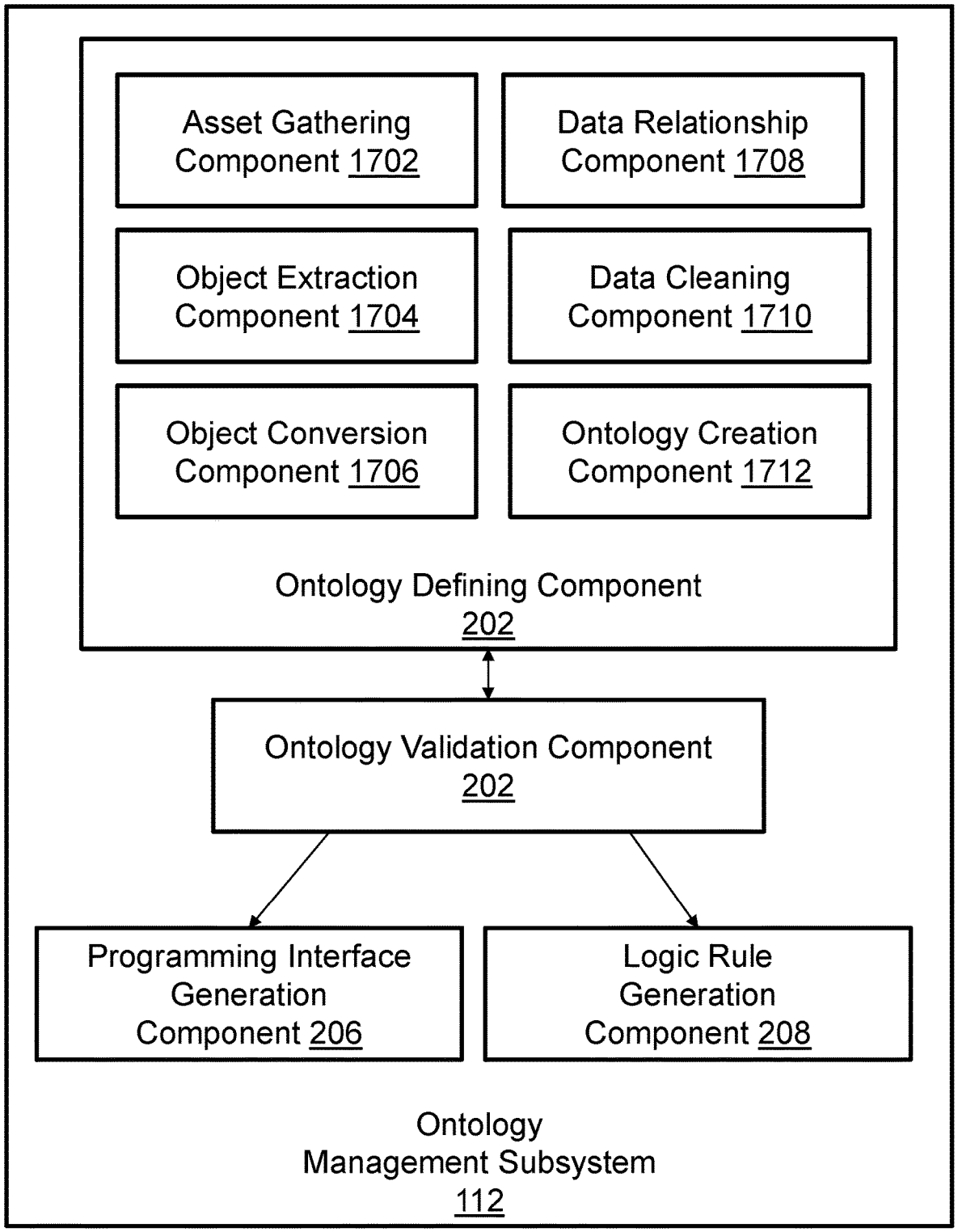
FIG. 17 shows an ontology management subsystem, in accordance with some embodiments.

Referring now to FIG. 17 (in which an ontology management subsystem 112 is shown), the ontology defining component 202 may include an asset gathering component 1702, an object extraction component 1704, an object conversion component 1706, a data relationship component 1708, a data cleaning component 1710, and an ontology creation component 1712 configured to create and define an ontology from a set of business and technology assets.

In some embodiments, asset gathering component 1702 may collect documentation associated with business and/or technical assets. Typically, businesses employ business logic that defines the framework, business rules, and constraints associated with a business's applications, functions, and the like. This business logic may include business definitions, rules, and constraints that have been built into the business application and program modules. For example, the documentation may be a data model that defines the construct of the data that is stored within a system, or stored procedures/source code that interact with the data structure to manage the data. The documentation may also include business rules that are maintained by a business user. In some embodiments, the documentation associated with business assets may include data models, data dictionaries, data files/extracts, VSAM files, glossaries, source code, business documentation (for example, docx, csv, xlsx, etc.), and/or the like. In some embodiments, the documentation associated with technical assets may include data models, data dictionaries, source code, and/or the like.

In some embodiments, asset gathering component 1702 may automatically collect documentation associated with business and/or technical assets utilized by the business applications. In other embodiments, asset gathering component 1702 may collect documentation associated with business and/or technical assets selected by a business user. For example, asset gathering component 1702 may collect documentation associated from one or more various business and/or technical assets. In one use case, with respect to manufacturing business, asset gathering component 1702 may gather documentation related to content management systems from the business and/or technical assets of the manufacturing business.

In some embodiments, object extraction component 1704 may extract business objects from the documentation associated with business and/or technical assets. Business objects may include the business rules, business definitions, constraints, data points, data models, relationships, and/or the like embedded in the business and/or technical asset documentation. For example, data associated with the business and/or technical asset documentation may be automatically stripped back to the business rules, definitions, and constraints that will be converted into an ontology (for example, classes, data properties, and object properties that may be defined from a data model; data dictionary may define business rules and additional comments on fields; etc.). In some embodiments, pre-determined data structures or terms are utilized to identify the business objects within the documentations. For example, object extraction component 1704 may analyze the documentation associated with business and/or technical assets to determine specific linking of data elements to identify one or more business objects.

In some embodiments, object conversion component 1706 may take the =business objects and convert them into a pre-defined data frame format (or other pre-defined data set format) for standardization. For example, the =business objects require conversion into a standardized data frame that comprises the business objects, each of the business object's source, data related to the business object, and/or the like. In some embodiments, object conversion component 1706 may create an auditable log to track and define the relationships between the converted data frame as non-relevant data may not be retained (for example, a supertype/subtype relationship between tables may not be converted into an object property.) In one use case, object conversion component 1706 may convert business objects, stored in a various formats, to a standardized data frame. It should be noted that, although some embodiments describe the conversion of business objects into data frames and the use of such data frames, the business objects may in some embodiments be converted into other data sets (for example, having other pre-defined formats other than a data frame format), and the other data sets may be used in some embodiments in lieu or in addition to the data frames.

An example of a data frame of business objects is shown below in Table 3.

TABLE 3

| Class | Properties | Title | Value |
|---|---|---|---|
| Base Price | | comment | A subtype of a PRICE COMPONENT |
| Base Price | priceComponentID | restriction | int |
| Base Price | | source | DDL Table Name is BASE PRICE |

TABLE 3-continued

| Class | Properties | Title | Value |
|---|---|---|---|
| Base Price | | subClass | PriceComponent |
| Billing Feature | | comment | A subtype of a FEATURE TYPE |
| Billing Feature | featureTypeID | restriction | int |
| Billing Feature | | source | DDL Table Name is BILLING FEATURE |
| Billing Feature | | subClass | FeatureType |
| Brand | | comment | A subtype of a FEATURE TYPE |
| Brand | featureTypeID | restriction | int |
| Brand | | source | DDL Table Name is BRAND |

The above data frame may provide a standardization of the various business objects extracted from the documentation associated with business and/or technical assets. In particular, the data frame may include a class identifier indicating the class of each of the business objects, a property identifier indicating various attributes of each of the business objects, a title identifier used to identify the business objects, and a value providing the data values associated with each of the business objects.

In some embodiments, data relationship component 1708 may define one or more relationships inferred between the various data frames utilizing natural language processing (NLP) libraries. Typically, not all relationships are explicitly defined and must be inferred from the data associated with the business and/or technical assets. Data relationship component 1708 may utilize NLP libraries to identify common classes that may have a relationship or may be linked. In some embodiments, the relationships may be defined based on the relevance of the relationship and the data frame. For example, the NLP libraries may store one or more defined or inferred relationships between data elements of the data frame associated with a particular business object. Data relationship component 1708 may utilize the NLP libraries to identify and link one or more relationships between the various data elements of the business objects extracted from the documentation associated with business and/or technical assets.

In some embodiments, data cleaning component 1710 may clean the data frames to standardize and remove unnecessary naming conventions. In some cases, specific naming conventions may have been used in legacy systems for purposes that are no longer applicable, for example, "tbl_" was a naming convention that was added to the beginning of a table name in a relational database but is no longer needed. Such naming convention may be required to be removed prior to creating the respective ontology or during the process of creating the ontology. In some embodiments, data cleaning component 1710 may expand specific acronyms that are utilized for a particular business to make the ontology more specific. In some embodiments, data cleaning component 1710 may utilize a mapping file to standardize and/or customize the data within a particular data frame. An example of a data frame of business objects is shown below in Table 4.

TABLE 4

| Target Object | Table Name | Class Name |
|---|---|---|
| Class | BASE_PRICE | BasePrice |
| Class | BILLING_FEATURE | BillingFeature |
| Class | BRAND | Brand |

TABLE 4-continued

| Target Object | Table Name | Class Name |
|---|---|---|
| Class | COLOR | Color |
| Class | CONTAINER | Container |
| Class | CONTAINER_TYPE | ContainerType |
| Class | COST_COMPONENT | CostComponent |
| Class | CURRENCY | CurrencyMeasure |
| Class | DIMENSION | Dimension |
| Class | Discount | DiscountCode |

The above mapping file may provide a standardization of the various business objects extracted from the documentation associated with business and/or technical assets. In particular, the mapping file may expand specific acronyms that are utilized for a particular business to make the ontology more specific. For example, for each data element, the mapping file may include a the target object, the table name, and a converted class name for standardization.

In some embodiments, ontology creation component 1712 may convert the data frames into ontologies to be utilized to supplement the business applications with additional functionalities (for example, as described herein). For example, once the business and technology assets have been converted into data frames and cleaned, the data frames may be automatically converted into RDF files or other file format (for example, OWL) to provide supplemental functionality to the business applications. In some embodiments, ontology creation component 1712 may convert the data frames and any identified relationships between other data frames to create an ontology. In one use case, ontology creation component 1712 may create an ontology (for example, RDF file) which defines and identifies the relationship between various data frames of various business objects extracted from the documentation associated with business and/or technical assets.

Figure 18:
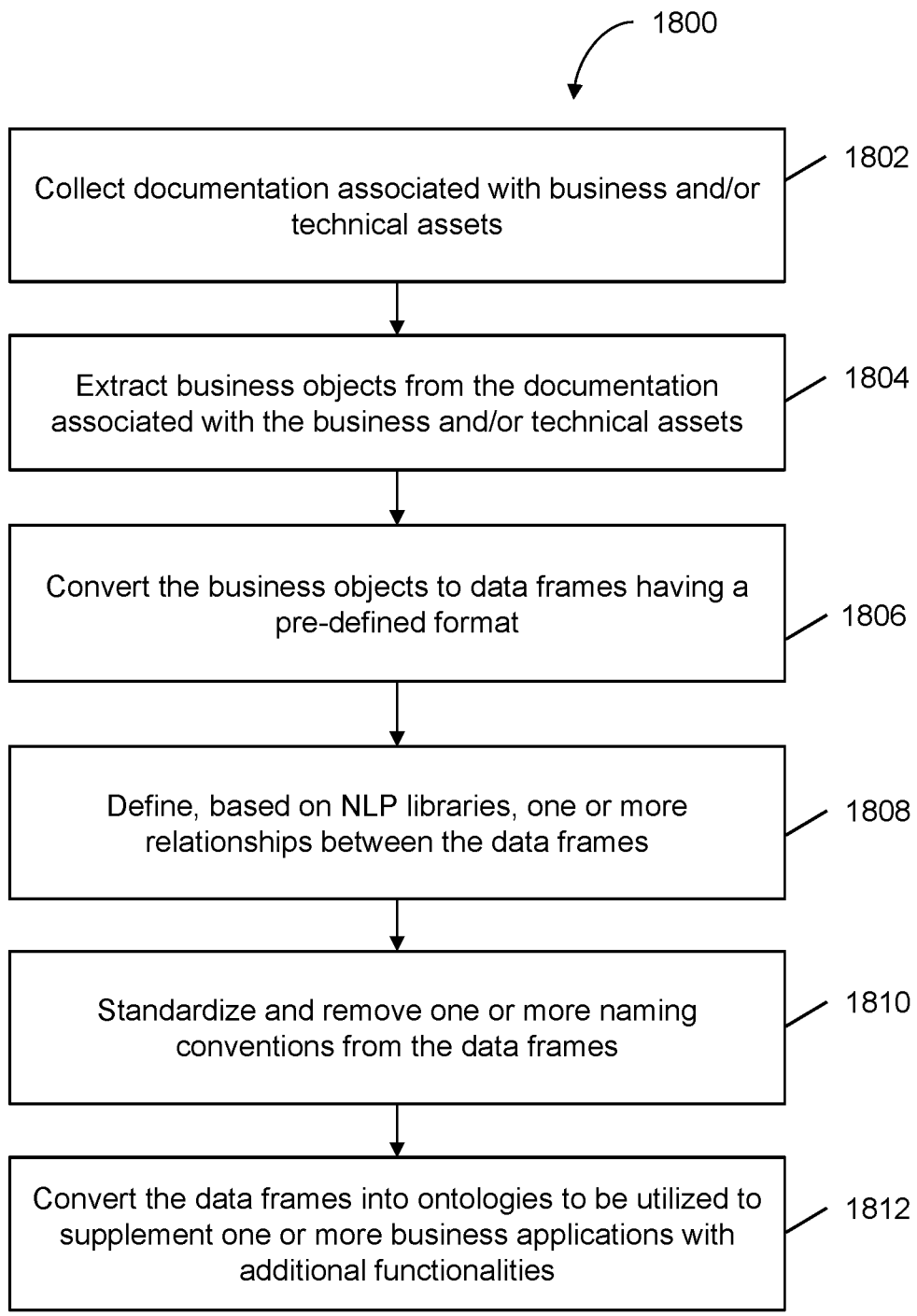
FIG. 18 shows a flowchart of a method of creating an ontology from business and/or technology assets, in accordance with some embodiments.

FIG. 18 is a flowchart 1800 of a method of creating an ontology from business and/or technology assets, in accordance with some embodiments.

In an operation 1802, documentation associated with business and/or technical assets may be collected. In some embodiments, the documentation associated with business assets may include data models, data dictionaries, data files/extracts, VSAM files, glossaries, source code, business documentation (for example, docx, csv, xlsx, etc.), and/or the like. In some embodiments, the documentation associated with technical assets may include data models, data dictionaries, source code, and/or the like.

In an operation 1804, business objects may be extracted from the documentation associated with business and/or technical assets. In some embodiments, the data associated with the business and/or technical asset documentation may be automatically stripped back to the business rules, definitions, and constraints that will be converted into an ontology (for example, classes, data properties, and object properties that may be defined from a data model; data dictionary may define business rules and additional comments on fields; etc.).

In an operation 1806, the business objects may be converted to a data frame having a pre-defined data frame format for standardization. For example, the business objects may require conversion into a standardized data frame that comprises the business objects, each of the business objects' source, data related the business objects, and/or the like. In some embodiments, an auditable log may be created to track and define the relationships between the converted data frame as non-relevant data may not be retained.

In an operation 1808, one or more relationships may be defined between the data frames. As an example, data relationship component 1708 may use NLP libraries to perform natural language processing on the data frames, the business objects, etc., to infer one or more relationships between the data frames. As another example, data relationship component 1708 may utilize NLP libraries to identify common classes that may have a relationship or may be linked. In some embodiments, the relationships may be defined based on the relevance of the relationship and the data frame.

In an operation 1810, the data frames may be cleaned to standardize and remove one or more naming conventions (for example, unnecessary naming conventions). Such naming conventions may be required to be removed prior to creating the respective ontology or during the process of creating the ontology. In some embodiments, data cleaning component 1710 may expand specific acronyms that are utilized for a particular business to make the ontology more specific.

In an operation 1812, the data frames may be converted into ontologies to be utilized to supplement the business applications with additional functionalities. For example, once the business and technology assets have been converted into data frames and cleaned, the data frames may be automatically converted into RDF files to provide supplemental functionality to the business applications.

Updating of Existing Ontologies

In some embodiments, ontology defining component 202 of the ontology management subsystem 112 may be configured to reconcile existing ontologies utilizing business and technology assets. For example, ontology defining component 202 may customize or reconcile an existing ontology with data associated with specific business and/or technical assets. In some embodiments, the existing ontology may be an ontology created and defined by ontology defining component 202. In some embodiments, the reconciling process comprises two set of data: master data and derivative data. The master data represents an existing ontology (for example, RDF file) and the derivative data is data derived from the business and/or technology assets. For example, the master data may include an industry standard healthcare ontology that contains HIPAA compliance and other ontologies essential for healthcare. A case may exist where a business user may want to customize the ontology with their business-specific assets. The business-specific asset may be considered the derivative data. Thus, ontology defining component 202 may reconcile or customize the existing healthcare ontology with the derivative data derived from the business-specific asset.

Figure 19:
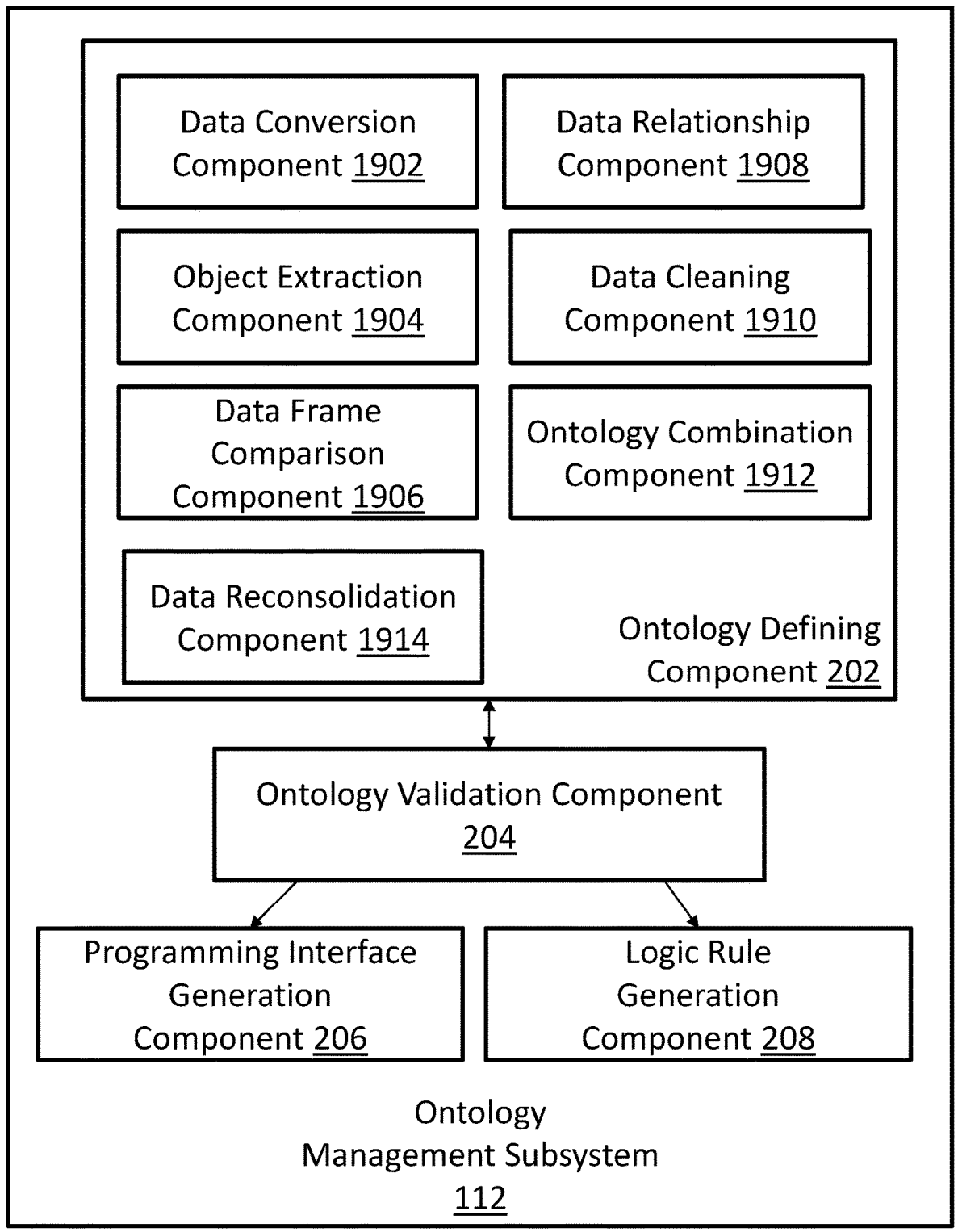
FIG. 19 shows an ontology management subsystem, in accordance with some embodiments.

Referring now to FIG. 19 (in which an ontology management subsystem 112 is shown), the ontology defining component 202 may include a data conversion component 1902, an object extraction component 1904, a data frame comparison component 1906, a data relationship component 1908, a data cleaning component 1910, an ontology combination component 1912, and a data reconsolidation component 1914 configured to reconcile existing ontologies from a set of business and technology assets.

In one use case, ontology defining component 202 may determine the characteristics of existing ontologies and the derivative data. An example of a comparison of an existing ontology with derivative data associated with specific business and/or technical assets is shown below in Table 5.

TABLE 5

| DDL Conversion | DDL Count | RDF Conversion | RDF Count | Info |
| --- | --- | --- | --- | --- |
| Tables | 93 | Classes | 94 | One more Class than Entity |
| Tables Excluded | 0 | | | Ability to remove tables |
| Columns | 277 | Data Properties | 96 | Table/column combination may be unique |
| Columns Unique | 97 | | | Differences between columns |
| Columns Excluded | 49 | | | Exclusion of classes based on column factors |
| Relationship | 114 | Object Properties | | |
| Relationship Unique | 52 | | | Relationships excluded |
| Relationship Excluded | 0 | | | Relationship excluded because table excluded |

As shown above, the data frame comparison component 1906 and the data reconciliation component 1914 may be utilized to create a reconciliation between a business asset/technical asset (for example, DDL, Virtual Storage Access Method (VSAM), OWL file, RDF file, etc.) and the created or reconciled ontology.

In some embodiments, the ontology management subsystem 112 may include an ontology defining component 202 configured to define an ontology. The ontology may be defined in any logic-based ontology language or specific version of logic-based ontology language using any semantic editor. The data conversion component 1902 may take the existing ontology and convert the ontology to a data frame for reconciliation purposes. For example, the data conversion component 1902 may convert an existing ontology to a data frame extracting the classes, data properties, and object properties of the ontology.

In some embodiments, the object extraction component 1904 may extract business objects from the documentation associated with business and/or technical assets. Business objects may include the business rules, business definitions, constraints, data points, data models, relationships, and the like embedded in the business and/or technical asset documentation. For example, data within the business and/or technical asset documentation may be automatically stripped back to the business rules, definitions, and constraints that will be converted into an ontology (for example, classes, data properties, and object properties that may be defined from a data model; data dictionary may define business rules and additional comments on fields; etc.). In some embodiments, the business object may be converted to a data frame having a pre-defined format for standardization. For example, the business objects require conversion into a standardized data frame that comprises the business objects, each of the business object's source, data related to the business object, and/or the like. In some embodiments, an auditable log may be created to track and define the relationships between the converted data frame as non-relevant data may not be retained. In some embodiments, the data frames created from the business objects from the documentation associated with business and/or technical assets may be stored as derivative data.

In some embodiments, the data frame comparison component 1906 may reconcile the two set of data frames and identify if the ontology is missing any business and/or technology assets. For example, data frame comparison component 1906 may compare the existing ontology data frame with the business objects data frame to determine if any potential missing business and/or technology assets exist. In some embodiments, data frame comparison component 1906 may compare the data elements associated with each of the data frames (for example, the data frame associated with the existing ontology and the data frames associated with the business objects extracted from the documentation associated with business and/or technical assets).

In some embodiments, a data relationship component 1908 may define relationships inferred between the various data frames utilizing NLP libraries. Typically, not all relationships are explicitly defined and must be inferred from the data associated with the business and/or technical assets. Data relationship component 1908 may utilize NLP libraries to identify common classes that may have a relationship or may be linked. In some embodiments, the relationships may be defined based on the relevance of the relationship and the data frame. In some embodiments, data frame comparison component 1906 may compare the relationships associated with each of the data frames (i.e., the data frame associated with the existing ontology and the data frames associated with the business objects extracted from the documentation associated with business and/or technical assets).

In some embodiments, data cleaning component 1910 may clean the data frames to standardize and remove unnecessary naming conventions. In some cases, specific naming conventions may have been used in legacy systems for purposes that are no longer applicable, for example, "tbl_" was a naming convention that was added to the beginning of a table name in a relational database but is no longer needed. Such naming convention may be required to be removed prior to creating the respective ontology or during the process of creating the ontology. In some embodiments, data cleaning component 1910 may expand specific acronyms that are utilized for a particular business to make the ontology more specific. In some embodiment, data cleaning component 1910 may allow the user to specify which source components within business asset/technical asset (for example, DDL, Virtual Storage Access Method (VSAM), OWL file, RDF file, etc.) captured within a data frame should be transformed into an ontology object, captured within another data frame. For example, the user may decide that they do not wish to convert a column called "Discount" within the table "PRICE" into a data object called "discount" with the domain of "Price". Any type of source component may be included or excluded depending upon the wishes of the user of cleaning component 1910. Some embodiments of cleaning component 1910 also allow for a cascading exclusion of objects. The user may to exclude a complete source business asset/technical asset (for example table, class, VSAM table, etc.), all of the columns and relationships of the table will automatically also be excluded from becoming data properties, object properties with the domain of the class what would have been created. For example, if a technical asset (table/ddl) called "PRICE" was excluded from transformation into a Class called "Price," and "PRICE" contained a column called "Discount", then "Discount" would also be excluded from being transformed into a data property "discount."

In some embodiments, an ontology combination component 1912 may use the master and the derivative data to generate an updated ontology. As an example, ontology combination component 1912 may modify existing data frames associated with the existing ontology or add new data frames to the existing ontology to include data elements and/or relationships from the data frames associated with the business objects extracted from the documentation associated with business and/or technical assets. In some embodiments, the data reconciliation component 1912 may identify portions of the derivative data as missing from an existing ontology). Data combination component 1912 may add (to the existing ontology) only the portion of the derivative data that was identified as missing from the existing ontology).

Figure 20:
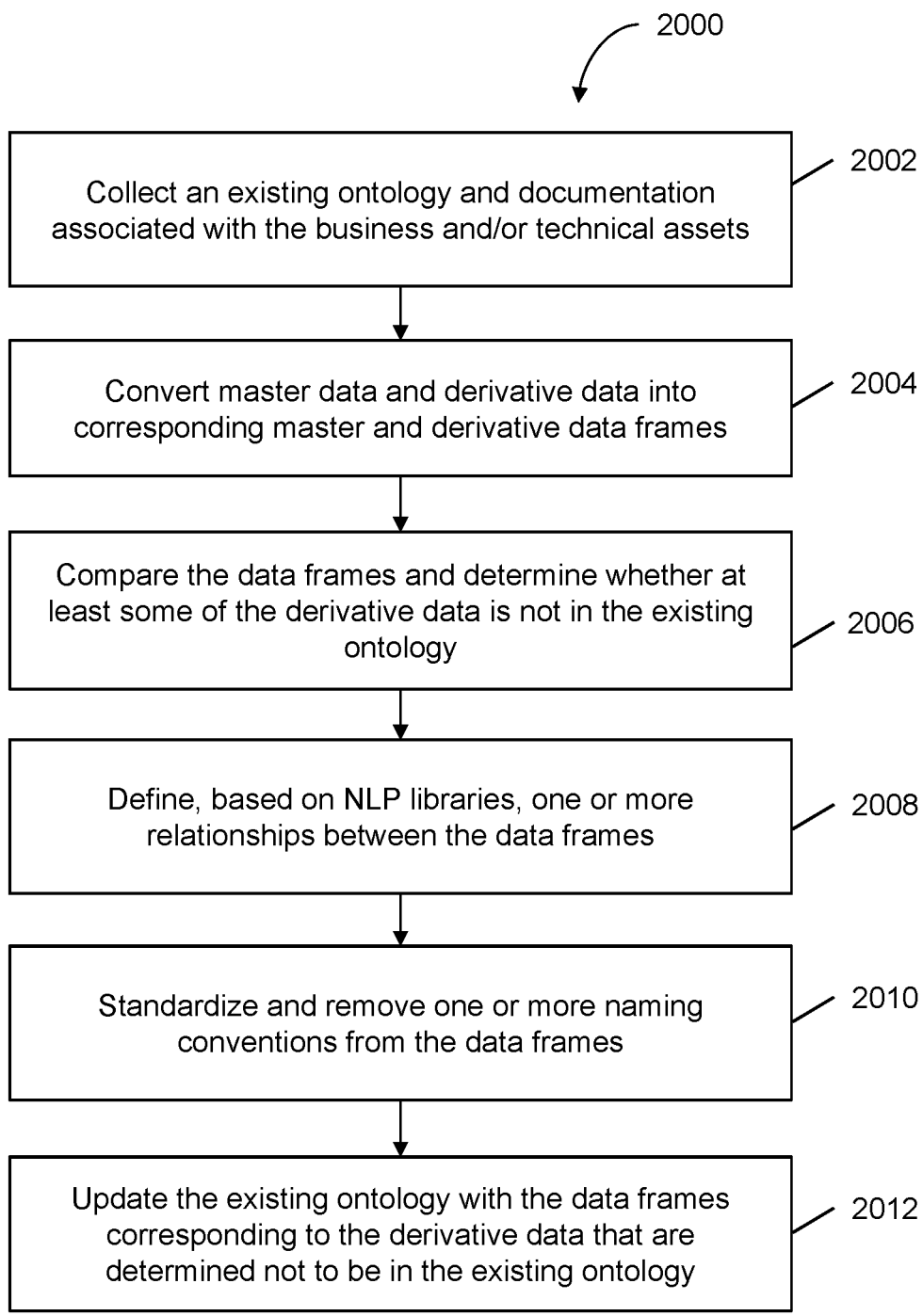
FIG. 20 shows a flowchart of a method of reconciling data from business and/or technology assets into an existing ontology, in accordance with some embodiments.

FIG. 20 is a flowchart 2000 of a method of reconciling data from business and/or technology assets into an existing ontology, in accordance with some embodiments.

In an operation 2002, an existing ontology and documentation associated with the business and/or technical assets may be collected. In some embodiments, master data may be associated with the existing ontology and derivative data may be associated with the documentation (associated with the business and/or technical assets).

In an operation 2004, the master data associated with the existing ontology and the derivative data are converted into corresponding master and derivative data frames.

In an operation 2006, the data frames are compared and a determination is made whether at least some of the derivative data is not in the existing ontology. As an example, if any of the derivative data is not represented in the existing ontology, the existing ontology may be updated based on the missing derivative data, the data frames corresponding to the missing derivative data, etc.

In an operation 2008, one or more relationships may be defined between the data frames. As an example, data relationship component 1908 may use NLP libraries to perform natural language processing on the data frames, the business objects, etc., to infer one or more relationships between the data frames. As another example, data relationship component 1908 may utilize NLP libraries to identify common classes that may have a relationship or may be linked. In some embodiments, the relationships may be defined based on the relevance of the relationship and the data frame.

In an operation 2010, the data frames may be cleaned to standardize and remove one or more naming conventions (for example, unnecessary naming conventions) may be removed. As an example, such naming conventions may be required to be removed prior to creating the respective ontology or during the process of creating the ontology. In some embodiments, data cleaning component 1910 may expand specific acronyms that are utilized for a particular business to make the ontology more specific.

In an operation 2012, the existing ontology may be updated with the data frames corresponding to the derivative data that are determined not to be in the existing ontology. In some embodiments, both the derivative data that are represented in the existing ontology and the derivative data missing from the existing ontology (or their corresponding data frames) may be used to update the existing ontology (for example, where reconciliation to identify aspects of the derivative data is missing in the existing ontology is not initially performed).

Cyclic and Acyclic Subgraphs

Figure 24:
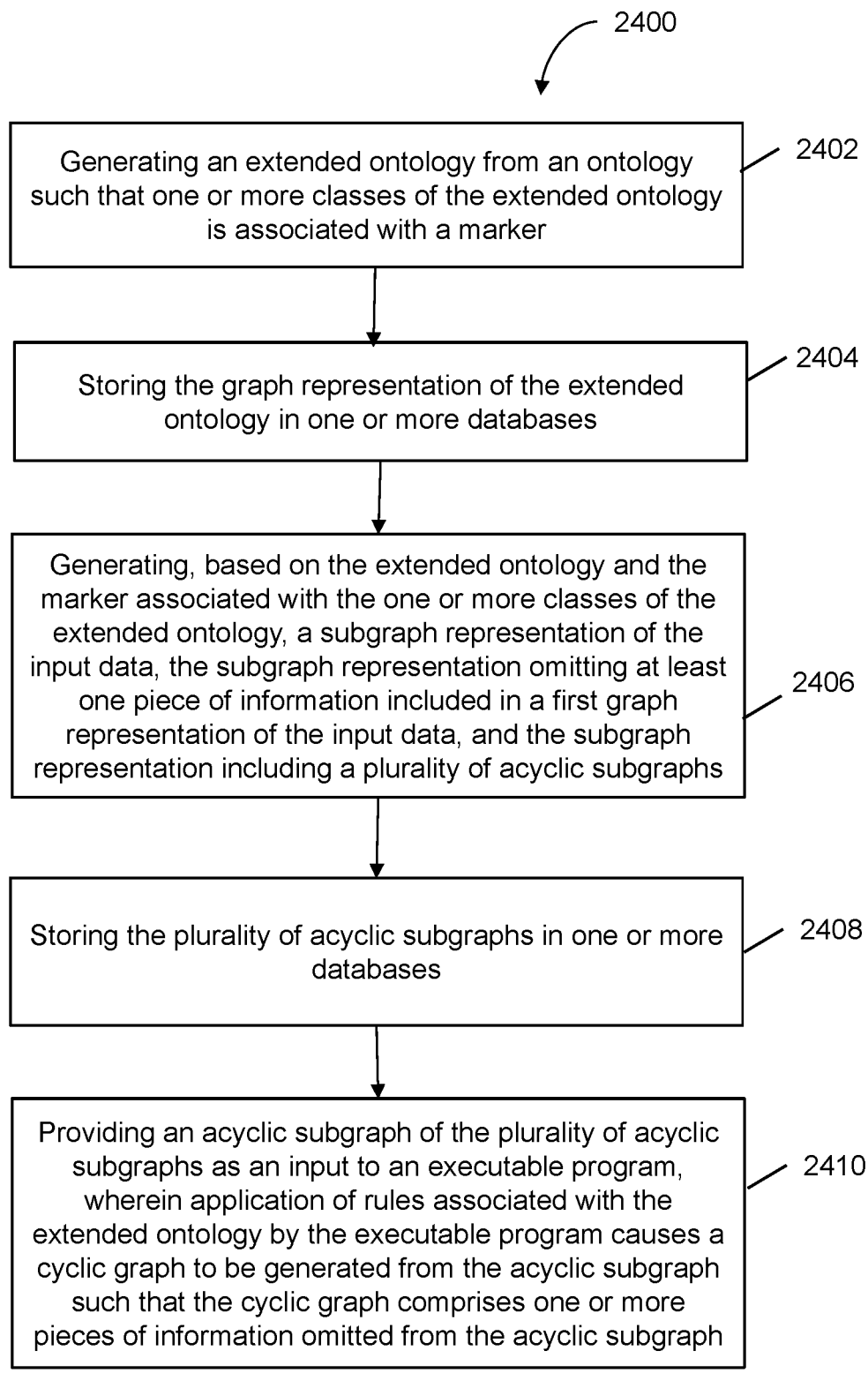
FIG. 24 shows a flowchart for storage and retrieval of information using an acyclic subgraph, in accordance with some embodiments.

FIG. 24 illustrates one aspect of the disclosure, which can improve storage and retrieval of information using acyclic subgraphs. In operation 2402, an extended ontology may be generated from an ontology such that the extended ontology comprises an association of markers to classes of the ontology. An ontology may be extended (for example, extended_domain_ontology.owl) by mixing classes from a marker ontology or framework ontology (for example, rdv_core.owl) into the ontology. The marker ontology or the framework ontology includes information to select certain classes of the ontology as a persisted class. The information to select certain classes of the ontology as a persisted class may include usage pattern of the class or the amount of data included within the class. Accordingly, based on such information, certain classes of the ontology may be marked as a persisted class and thus, an extended ontology (with marked classes) may be defined based on such marking.

In operation 2404, input data may be received. In step 2406, a subgraph representation of the input data may be generated based on the extended ontology and the markers (for example, schema information) associated with one or more classes of the extended ontology. The subgraph representation of the input data may omit one or more pieces of information included in a graph representation of the input data. Further, the subgraph representation of the input data may include a plurality of acyclic subgraphs. Additional details regarding the generation of the subgraph representation is described with regard to FIG. 25. In operation 2408, the plurality of acyclic subgraphs may be stored in one or more databases.

In operation 2410, acyclic subgraphs may be retrieved from the one or more databases based on a query. A query may include one or more URIs and based on such one or more URIs, acyclic subgraphs may be retrieved from the one or more databases and stored in working memory. These acyclic subgraphs may be provided as an input to an executable program. Application of logic rules (generated based on axiom information of the extended ontology or the ontology) associated with the extended ontology and application of schema information causes the cyclic graph (or subgraphs) to be generated from an acyclic subgraph such that the cyclic graph comprises one or more pieces of information omitted from the acyclic subgraph. Accordingly, the cyclic subgraphs (or graph) are made available via the executable program without provided the cyclic subgraphs (or graph). The acyclic subgraphs may be queried using an arangoDB query language (AQL), wherein the acyclic subgraph is provided in response to a query.

Figure 25:
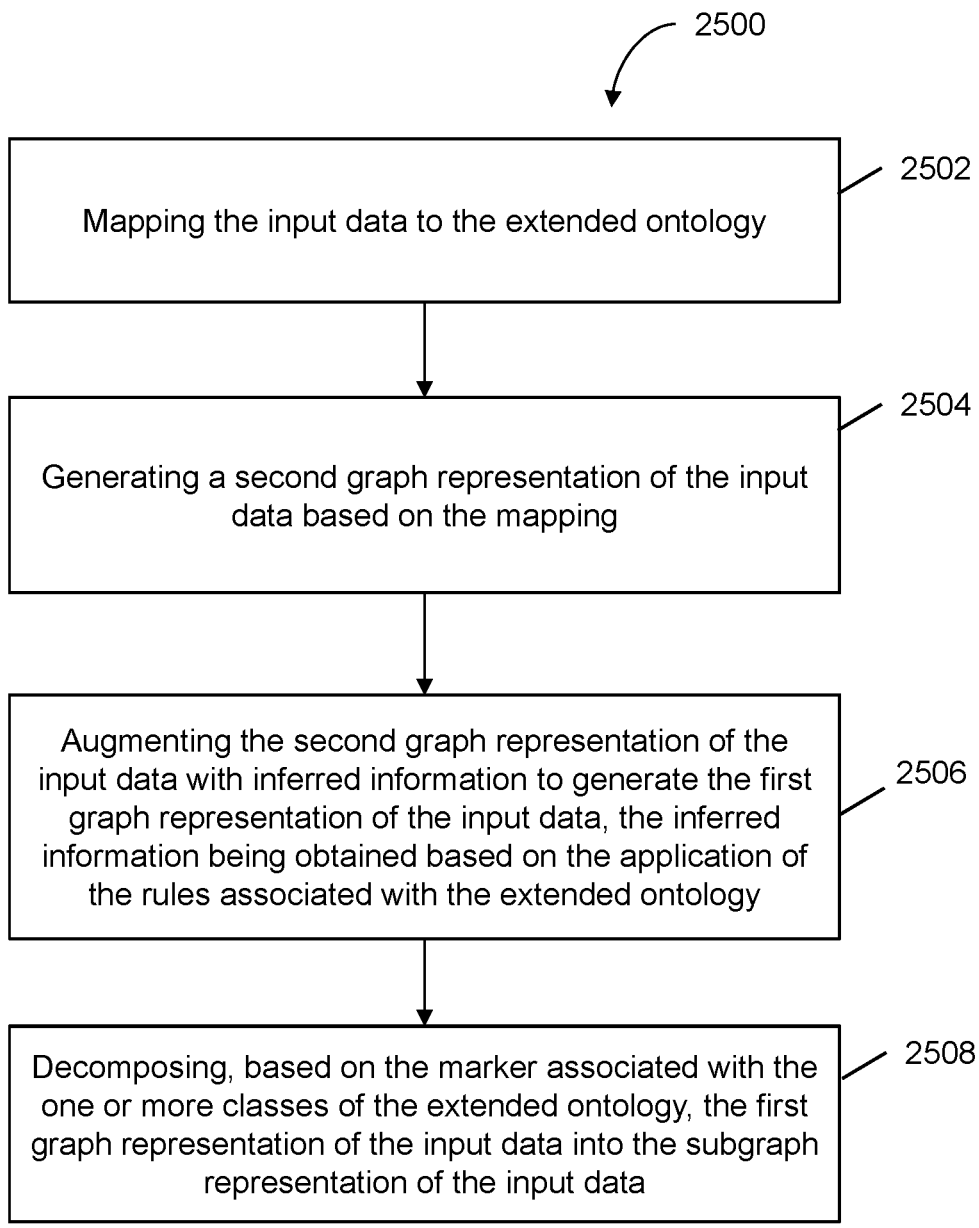
FIG. 25 shows a flowchart for generating a subgraph representation of input data, in accordance with some embodiments.

FIG. 25 illustrates a process of generating a subgraph representation of input data. In operation 2502, the input data may be mapped to the extended ontology. In operation 2504, a graph representation of the input data may be generated based on the mapping. As illustrated in FIG. 21, the graph representation 2100 of the input data is generated based on the mapping of the input data to the extended ontology.

In operation 2506, the graph representation 2100 may be augmented with inferred information to generate another graph representation of the input data. The inferred information may be obtained based on the application of rules associated with the extended ontology. As discussed above with regard to FIG. 3, the application of logic rules (derived from axiom information of the extended ontology) may result in the generation of the graph representation 2200 illustrated in FIG. 22. This graph representation 2220 of the input data may include additional one or more pieces of information not included in the graph representation generated in FIG. 21. The subgraphs of the graph representation 2100 may be stored in the working memory and may be provided as an input to an executable program. The application of the logic rules, runtime rules, and schema information to these subgraphs may generate the graph representation 2200 illustrated in FIG. 22. In other words, based on the application of the logic rules, runtime rules, and schema information to the graph representation 2100, certain data may be inferred and based on the combination of the input data and the inferred data, a cyclic graph (as illustrated in FIG. 22) may be generated or reconstructed.

In operation 2508, once the cyclic graph 2200 is generated, the cyclic graph may be decomposed (or segmented) into one or more acyclic subgraphs by omitting certain pieces of information. Such acyclic subgraphs may be generated based on the application of schema information (for example, based on the marker ontology or the framework ontology) and logic rules. In other words, the graph representation 2200 of the input data may be decomposed into a subgraph representation (as illustrated in FIG. 23) of the input data based on maker information (for example, schema information), thereby resulting in the generation of a subgraph representation of input data. The information that is omitted may be recreated based on application of the logic rules and schema information discussed above with regard to FIGS. 1-3. These decomposed or segmented subgraphs may be stored in one or more databases and as a result, the database may be updated based on these subgraphs. Decomposing or segmenting the cyclic graph into acyclic subgraphs has several advantages. For one, storing and manipulating an acyclic graph in a database (as opposed to a cyclic graph) can be done more efficiently than using cyclic graphs. Additionally, utilization of computer and communication resources for transmission and reception of an acyclic graph (or subgraph) may be reduced due to smaller size of the acyclic graphs (or subgraphs), as compared to the resources required for transmission and reception of the cyclic graphs (or subgraphs). Accordingly, the use of such acyclic graphs (or subgraphs) may make it more efficient to store and retrieve (or infer) information as it saves memory space since redundant information can be recreated using the logic rules The methods described herein may be implemented in one or more processing devices (for example, a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

As used throughout this application, terms describing conditional relationships, for example, "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, for example, "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, for example, the antecedent is relevant to the likelihood of the consequent occurring. Statements in which a plurality of attributes or functions are mapped to a plurality of objects (for example, one or more processors performing steps A, B, C, and D) encompasses both all such attributes or functions being mapped to all such objects and subsets of the attributes or functions being mapped to subsets of the attributes or functions (for example, both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every.

Although the present invention has been described in detail for the purpose of illustration based on what are currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method for improving storage and retrieval of information using an acyclic subgraph, the method comprising, the method comprising: generating an extended ontology from an ontology such that one or more classes of the extended ontology is associated with a marker; receiving input data; generating, based on the extended ontology and the marker associated with the one or more classes of the extended ontology, a subgraph representation of the input data, the subgraph representation omitting at least one piece of information included in a first graph representation of the input data, and the subgraph representation including a plurality of acyclic subgraphs; storing the plurality of acyclic subgraphs in one or more databases; and providing an acyclic subgraph of the plurality of acyclic subgraphs as an input to an executable program, wherein application of rules associated with the extended ontology by the executable program causes a cyclic graph to be generated from the acyclic subgraph such that the cyclic graph comprises one or more pieces of information omitted from the acyclic subgraph.

2. The method of embodiment 1, wherein the generating the subgraph representation of the input data includes: mapping the input data to the extended ontology; generating a second graph representation of the input data based on the mapping; augmenting the second graph representation of the input data with inferred information to generate the first graph representation of the input data, the inferred information being obtained based on the application of the rules associated with the extended ontology; and decomposing, based on the marker associated with the one or more classes of the extended ontology, the first graph representation of the input data into the subgraph representation of the input data.

3. The method any of embodiments 1-2, further comprising: extracting class information from the ontology and the extended ontology; and generating, based on the class information, a programming interface to allow the executable program to access the acyclic subgraph via the programming interface.

4. The method of any of embodiments 1-3, wherein the cyclic subgraph is made available via the executable program at a client device without providing the cyclic subgraph to the client device from a server that stores the acyclic subgraphs.

5. The method of any of embodiments 1-4, further comprising: generating, based on information associated with the markers, schema information, wherein application of the schema information associated with the extended ontology by the executable program causes the cyclic subgraph to be generated from the acyclic subgraph such that the cyclic subgraph comprises the one or more pieces of information omitted from the acyclic subgraph.

6. The method of any of embodiments 1-5, further comprising: querying the acyclic subgraphs using a query language, wherein the acyclic subgraph is provided in response to a query.

7. The method of any of embodiments 1-6, further comprising: generating the ontology based on one or more data sets and one or more relationships between the one or more data sets, the one or more data sets being generated based on objects extracted from a collection of documents, and the one or more data sets having a pre-defined format.

8. The method of any of embodiments 1-7, wherein the schema information includes a description of properties and expected range value for each of the one or more classes associated with the marker.

9. The method of any of embodiments 1-8, further comprising: generating, based on axiom information of the extended ontology, the rules associated with the extended ontology.

10. A system, comprising: one or more processors; and memory storing instructions that when executed by the processors cause the processors to effectuate operations comprising those of any of embodiments 1-9.

11. A tangible, non-transitory, machine-readable medium storing instructions that when executed by a data processing apparatus cause the data processing apparatus to perform operations comprising those of any of embodiments 1-9.

What is claimed is:

1. A method for improving storage and retrieval of information using an acyclic subgraph, the method comprising:
generating an extended ontology from an ontology such that one or more classes of the extended ontology is associated with a marker;
receiving input data;
generating, based on the extended ontology and the marker associated with the one or more classes of the extended ontology, a subgraph representation of the input data, the subgraph representation omitting at least one piece of information included in a first graph representation of the input data, and the subgraph representation including a plurality of acyclic subgraphs;
storing the plurality of acyclic subgraphs in one or more databases; and
providing an acyclic subgraph of the plurality of acyclic subgraphs as an input to an executable program, wherein application of rules associated with the extended ontology by the executable program causes a cyclic graph to be generated from the acyclic subgraph such that the cyclic graph comprises one or more pieces of information omitted from the acyclic subgraph.

2. The method of claim 1, wherein the generating the subgraph representation of the input data includes:
mapping the input data to the extended ontology; generating a second graph representation of the input data based on the mapping;
augmenting the second graph representation of the input data with inferred information to generate the first graph representation of the input data, the inferred information being obtained based on the application of the rules associated with the extended ontology; and decomposing, based on the marker associated with the one or more classes of the extended ontology, the first graph representation of the input data into the subgraph representation of the input data.

3. The method of claim 1, further comprising: extracting class information from the ontology and the extended ontology; and generating, based on the class information, a programming interface to allow the executable program to access the acyclic subgraph via the programming interface.

4. The method of claim 1, wherein the cyclic subgraph is made available via the executable program at a client device without providing the cyclic subgraph to the client device from a server that stores the acyclic subgraph.

5. The method of claim 1, further comprising: generating, based on information associated with the marker, schema information, wherein application of the schema information associated with the extended ontology by the executable program causes the cyclic subgraph to be generated from the acyclic subgraph such that the cyclic subgraph comprises the one or more pieces of information omitted from the acyclic subgraph.

6. The method of claim 1, further comprising: querying the acyclic subgraph using a query language, wherein the acyclic subgraph is provided in response to a query.

7. The method of claim 5, wherein the schema information includes a description of properties and expected range value for each of the one or more classes associated with the marker.

8. The method of claim 1, further comprising: generating, based on axiom information of the extended ontology, the rules associated with the extended ontology.

9. A system for improving storage and retrieval of information using a subgraph, the system comprising:

a computer system that includes one or more physical processors programmed with computer program instructions that, when executed, cause the computer system to:

generate an extended ontology from an ontology such that one or more classes of the extended ontology is associated with a marker;

receive input data;

generate, based on the extended ontology and the marker associated with the one or more classes of the extended ontology, a subgraph representation of the input data, the subgraph representation omitting at least one piece of information included in a first graph representation of the input data, and the subgraph representation including a plurality of subgraphs;

store the plurality of subgraphs in one or more databases; and provide a subgraph of the plurality of subgraphs as an input to an executable program, wherein application of rules associated with the extended ontology by the executable program causes a graph to be generated from the subgraph such that the graph comprises one or more pieces of information omitted from the subgraph.

10. The system of claim 9, wherein the generation of the subgraph representation of the input data includes causing the computer system to:

map the input data to the extended ontology;

generate a second graph representation of the input data based on the mapping;

augment the second graph representation of the input data with inferred information to generate the first graph representation of the input data, the inferred information being obtained based on the application of the rules associated with the extended ontology; and decompose, based on the marker associated with the one or more classes of the extended ontology, the first graph representation of the input data into the subgraph representation of the input data.

11. The system of claim 9, wherein the one or more physical processors programmed with computer program instructions that, when executed, cause the computer system to: extract class information from the ontology and the extended ontology; and generate, based on the class information, a programming interface to allow the executable program to access the subgraph via the programming interface.

12. The system of claim 9, wherein the graph is made available via the executable program at a client device without providing the graph to the client device from a server that stores the subgraph.

13. The system of claim 9, wherein the one or more physical processors programmed with computer program instructions that, when executed, cause the computer system to: generate, based on information associated with the marker, schema information, wherein application of the schema information associated with the extended ontology by the executable program causes the graph to be generated from the subgraph such that the graph comprises the one or more pieces of information omitted from the subgraph.

14. The system of claim 9, wherein the one or more physical processors programmed with computer program instructions that, when executed, cause the computer system to: query the subgraph using a query language, where the subgraph is provided in response to a query.

15. The system of claim 13, wherein the schema information includes a description of properties and expected range value for each of the one or more classes associated with the marker.

16. The system of claim 9, wherein the one or more physical processors programmed with computer program instructions that, when executed, cause the computer system to: generate, based on axiom information of the extended ontology, the rules associated with the extended ontology.

17. A method for improving storage and retrieval of information using a subgraph, the method comprising;

generating an extended ontology from an ontology such that one or more classes of the extended ontology is associated with a marker;

receiving input data;

generating, based on the extended ontology and the marker associated with the one or more classes of the extended ontology, a subgraph representation of the input data, the subgraph representation omitting at least one piece of information included in a first graph representation of the input data, and the subgraph representation including a plurality of subgraphs:

storing the plurality of subgraphs in one or more databases; and providing a subgraph of the plurality of subgraphs as an input to an executable program, wherein application of rules associated with the extended ontology by the executable program causes a graph to be generated from the subgraph such that the graph comprises one or more pieces of information omitted from the subgraph.

18. The method of claim 17, wherein the generating the subgraph representation of the input data includes:

mapping the input data to the extended ontology;
generating a second graph representation of the input data based on the mapping;
augment the second graph representation of the input data with inferred information to generate the first graph representation of the input data, the inferred information being obtained based on the application of the rules associated with the extended ontology; and
decomposing, based on the marker associated with the one or more classes of the extended ontology, the first graph representation of the input data into the subgraph representation of the input data.

19. The method of claim 17, wherein the graph is made available via the executable program at a client device without providing the graph to the client device from a server that stores the subgraph.

20. The method of claim 17, further comprising; generating, based on axiom information of the extended ontology, the rules associated with the extended ontology.

* * * * *